United States Patent [19]

Kondo et al.

[11] Patent Number: 5,668,726
[45] Date of Patent: Sep. 16, 1997

[54] DATA BACKUP APPARATUS UTILIZED IN AN ELECTRONIC CONTROL SYSTEM AND DATA BACKUP METHOD PERFORMED IN THE DATA BACKUP APPARATUS

[75] Inventors: Hiroshi Kondo, Anjo; Takamasa Oguri, Toyoake; Masato Yano, Okazaki; Kazuyuki Okuda, Kariya; Yoshihiro Kitagawa, Nagoya, all of Japan

[73] Assignee: Nippondenso Co, Ltd., Aichi-pref., Japan

[21] Appl. No.: 357,923

[22] Filed: Dec. 16, 1994

[30] Foreign Application Priority Data

Dec. 17, 1993 [JP] Japan .................................. 5-318612
Mar. 18, 1994 [JP] Japan .................................. 6-049038

[51] Int. Cl.$^6$ ...................................................... G06F 11/16
[52] U.S. Cl. ................... 701/115; 371/67.1; 395/182.04; 701/114
[58] Field of Search ..................... 364/431.12, 431.11, 364/424.034, 424.035; 395/431, 438, 182.04; 340/825.16; 73/117.3; 371/67.1

[56] References Cited

U.S. PATENT DOCUMENTS

| | | | |
|---|---|---|---|
| 4,271,402 | 6/1981 | Kastura et al. | 364/431.12 |
| 4,307,455 | 12/1981 | Juhasz et al. | 364/424.04 |
| 4,348,729 | 9/1982 | Sasayama et al. | 364/431.12 |
| 4,891,760 | 1/1990 | Kashiwazaki et al. | 364/443 |
| 4,943,924 | 7/1990 | Kanegae et al. | 364/431.12 |
| 4,972,340 | 11/1990 | Nakatsuru et al. | 364/431.12 |
| 5,146,459 | 9/1992 | Shimizu | 371/21.5 |
| 5,276,619 | 1/1994 | Ohara et al. | 364/431.12 |
| 5,497,330 | 3/1996 | Ishida | 364/431.12 |
| 5,526,267 | 6/1996 | Sogawa | 364/431.12 |

FOREIGN PATENT DOCUMENTS

| | | |
|---|---|---|
| 0025330 | 3/1981 | European Pat. Off. . |
| 57-195396 | 12/1982 | Japan . |
| 62-142849 | 6/1987 | Japan . |
| 4-55927 | 2/1992 | Japan . |
| 4153812 | 5/1992 | Japan . |
| 5143468 | 6/1993 | Japan . |
| 5-143470 | 6/1993 | Japan . |

OTHER PUBLICATIONS

IBM Technical Disclosure Bulletin, vol. 21, No. 9, Feb. 1979, pp. 3806–3808, G. M. Trees et al 'Document recovery after system failure'.
Database WPI, Week 9233, Derwent Publications Ltd., London, GB; AN 92–270360 & EP–A–0 498 374 (Toshiba Computer Eng. Corp.) 3 Mar. 1993.
Database WPI, Week 8703, Derwent Publications Ltd., London, GB; AN 87–015576 & DE–A–36 22 822 (Hitachi K.K.) 15 Jan. 1987;.

*Primary Examiner*—Kevin J. Teska
*Assistant Examiner*—Tyrone V. Walker
*Attorney, Agent, or Firm*—Cushman Darby & Cushman IP Group of Pillsbury Madison & Sutro LLP

[57] ABSTRACT

A backup RAM for storing pieces of diagnosis data regardless of the cut-off of an electric power is provided in a portion of a RAM. In cases where the detection of an unusual condition by a throttle sensor or a water temperature sensor is judged by a CPU in a current processing routine, a first checking value indicating that the backup RAM is in a renewing period is stored in a checking region of the backup RAM, and pieces of previous diagnosis data stored in a data access region of the backup RAM in a previous processing routine are copied to a temporary refuge region of the backup RAM. Thereafter, pieces of updated diagnosis data obtained in the current processing routine are stored one by one in the data access region in place of the previous diagnosis data, and a second checking value indicating that the backup RAM is in a renewal finishing period is stored in the checking region. In cases where the first checking data is stored in the checking region when the electric power cut off is again supplied, the previous diagnosis data stored in the temporary refuge region are returned to the data access region and are read out according to a request from a diagnosis checker.

31 Claims, 27 Drawing Sheets

FIG. 2

| ADDRESS NO. | 15-TH BIT ... 8-TH BIT | 7-TH BIT ... 0-TH BIT | |
|---|---|---|---|
| n | BACKUP RAM CHECKING VALUE (R101) | | |
| n+1 | $Fu_1$ (R102) | $Nu_1$ (R103) | ⎫ |
| n+2+0 | DIAGNOSIS DATA $D'_0$ (NE) (R104) | | |
| n+2+1 | DIAGNOSIS DATA $D'_1$ (GN) (R105) | | ⎬ TEMPORARY REFUGE REGION |
| ⋮ | ⋮ | | |
| n+2+α | DIAGNOSIS DATA $D'_\alpha$ (α) (R106) | | ⎭ |
| n+3+α | $Fu_2$ (R107) | $Nu_2$ (R108) | ⎫ |
| n+4+α | $Fu_3$ (R109) | $Nu_3$ (R110) | |
| n+5+α+0 | DIAGNOSIS DATA $D_0$ (NE) (R111) | | |
| n+5+α+1 | DIAGNOSIS DATA $D_1$ (GN) (R112) | | ⎬ DATA ACCESS REGION |
| ⋮ | ⋮ | | |
| n+5+α+α | DIAGNOSIS DATA $D_\alpha$ (α) (R113) | | ⎭ |

| ADDRESS NO. | 15-TH BIT — 8-TH BIT | 7-TH BIT — 0-TH BIT | | |
|---|---|---|---|---|
| n | RENEWAL PROCESSING JUDGEMENT DATA (R201) | EFFECTIVE REGION DESIGNATING DATA (R202) | | |
| n+1 | $F_{HA1}$ \| $F_{TW1}$ \| ········· ($F_1$) | (R203) | } | |
| n+2+0 | DIAGNOSIS DATA $D_{A1}$ (NE) | (R204) | | |
| n+2+1 | DIAGNOSIS DATA $D_{A2}$ (GN) | (R205) | | A |
| ⋮ | ⋮ | | | |
| n+2+α | DIAGNOSIS DATA $D_{A\alpha}(\alpha)$ | (R206) | | |
| n+3+α | $F_{HA2}$ \| $F_{TW2}$ \| ········· ($F_2$) | (R207) | } | |
| n+4+α+0 | DIAGNOSIS DATA $D_{B1}$ (NE) | (R208) | | |
| n+4+α+1 | DIAGNOSIS DATA $D_{B2}$ (GN) | (R209) | | B |
| ⋮ | ⋮ | | | |
| n+4+α+α | DIAGNOSIS DATA $D_{B\alpha}(\alpha)$ | (R210) | | |

| ADDRESS NO. | 15-TH BIT | | 8-TH BIT | 7-TH BIT | | 0-TH BIT | |
|---|---|---|---|---|---|---|---|
| n | READING-OUT REGION DESIGNATING DATA (R301) | | | | | | |
| n+1 | $F_{HA1}$ | $F_{TW1}$ | ·········· ($F_1$) | | | (R203) | ⎫ |
| n+2+0 | DIAGNOSIS DATA $D_{A1}$ (NE) | | | | | (R204) | |
| n+2+1 | DIAGNOSIS DATA $D_{A2}$ (GN) | | | | | (R205) | ⎬ A |
| ⋮ | ⋮ | | | | | | |
| n+2+α | DIAGNOSIS DATA $D_{Aα}$ (α) | | | | | (R206) | ⎭ |
| n+3+α | $F_{HA2}$ | $F_{TW2}$ | ·········· ($F_2$) | | | (R207) | ⎫ |
| n+4+α+0 | DIAGNOSIS DATA $D_{B1}$ (NE) | | | | | (R208) | |
| n+4+α+1 | DIAGNOSIS DATA $D_{B2}$ (GN) | | | | | (R209) | ⎬ B |
| ⋮ | ⋮ | | | | | | |
| n+4+α+α | DIAGNOSIS DATA $D_{Bα}$ (α) | | | | | (R210) | ⎭ |

64

DATA BACKUP APPARATUS UTILIZED IN AN ELECTRONIC CONTROL SYSTEM AND DATA BACKUP METHOD PERFORMED IN THE DATA BACKUP APPARATUS

BACKGROUND OF THE INVENTION

1. Field of the Invention

The present invention relates generally to a data backup apparatus utilized in an electronic control system, and more particularly to a data backup apparatus, for example, utilized for a failure-diagnosis apparatus in which pieces of diagnosis data required for the analysis of an unusual condition in on-vehicle equipment are stored and read out to perform a failure-diagnosis of the on-vehicle equipment. Also, the present invention relates to a data backup method for storing the diagnosis data utilized for the failure-diagnosis of the on-vehicle equipment in the data backup apparatus.

2. Description of the Related Art

A data backup apparatus in an electronic control system has been conventionally utilized for a failure-diagnosis apparatus in which pieces of diagnosis data required for the analysis of unusual conditions in on-vehicle equipment are stored. That is, as is described in the Japanese Published Unexamined Patent Application No. 142849 of 1987 (S62-142849) as an example, in the failure-diagnosis apparatus, pieces of diagnosis data transferred from various on-vehicle parts are stored in a backup memory of the data backup apparatus at previous intervals regardless of whether the electric power is cut-off the most recent diagnosis data replaces pieces of previous diagnosis data at the previous intervals, and a failure-diagnosis of the on-vehicle parts is performed with the updated diagnosis data to check whether or not a failure condition exists in the on-vehicle equipment.

SUMMARY OF THE INVENTION

In cases where the electric power is cut off in the middle of the replacement of the diagnosis data stored in the backup memory, pieces of mixed data including pieces of updated diagnosis data obtained after the replacement and pieces of previous diagnosis data obtained before the replacement, are both stored in the backup memory. Therefore, when the electric power is again supplied to the failure-diagnosis apparatus, the mixed data composed of the updated diagnosis data and the previous diagnosis data are utilized to perform the failure diagnosis of the on-vehicle parts. As a result, the precision of the failure diagnosis for the on-vehicle parts considerably deteriorates.

In short, in cases where pieces of updated control data obtained after the replacement and pieces of previous control data obtained before the replacement are stored as a mixture in the backup memory of the data backup apparatus, the reliability of piece of control data stored in the backup memory considerably deteriorates. Therefore, there is a drawback in that the failure analysis of the on-vehicle equipment cannot be reliably performed with the control data read out from the backup memory.

SUMMARY OF THE INVENTION

An object of the present invention is to provide, with due consideration to the drawbacks of the conventional data backup apparatus utilized in an electronic control system, a data backup apparatus utilized in an electronic control system in which the failure analysis of the on-vehicle equipment is reliably performed with pieces of control data even though electric power is cut off in the middle of the replacement of the control data. The object of the present invention is to provide a data backup method for storing the control data utilized for the failure analysis of the on-vehicle equipment in the data backup apparatus.

The object is achieved by the provision of a data backup apparatus utilized in an electronic control system, comprising: a control data storage having a first memory region, a second memory region and a third memory region for storing pieces of updated control data in the first memory region, storing pieces of previous control data in the second memory region and storing a checking value in the third memory region regardless of whether an electric power is cut off;

a control data copies for copying the updated control data stored in the first memory region of the control data storage to the second memory region of the control data storage as the previous control data;

control data renewing unit renewing one after another the updated control data which are stored in the first memory region of the control data storage and are copied to the second memory region by the control data copier on condition that the electric power is supplied to the control data renewing unit, the renewal of the updated control data being stopped in the middle of the renewal by cutting off the electric power supplied to the control data renewing means in the middle of the renewal;

a checking data setting unit setting a piece of first checking data indicating a start of the renewal of the updated control data performed by the control data renewing unit to the third memory region of the control data storage in cases where the updated control data stored in the first memory region is renewed by the control data renewing unit and setting a piece of second checking data indicating completion of the renewal of the updated control data performed by the control data renewing unit to the third memory region of the control data storage in cases where the renewal of the updated control data performed by the control data renewing unit is finished, the first checking data remaining set to the third memory region of the control data storage in cases where the electric power supplied to the control data renewing unit is cut off in the middle of the renewal performed by the control data renewing unit; and a control data returning unit for returning the previous data copied to the second memory region of the control data storage by the control data copier to the first memory region of the control data storage as the updated control data in cases where the electric power cut off is again supplied to the control data renewing unit on condition that the first checking data remains set to the third memory region of the control data storage.

In the above configuration, pieces of updated control data, for example, indicating an unusual condition of on-vehicle equipment are produced for each of processing routines, and the updated control data stored in the first memory region of the control data storage are renewed by the control data renewing unit for each of the processing routines. In this case, before the renewal performed in the control data renewing unit is performed in a current processing routine, a piece of first checking data is set to the third memory region of the control data storage by the checking data setting unit to indicate a start of the renewal of the updated control data, and the updated control data previously stored in the first memory region of the control data storage are copied to the second memory region as pieces of previous control data. Thereafter, pieces of updated control data produced in the current processing routine are stored in the first memory region one by one to replace other pieces of updated control data produced in a previous processing routine with the updated control data produced in the current control data on condition that an electric power is supplied to the control data renewing unit. Also, after the renewal performed in the control data renewing unit is performed in the current processing routine, a piece of second checking data is set to the third memory region of the control data storage by the checking data setting unit to indicate the completion of the renewal of the updated control data performed by the control data renewing unit.

In cases where the electric power supplied to the control data renewing unit is cut off in the middle of the renewal of the updated control data, a part of the updated control data produced in the previous processing routine and a part of the updated control data produced in the current processing routine are mixed in the first memory region of the control data storing means to form pieces of mixed control data. Also, the first checking data remains set to the third memory region of the control data storage. Assuming that the mixed control data are read out to judge which parts of the on-vehicle equipment are in an unusual condition, a judgement is erroneously performed.

To avoid the erroneous judgement, when the electric power cut off is again supplied to the control data renewing unit, it is checked which checking data is set to the third memory region of the control data storage. In cases where the second checking data is set to the third memory region, it is judged that the updated control data produced in the current processing routine are stored in the first memory region, and the updated control data are read out to judge which parts of the on-vehicle equipment is in an unusual condition. In contrast, in cases where the first checking data is set to the third memory region, it is judged that the mixed data are stored in the first memory region. In this case, the previous control data which are produced in the previous processing routine and are copied to the second memory region of the control data storage by the control data copies are returned to the first memory region of the control data storage as the updated control data by the control data returning unit.

Accordingly, even though the electric power supplied to the control data renewing unit is cut off in the middle of the renewal of the updated control data causing mixed data produced in the previous and current processing routines to be stored in the first memory region, the previous control data produced in the previous processing routine can be stored in the first memory region by the function of the control data returning unit. Therefore, judging which portion of the on-vehicle equipment is in a failure condition can be correctly performed.

The above object is also achieved by the provision of a data backup apparatus utilized in an electronic control system, comprising:

control data storage having a first memory region and a second memory region for storing pieces of control data in the first memory region and the second memory region;

an effective region designating unit for alternately designating the first memory region and the second memory region of the control data storage as an effective region as long as electric power is supplied to the effective region designating unit;

a control data renewing unit for renewing pieces of control data which are stored in the effective region determined by the effective region designating unit one by one as long as the electric power is supplied to the control data renewing unit, the first memory region and the second memory region being alternately designated as the effective region each time the control data are renewed by the control data renewing unit, the renewal of the control data being stopped in the middle of the renewal by cutting off the electric power supplied to the control data renewing unit;

a renewing period setting unit for setting an operational condition of the effective region determined by the effective region designating unit in a control data renewing period in cases where the control data stored in the effective region are under renewal and setting an operational condition of the effective region determined by the effective region designating unit in a control data renewal finishing period in cases where the control data stored in the effective region are not under renewal, the operational condition of the effective region remaining set in the control data renewing period in cases where the electric power is cut off in the middle of the renewal of the control data performed by the control data renewing unit; and a control data reading-out unit for reading out pieces of control data stored in either the first memory region or the second memory region which is not designated as the effective region by the effective region designating unit in cases where the operational condition of the effective region is set in the control data renewing period by the renewing period setting unit and reading out pieces of control data stored in the effective region in cases where the operational condition of the effective region is set in the control data renewal finishing period by the renewing period setting unit.

In the above configuration, pieces of control data, for example, indicating an unusual condition of on-vehicle equipment are produced for each processing routine and are stored in the effective region one by one by the control data renewing unit to renew the control data already stored in an effective region. In this case, the first memory region and the second memory region of the control data storage are alternately designated as the effective region each time the control data stored in the control data are renewed. Therefore, the control data stored in the first memory region and the control data stored in the second memory region are alternately renewed for each of the processing routines. Also, an operational condition of the effective region is set in a control data renewing period by the renewing period setting unit in cases where the control data stored in the effective region are under renewal, and an operational condition of the effective region is set in a control data renewal finishing period by the renewing period setting unit in cases where the control data stored in the effective region are not under renewal.

Therefore, in cases where electric power is continuously supplied to the control data renewing unit, the effective region designating unit and the renewing period setting unit during the renewal of the control data performed by the control data renewing unit, pieces of updated control data produced in a current processing routine are stored in the effective region, and the operational condition of the effective region is set in the control data renewal finishing period by the renewing period setting unit after the updated control data are stored in the effective region. In this case, the updated control data stored in the effective region are read out by the control data reading-out unit.

In contrast, in cases where the electric power supplied to the control data renewing unit, the effective region designating unit and the renewing period setting unit is cut off in the middle of the renewal of the control data performed by the control data renewing unit, a part of the control data produced in a current processing routine and a part of the control data produced in a previous processing routine performed prior to the current processing routine are mixed in the effective region to form pieces of mixed control data. Also, either the first or second memory region in which the mixed control data are stored remains set to the effective region, and the setting of the effective region to the control data renewing period is maintained. Therefore, assuming that the mixed data stored in the effective region are read out, there is a drawback in that the failure analysis of on-vehicle equipment cannot be reliably performed with the control data read out from the effective region. In the present invention, because pieces of previous control data stored in either the first memory region or the second memory region which is not designated as the effective region are produced in a previous processing routine just before the current processing routine, the previous control data are read out by the control data reading-out unit.

Accordingly, because the updated control data stored in the effective region are utilized for the failure analysis of on-vehicle equipment in cases where the electric power is not cut off, the failure analysis of on-vehicle equipment can be reliably performed. Also, because the previous control data are utilized for the failure analysis of on-vehicle equipment in cases where the electric power is cut off in the middle of the renewal of the control data, the failure analysis of on-vehicle equipment can be reliably performed.

The above object is also achieved by the provision of a data backup apparatus utilized in an electronic control system, comprising:

a control data storage having a first memory region and a second memory region for storing pieces of control data in the first memory region and the second memory region;

an effective region designating unit for alternately designating the first memory region and the second memory region of the control data storage as an effective region on condition that an electric power is supplied to the effective region designating unit;

a control data renewing unit for renewing pieces of control data which are stored in the effective region determined by the effective region designating unit one by one as long as the electric power is supplied to the control data renewing unit, the first memory region and the second memory region of the control data storage being alternately designated as the effective region each time the control data are renewed by the control data renewing unit, the renewal of the control data being stopped in the middle of the renewal by cutting off the electric power supplied to the control data renewing unit;

a renewing period setting unit for setting an operational condition of the effective region determined by the effective region designating unit in a control data renewing period in cases where the control data stored in the effective region are under renewal and setting an operational condition of the effective region determined by the effective region designating unit in a control data renewal finishing period in cases where the control data stored in the effective region are not under renewal, the operational condition of the effective region remaining set in the control data renewing period in cases where the electric power is cut off in the middle of the renewal of the control data performed by the control data renewing unit;

an effective region switching unit switching a memory region designated as the effective region by the effective region designating unit from one of the first and second memory regions to another memory region in cases where the operational condition of the effective region is set in the control data renewing period by the renewing period setting unit if the electric power cut off is again supplied to the effective region designating unit, the control data renewing unit and the renewing period setting unit and maintaining the designation of the effective region performed by the effective region designating unit cases where the operational condition of the effective region is set in the control data renewal finishing period by the renewing period setting unit; and control data reader for reading out pieces of a control data stored in the effective region which is determined by the effective region switching unit.

In the above configuration, in cases where an electric power is continuously supplied to the control data renewing unit, the effective region designating unit and the renewing period setting unit during the renewal of the control data performed by the control data renewing unit, pieces of updated control data produced in a current processing routine are stored in the effective region and are read out by the control data reader in the same manner.

In contrast, in cases where the electric power supplied to the control data renewing unit, the effective region designating unit and the renewing period setting unit is cut off in the middle of the renewal of the control data performed by the control data renewing unit, pieces of mixed control data are stored in the effective region in the same manner. Thereafter, a memory region designated as the effective region is switched from one of the first and second memory regions, in which the mixed data is stored, to another memory region, in which pieces of previous control data produced in a previous processing routine just before the current processing routine are stored, by the effective region switching unit.

Thereafter, the updated control data stored in the effective region determined by the effective region designating unit are read out by the control data reader in cases where the electric power is not cut off in the middle of the renewal of the control data. Also, the previous control data stored in the effective region of which the designation is switched by the effective region switching means are read out by the control data reading-out means in cases where the electric power is cut off in the middle of the renewal of the control data.

Accordingly, because the updated control data stored in the effective region are utilized for the failure analysis of on-vehicle equipment in cases where the electric power is not cut off, the failure analysis of the on-vehicle equipment can be reliably performed. Also, because the previous control data are utilized for the failure analysis of on-vehicle equipment in cases where the electric power is cut off in the middle of the renewal of the control data, the failure analysis of the on-vehicle equipment can be reliably performed.

The above object is also achieved by the provision of a data backup apparatus utilized in an electronic control system, comprising:

a control data storage having a first memory region and a second memory region for storing pieces of control data in the first memory region and the second memory region;

an effective region designating unit for alternately designating the first memory region and the second memory region of the control data storage as a reading-out effective region as long as electric power is supplied to the effective region designating unit;

control data renewing unit for renewing pieces of control data which are stored in either the first or second memory region not designated as the reading-out effective region by the effective region designating unit one by one on condition that the electric power is supplied to the control data renewing unit, the first memory region and the second memory region of the control data storage being alternately designated as the reading-out effective region each time the control data are renewed by the control data renewing unit, and the renewal of the control data being incompletely finished so that pieces of incomplete control data are stored in either the first or second memory region not designated as the reading-out effective region in cases where the electric power supplied to the control data renewing unit is cut off in the middle of the renewal performed by the control data renewing unit; and a control data reader for reading out pieces of control data stored in the reading-out effective region which is determined by the effective region designating unit.

In the above configuration, in cases where an electric power is continuously supplied to the control data renewing unit and the effective region designating unit during the renewal of the control data performed by the control data renewing unit, pieces of updated control data produced in a current processing routine are stored in either the first or second memory region not designated as the effective region. Thereafter, either the first or second memory region in which the updated control data are stored is designated as the reading-out effective region by the effective region designating unit. Thereafter, the updated control data stored in the reading-out effective region are read out by the control data reader.

In contrast, in cases where the electric power supplied to the control data renewing unit and the effective region designating unit is cut off in the middle of the renewal of the control data performed by the control data renewing unit, the renewal of the control data performed by the control data renewing unit is incompletely finished to produce pieces of incomplete control data. In this case, because the alternate designation performed by the effective region designating means is stopped, the incomplete control data are stored in either the first or second memory region not designated as the reading-out effective region. Thereafter, pieces of previous control data stored in the reading-out effective region are read out by the control data reader.

Therefore, because the incomplete control data are stored in either the first or second memory region not designated as the reading-out effective region, there is no probability that the incomplete control data are read out. Accordingly, the failure analysis of on-vehicle equipment can be reliably performed with the updated control data or the previous control data.

The above object is also achieved by the provision of a data backup apparatus utilized in an electronic control system for storing pieces of diagnosis data utilized for the diagnosis of a driving condition in a vehicle, comprising:

a sensor system including at least a first sensor and a second sensor for detecting conditions of a vehicle;

a condition detector which determines that a sensing signal obtained by the first or second sensor indicates an unusual condition of the vehicle;

a driving condition detector for detecting a driving condition of the vehicle in cases where an unusual condition of the vehicle is detected by the condition detector;

a first memory region for storing pieces of first updated unusual information relating to the driving condition of the vehicle detected by the driving condition detector to replace pieces of first previous unusual information already stored in the first memory region with the first updated unusual information one by one as long as electric power is being supplied, and maintaining the storage of the first updated unusual information in cases where the electric power supplied is cut off;

a first unusual condition judging region in the first memory region for storing a first detecting result of the driving condition detected by the driving condition detector which indicates whether or not the condition of the vehicle detected by the first sensor or the second sensor of the sensing means is unusual;

a first vehicle diagnosis data region in the first memory region for storing at least two pieces of first vehicle diagnosis data relating to the driving condition of the vehicle detected by the driving condition detector and a failure code indicating a type of sensor which relates to the driving condition of the vehicle, the first updated unusual information stored in the first memory region being composed of the first detecting result stored in the first unusual condition judging region and the first vehicle diagnosis data stored in the first vehicle diagnosis data region;

a second memory region for storing pieces of second updated unusual information relating to the driving condition of the vehicle detected by the driving condition detector to replace pieces of second previous unusual information already stored in the second memory region with the second updated unusual information one by one as long as an electric power is being supplied, and maintaining the storage of the second updated unusual information in cases where the electric power supplied is cut off, the replacements in the first and second memory regions being alternately performed;

a second unusual condition judging region in the second memory region for storing a second detecting result of the driving condition detected by the driving condition detector which indicates whether or not the condition of the vehicle detected by the first sensor or the second sensor of the sensing means is unusual;

a second vehicle diagnosis data region in the second memory region for storing at least two pieces of second vehicle diagnosis data relating to the driving condition of the vehicle detected by the driving condition detector and a failure code indicating a type of sensor which relates to the driving condition of the vehicle, the second updated unusual information stored in the second memory region being composed of the second detecting result stored in the second unusual condition judging region and the second vehicle diagnosis data stored in the second vehicle diagnosis data region;

a third memory region for storing a piece of electric power cut-off information indicating that the electric power was cut off in the middle of the replacement of the first previous unusual information stored in the first memory region with the first updated unusual information or the replacement of the second previous unusual information stored in the second memory region with the second updated unusual information, and maintaining the storage of the electric power cut-off information in cases where the electric power is cut off, the electric power cut-off information being expressed by a first hexadecimal numeral indicating the first memory region in which the replacement of the first previous unusual information is finished or a second hexadecimal numeral indicating the second memory region in which the replacement of the second previous unusual information is finished, the first hexadecimal numeral being stored just after the replacement of the first previous unusual information, the second hexadecimal numeral being stored just after the replacement of the second previous unusual information, and the storage of the first or second hexadecimal numeral which indicates one of the first and second memory regions being maintained until the replacement in another memory region is finished; and an effective region selecting unit for selecting one of the first and second memory regions in which the first previous unusual information or the second previous unusual information are not under replacement just before the electric power was cut off as an effective region in cases where the electric power is again supplied on condition that the electric power cut-off information indicating that the electric power is cut off in the middle of the replacement of the first previous unusual information or the replacement of the second previous unusual information are stored in the third memory region, the first or second vehicle diagnosis data stored in the first or second vehicle diagnosis data region of the effective region and the first or second detecting result stored in the first unusual condition judging region of the effective region being read out by the effective region selecting unit.

In the above configuration, conditions of a vehicle such as a throttle sensor and a water temperature sensor, are detected by the first and second sensors and an unusual condition of the vehicle is detected by the unusual condition detector means according to a sensing signal of the first or second sensor. Thereafter, a driving condition of the vehicle is detected by the driving condition detector means according to the unusual condition. Thereafter, pieces of first updated unusual information relating to the driving condition are stored in the first memory region to replace pieces of first previous unusual information, or pieces of second updated unusual information relating to the driving condition are stored in the second memory region to replace pieces of second previous unusual information. The replacement is continued as long as an electric power is being supplied. In cases where the electric power is cut off in the middle of the replacement, pieces of mixed data composed of the first or second updated unusual information and the first or second previous unusual information are stored and maintained. The first or second unusual information are composed of the first or second detecting result and the first or second vehicle diagnosis data.

Also, to recognize that the electric power is cut off in the middle of the replacement, a piece of electric power cut-off information is stored in the third memory region. The electric power cut-off information is expressed by a first hexadecimal numerical character just after the replacement of the first previous unusual information is finished in the first memory region, and the electric power cut-off information is expressed by a second hexadecimal numerical character just after the replacement of the second previous unusual information is finished in the second memory region. Therefore even though the electric power was cut off in the middle of the replacement performed in the first (or second) memory region, the storage of the second (or first) hexadecimal numerical character is maintained in the third memory regions. As a result, even though the electric power was cut off in the middle of the replacement, the electric power cut off can be substantially recognized by detecting the electric power cut-off information.

Thereafter, one of the first and second memory regions is selected as an effective region in the effective region selecting unit. In detail, in cases where the first hexadecimal numerical character is stored in the third memory region, the first memory is selected as the effective region. In contrast, in cases where the second hexadecimal numerical character is stored in the third memory region, the second memory region is selected as the effective region. Therefore, one of the first and second memory regions in which the first previous unusual information or the second previous unusual information are not under replacement just before the electric power is cut off as an effective region is selected as the effective region in the effective region selecting means in cases where the electric power cut off is again supplied.

Accordingly, even though the electric power is cut off in the middle of the replacement, the first or second updated unusual information not incompletely replaced can be reliably read out in cases where the first or second updated unusual information stored in the first or second memory region which is selected as the effective region by the effective region selecting unit.

The above object is also achieved by the provision of a data backup method, comprising the steps of:

preparing a first memory region and a second memory region of a backup memory to alternately store pieces of control data utilized for an electric control system in the first memory region and the second memory region;

alternately storing first designating data indicating that the first memory region of the backup memory is designated as a reading-out effective region and a piece of second designating data indicating that the second memory region of the backup memory is designated as the reading-out effective region in a third memory region of the backup memory for each of processing routines on condition that an electric power is supplied;

renewing the control data stored in either the first memory region, or the second memory region which is not designated as the reading-out effective region by the first designating data or the second designating data stored in the third memory region, one by one for each of the processing routines as long as electric power is being supplied; and reading out the control data stored in the reading-out effective region.

In the above steps, in cases where an electric power is not cut off during the renewal of the control data stored in either the first memory region or the second memory region which is not designated as the reading-out effective region by the first designating data or the second designating data, pieces of updated control data are stored in a memory region not designated as the reading-out effective region. Thereafter, the memory region is designated as the reading-out effective region. Therefore, the updated control data are read out.

In contrast, in cases where an electric power is cut off during the renewal of the control data stored in either the first memory region or the second memory region which is not designated as the reading-out effective region, pieces of mixed data composed of pieces of control data relating to a current processing routine and pieces of control data relating to a previous processing routine are stored in a memory region not designated as the reading-out effective region. Also, because the electric power is cut off, the memory region is maintained not to be designated as the reading-out effective region, and pieces of previous control data relating to a previous processing routine performed just before the current processing routine are stored in the reading-out effective region. Therefore, the previous control data stored in the reading-out effective region are reliably read out.

Accordingly, the failure analysis of on-vehicle equipment can be reliably performed with the updated control data or the previous control data.

BRIEF DESCRIPTION OF THE DRAWINGS

The objects, features and advantages of the present invention will be apparent from the following description taken in conjunction with the accompanying drawings, in which:

FIG. 2 shows a configuration of a storage region of a backup RAM shown in FIG. 1;

FIG. 12 shows a configuration of a storage region of a backup RAM shown in FIG. 11;

FIG. 24 shows a configuration of a storage region of a backup RAM shown in FIG. 23;

DESCRIPTION OF THE PREFERRED EMBODIMENTS

Preferred embodiments of a data backup apparatus utilized in an electronic control system, which is employed in a failure-diagnosis apparatus for a vehicle, according to the present invention are described with reference to drawings.

Figure 1:
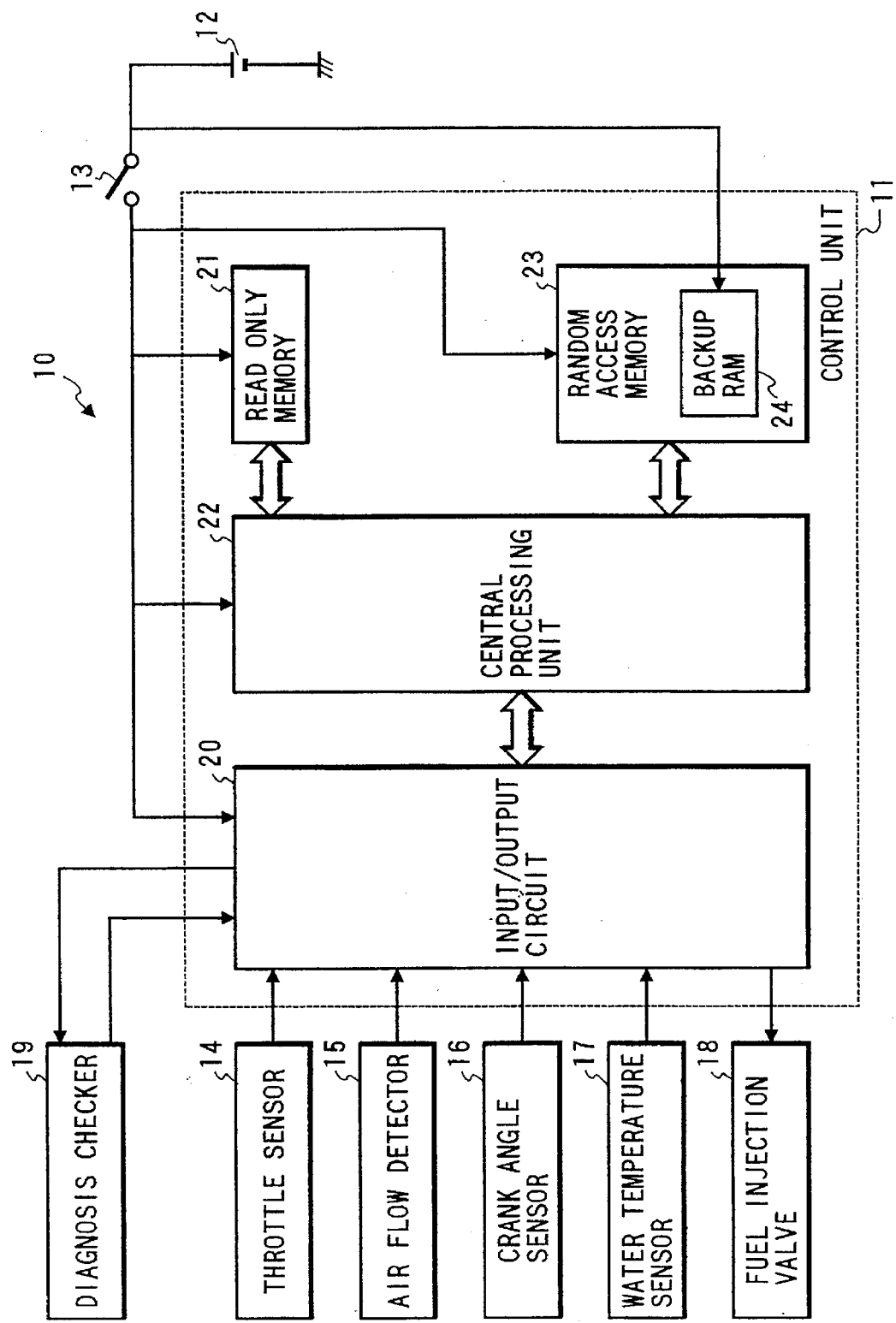
FIG. 1 is a block diagram showing an electronic configuration of a failure-diagnosis apparatus according to a first embodiment of the present invention.

FIG. 1 is a block diagram showing an electronic configuration of a failure-diagnosis apparatus according to a first embodiment of the present invention.

As shown in FIG. 1, a failure-diagnosis apparatus 10 comprises a control unit 11, a battery 12 for supplying electric power to the control unit 11 through an ignition switch 13, a throttle sensor 14 for detecting conditions of a throttle, an air flow detector 15 for detecting an air flow in a vehicle, a crank angle sensor 16 for detecting a crank angle, a water temperature sensor 17 for detecting a temperature in the vehicle, a fuel injection valve 18, and a diagnosis checker 19. The control unit 11 comprises an input/output (I/O) circuit 20 for receiving various sensing signals from the throttle sensor 14, the air flow detector 15, the crank angle sensor 16 and the water temperature sensor 17, a read only memory (ROM) 21 for storing a control program, a central processing unit (CPU) 22 for calculating an injection fuel amount by executing the control program stored in the 21 with the sensing signals received in the I/O circuit 20, outputting an output signal indicating the injection fuel amount to the fuel injection valve 18 through the I/O circuit 20, calculating operational conditions of an engine, such as the rotational number NE of a piston (or a rotor) in the engine, an amount GN of an intake air and the like according to the sensing signals, and determining a failure code $\alpha$ indicating a type of an unusual condition in the engine according to the operational conditions of the engine if necessary, and a random access memory (RAM) 23 including a backup RAM 24 for storing the operational conditions of the engine calculated in the CPU 22 as pieces of diagnosis data in the backup RAM 24 in cases where an unusual condition of on-vehicle equipment is detected by the throttle sensor 14, the air flow detector 15, the crank angle sensor 16 or the water temperature sensor 17.

The electric power is supplied from the battery 12 to the I/O circuit 20, the ROM 21, the CPU 22 and the RAM 23 through the ignition switch 13. Also, the electric power is directly supplied from the battery 12 to the backup RAM 24 of the RAM 23. Therefore, even though the electric power supplied to the backup RAM 24 is cut off by the ignition switch 13, pieces of diagnosis data stored in the backup RAM 24 are maintained.

In the above configuration, sensing signals produced by the throttle sensor 14, the air flow detector 15, the crank angle sensor 16 and the water temperature sensor 17 are transmitted to the CPU 22 through the I/O circuit 20. In the CPU 22, an injection fuel amount is calculated by executing the control program stored in the ROM 21 with the sensing signals, and an output signal indicating the injection fuel amount is output to the fuel injection valve 18 through the I/O circuit 20. Also, pieces of operational conditions (the rotational number NE of a piston in the engine, an amount GN of an intake air and the like) of the on-vehicle equipment, such as an engine, are calculated in the CPU 22 according to the sensing signals, and an unusual operational condition of the on-vehicle equipment is stored in the backup RAM 24 as pieces of diagnosis data in cases where the operational unusual condition of the on-vehicle equipment is found out in the CPU 22 according to the sensing signals.

Thereafter, when the diagnosis checker 19 is connected to the I/O circuit 20, the diagnosis checker 19 requests the control unit 11 to output the diagnosis data stored in the backup RAM 24, and the diagnosis data including the failure code are read out to the diagnosis checker 19. In the diagnosis checker 19, failure-diagnosis is performed with the diagnosis data to check which parts of the on-vehicle equipment are in an unusual condition.

FIG. 2 shows a configuration of a storage region of the backup RAM 24.

As shown in FIG. 2, the backup RAM 24 is composed of a plurality of addresses from an n-th address corresponding to a memory region R101, called a checking region, to an (n+5+$\alpha$+$\alpha$)-th address corresponding to a memory region R113, and each of the addresses has 16 bits as one word length. In the n-th address of the backup RAM 24, a piece of checking data denoting a backup RAM checking value is stored. A RAM region ranging from the (n+1)-th address to the (n+2+$\alpha$)-th address is called a temporary refuge region, and a RAM region ranging from the (n+3+$\alpha$)-th address to the (n+5+$\alpha$+$\alpha$)-th address is called a data access region in which the operational conditions calculated in the CPU 22 are stored as pieces of diagnosis data. In cases where pieces of diagnosis data stored in the CPU 22 are replaced with pieces of updated diagnosis data, the diagnosis data to be replaced are temporarily stored in the temporary refuge region as pieces of previous diagnosis data.

In the above configuration, a backup RAM checking value is stored as a piece of checking data in the checking region R101 corresponding to the n-th address to check whether or not the diagnosis data stored in the data access region of the backup RAM 24 are under renewal. In detail, in cases where the diagnosis data stored in the data access region of the backup RAM 24 are under renewal in a renewing period, a piece of first checking data such as a first HA checking data "00H", a first TW checking data "01H" or the like which indicates the renewing period is written in the checking region R101. In contrast, in cases where the backup RAM 24 is in an initial condition or the renewal of the diagnosis data stored in the data access region of the backup RAM 24 is finished in a renewal finishing period, a piece of second checking data "A5H" indicating the renewal finishing period is written in the checking region R101. The data "A5H","00H" and "01H" are expressed according to the hexadecimal notation.

Also, an unusual condition judging flag $Fu_1$ is stored in the memory region R102 placed at bits from an eighth bit to a fifteenth bit of the (n+1)-th address in the temporary refuge region, and the number $Nu_1$ of unusual condition judgements is stored in the memory region R103 placed at bits from a first bit to a seventh bit of the (n+1)-th address in the temporary refuge region. Pieces of previous diagnosis data, such as the rotational number NE in the engine, an amount GN of an intake air, a failure code $\alpha$ and the like, are stored in the memory regions R104 to R106. The previous diagnosis data are stored just before pieces of updated diagnosis data are stored in the backup RAM 24.

In addition, an HA unusual condition judging flag $Fu_2$ and the number $Nu_2$ of HA unusual condition judgements for judging the occurrence of an unusual condition of the throttle detected by the throttle sensor 14 are stored in the memory regions R107 and R108 of the (n+3+$\alpha$)-th address in the data access region, and a TW unusual condition judging flag $Fu_3$ and the number $Nu_3$ of TW unusual condition judgements for judging the occurrence of an unusual condition of the water temperature detected by the water temperature sensor 17 are stored in the memory regions R109 and R110 of the (n+4+$\alpha$)-th address in the data access region. Pieces of updated diagnosis data such as the rotational number NE in the engine, an amount GN of an intake air, a failure code $\alpha$ and the like are stored in the memory regions R111 to R113. The number of bytes in each of the memory regions R111 to R113 is the same as that in each of the memory regions R104 to R106.

Figure 3:
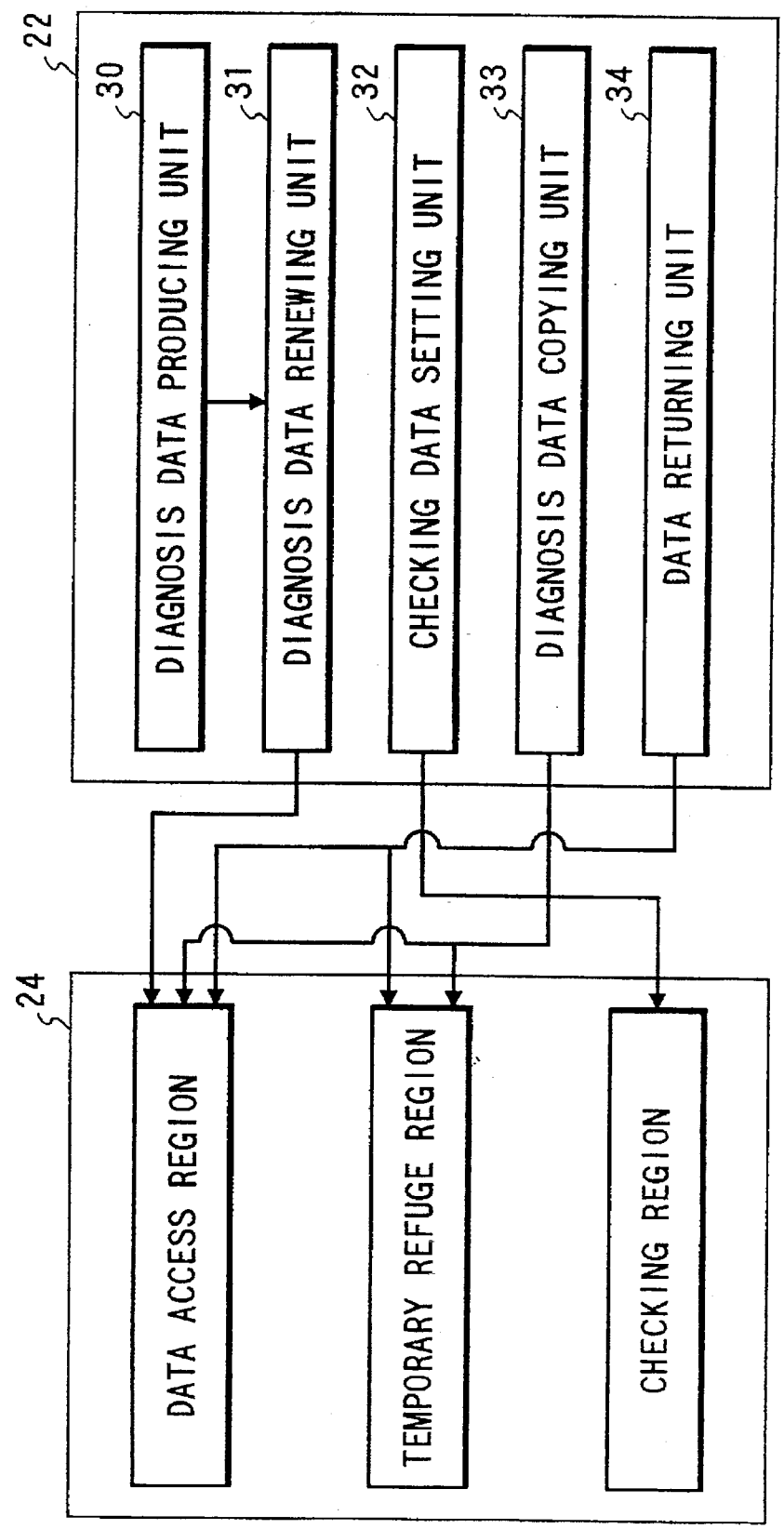
FIG. 3 shows a block diagram of a CPU and the backup RAM shown in FIG. 1.

FIG. 3 shows a block diagram of the CPU 22 and the backup RAM 24.

As shown in FIG. 3, the CPU 22 comprises a diagnosis data producing unit 30 for producing pieces of diagnosis data indicating an unusual condition of on-vehicle equipment detected by the throttle sensor 14, the air flow detector 15, the crank angle sensor 16 or the water temperature sensor 17, a diagnosis data renewing unit 31 for renewing the updated diagnosis data stored in the data access region of the backup RAM 24, a checking data setting unit 32 for setting an operational condition of the data access region in the renewing period by writing the first HA checking data "00H", the first TW checking data "01H" or the like indicating the renewing period of the data access region in the checking region R101 just before the updated diagnosis data stored in the data access region are renewed by the diagnosis data renewing unit 31 and setting an operational condition of the data access region in the renewal finishing period by writing the second checking data "A5H" indicating the renewal finishing period of the data access region in the checking region R101 just after the updated diagnosis data stored in the data access region are renewed by the diagnosis data renewing unit 31, a diagnosis data copying unit 33 for copying the updated diagnosis data stored in the data access region to the temporary refuge region as pieces of previous diagnosis data just before the updated diagnosis data stored in the data access region are renewed by the diagnosis data renewing unit 31, and a data returning unit 34 for returning the previous diagnosis data stored in the temporary refuge region to the data access region as the updated diagnosis data in cases where the first checking data is stored in the checking region R101 when electric power is again applied to the CPU 22. A data backup apparatus utilized in an electronic control system according to the first embodiment comprises the CPU 22 and the backup RAM 24.

In the above configuration of the CPU 22 and the backup RAM 24 concretizing the first embodiment according to the present invention, a data backup operation performed in the failure-diagnosis apparatus 10 is described with reference to FIGS. 4 to 10.

A processing routine performed in cases where an unusual condition of the throttle is detected by the throttle sensor 14 is initially described.

Figure 4:
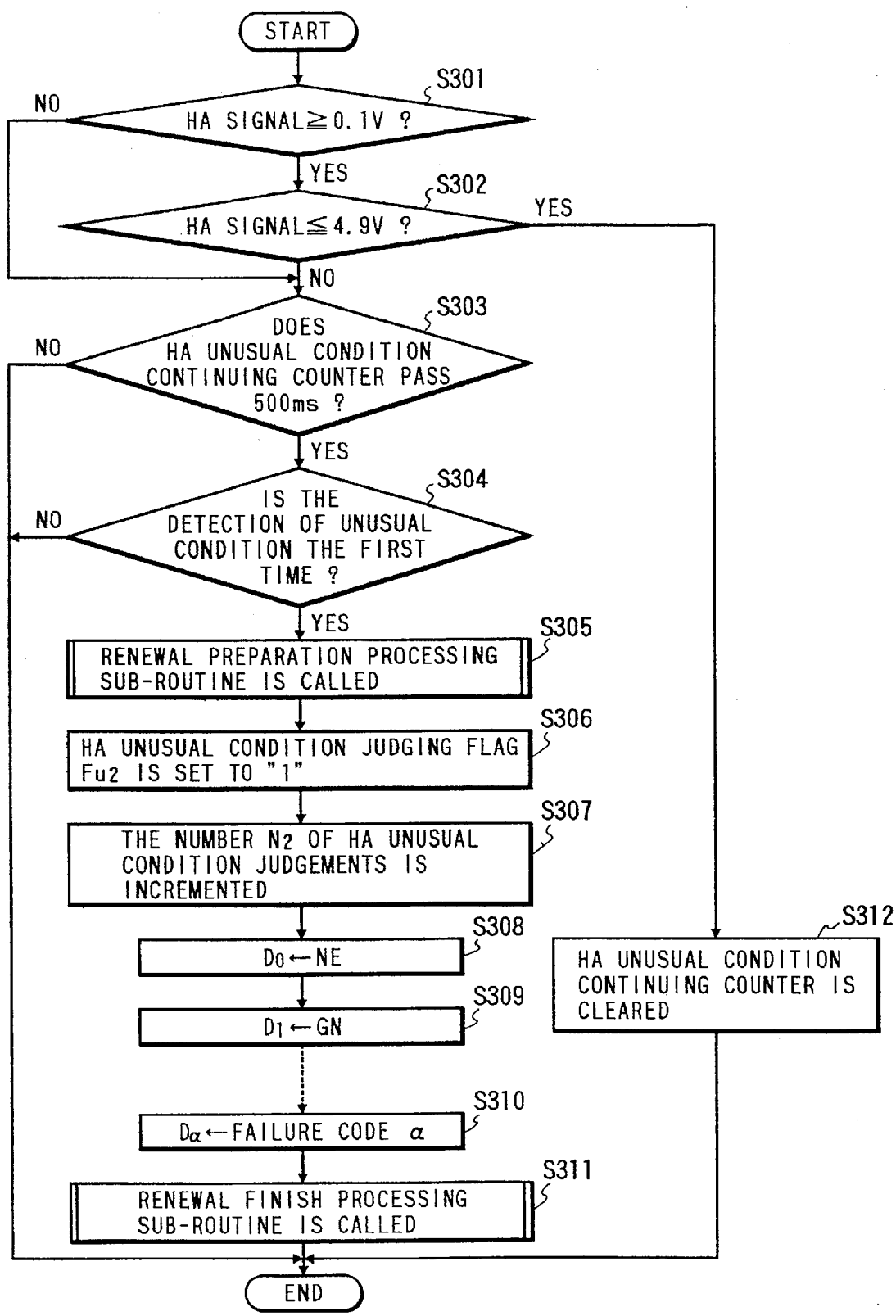
FIG. 4 shows a flow chart of a processing routine performed in the CPU and the backup RAM in cases where an unusual condition of the throttle is detected by a throttle sensor shown in FIG. 1.
Figure 5:
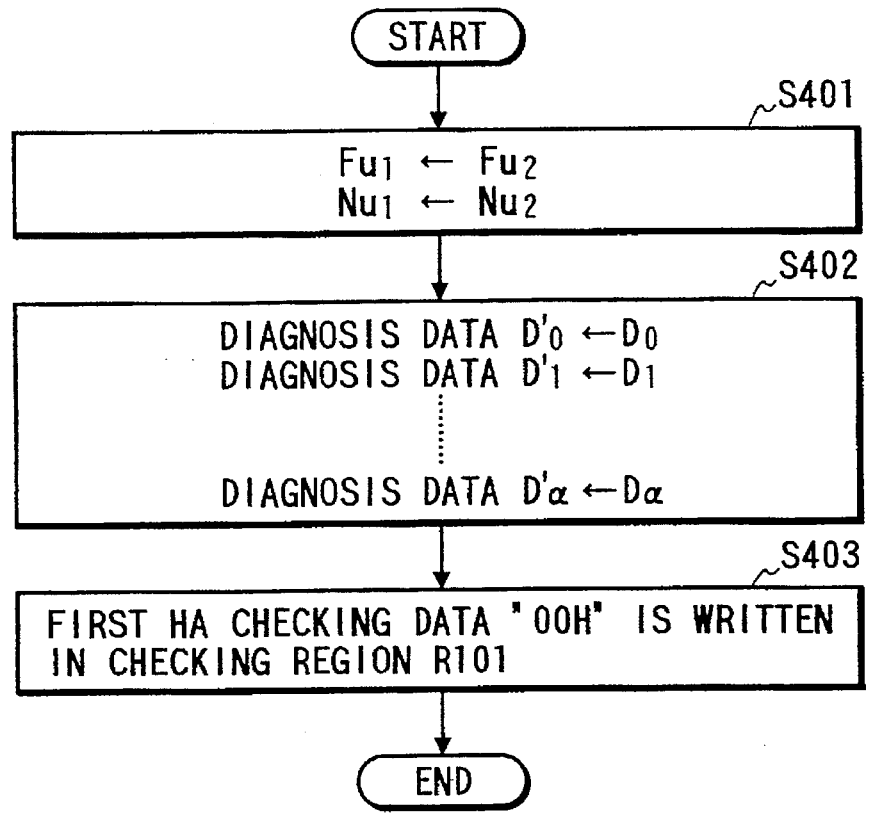
FIG. 5 shows a flow chart of a renewal preparation processing sub-routine for copying pieces of updated diagnosis data stored in a data access region of the backup RAM for the purpose of preparing for the renewal of the updated diagnosis data.
Figure 8:
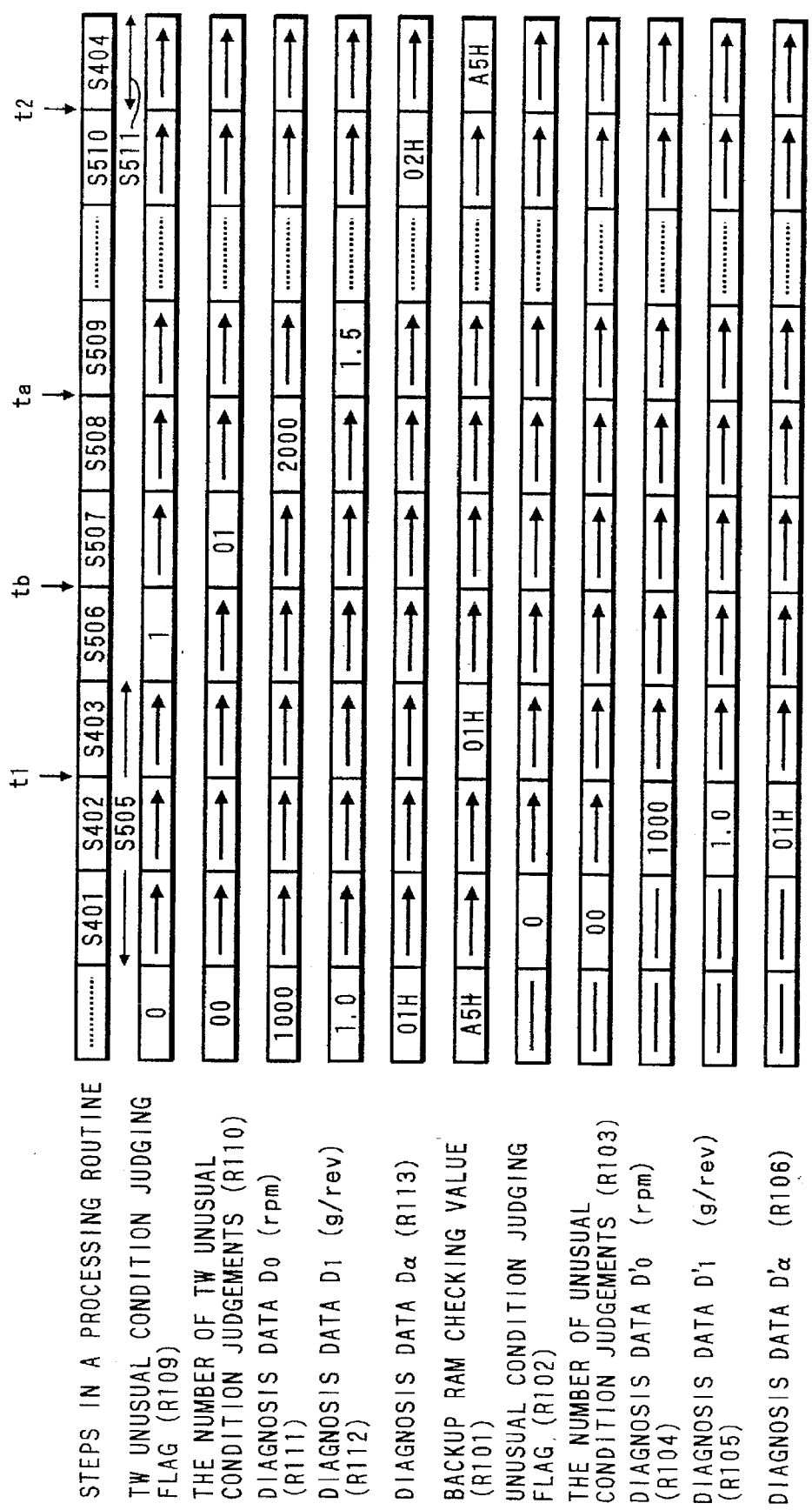
FIG. 8 shows a time chart showing a diagnosis data renewing operation in which pieces of updated diagnosis data stored in a data access region of the backup RAM are renewed.

FIG. 4 shows a flow chart of a processing routine performed in the CPU 22 and the backup RAM 24 in cases where an unusual condition of the throttle is detected by the throttle sensor. FIG. 5 shows a flow chart of a renewal preparation processing sub-routine for copying pieces of updated diagnosis data stored in the data access region of the backup RAM 24 for the purpose of preparing for the renewal of the updated diagnosis data. FIG. 8 shows a flow chart of a renewal finish processing sub-routine for finishing the processing routine shown in FIG. 4.

The condition of the throttle detected by the throttle sensor 14 is checked by the CPU 22 at prescribed intervals of 8.2 ms, and pieces of updated diagnosis data stored in the backup RAM 24 are renewed under the control of the CPU 22 in cases where an unusual condition of the throttle is detected by the throttle sensor 14 in a current processing routine.

In detail, as shown in FIG. 4, a sensing signal indicating a condition of the throttle detected by the throttle sensor 14 is transmitted to the CPU 22 through the I/O circuit 20 at prescribed intervals of 8.2 ms. The sensing signal from the throttle sensor 14 is called an HA signal. The CPU 22, judges in steps S301 and S302 whether or not a voltage level of the HA signal ranges from 0.1 V to 4.9 V. In cases where the voltage level of the HA signal ranges from 0.1 V to 4.9 V, the CPU 22 judges that the throttle is in a normal condition, and the procedure proceeds to a step S312. In the step S312, an HA unusual condition continuing counter is cleared, and the current processing routine is finished. The HA unusual condition continuing counter is incremented for each clock signal.

In contrast, in cases where the voltage level of the HA signal is not in the range from 0.1 V to 4.9 V, it is judged in a step S303 whether or not the counted value of the HA unusual condition continuing counter is equal to or more than a prescribed value corresponding to an HA unusual condition continuing period of 500 ms. In cases where the counted value of the HA unusual condition continuing counter is less than the prescribed value, the current processing routine is finished. In contrast, in cases where the counted value of the HA unusual condition continuing counter is equal to or more than the prescribed value, because an unusual condition of the throttle continues for the HA unusual condition continuing period of 500 ms or more, it is judged in the CPU 22 that the throttle is in an unusual condition. Thereafter, in a step S304, it is judged in the CPU 22 whether or not the detection of the unusual condition in the throttle by the throttle sensor 14 is the first time. In detail, it is judged whether or not the HA unusual condition judging flag $Fu_2$ stored in the memory region R107 is set to "0". In cases where the HA unusual condition judging flag $Fu_2$ stored in the memory region R107 is set to "1", it is judged that the detection of the unusual condition in the throttle is not the first time, and the current processing routine is finished because pieces of updated diagnosis data indicating the unusual condition of the throttle have been already produced in the diagnosis data producing means 30 and stored in the data access region of the backup RAM 24. In contrast, in cases where the HA unusual condition judging flag $Fu_2$ stored in the memory region R107 is set to "0", it is judged that the detection of the unusual condition in the throttle is the first time, so that the procedure proceeds to a step S305.

In the step S305, a renewal preparation processing sub-routine shown in FIG. 5 is called to copy pieces of updated diagnosis data, which are produced in the diagnosis data producing means 30 of the CPU 22 and are stored in the data access region of the backup RAM 24, to the data refuge region for the purpose of preparing for the renewal of the updated diagnosis data. As shown in FIG. 5, in a step S401 of the renewal preparation processing sub-routine, the HA unusual condition judging flag $Fu_2$ and the number $Nu_2$ of HA unusual condition judgements stored in the memory regions R107 and R108 of the data access region of the backup RAM 24 are copied to the memory regions R102 and R108 of the temporary refuge region under the control of the CPU 22 for the purpose of renewing the flag $Fu_2$ and the number $Nu_2$. That is, in cases where the unusual condition of the throttle is detected for the first time, the HA unusual condition judging flag $Fu_2$ is stored in the memory region R102 as an unusual condition judging flag $Fu_1$, and the number $Nu_2$ of HA unusual condition judgements is stored in the memory region R103 as the number $Nu_1$ of unusual condition judgements. Also, pieces of updated diagnosis data $D_o, D_1, - - -, D\alpha$ (the rotational number NE in the engine, an amount GN of an intake air, - - -, a failure code $\alpha$) stored in the memory regions R111 to R113 when a previous processing routine prior to the current processing routine is performed are copied to the memory regions R104 to R106 as pieces of previous diagnosis data $D'_o, D'_1, - - -, D''$ (the rotational number NE in the engine, an amount GN of an intake air, - - -, a failure code $\alpha$) under the control of the diagnosis data copying unit 33 of the CPU 22. Therefore, pieces of control data such as the flag $Fu_2$, the number $Nu_2$ and the updated diagnosis data $D_o, D_1, - - -, D\alpha$ stored in the previous processing routine are copied to the temporary refuge region in the steps S401 and S402 as an advance processing for a data renewing processing described in following steps S306 to S310.

Thereafter, in a step S403, a first HA checking data "00H" indicating a renewing period of the updated diagnosis data is written in the checking region R101 under the control of the checking data setting unit 32 of the CPU 22. That is, a second checking data "A5H" indicating that the backup RAM 24 is in an initial condition or the renewal of the updated diagnosis data stored in the data access region is finished is written in advance, and the second checking data "A5H" is replaced with the first HA checking data "00H" in the step S403.

Thereafter, pieces of updated diagnosis data relating to the unusual condition of the throttle detected in the current processing routine are written in the data access region of the backup RAM 24 under the control of the diagnosis data renewing unit 31 of the CPU 22 in following steps R306 to R310. In detail, the HA unusual condition judging flag $Fu_2$ of the memory region R107 is set to "1" under the control of the CPU 22 in a step S306 to indicate that the unusual condition in the throttle is detected in a current processing routine, and the number $Nu_2$ of HA unusual condition judgements of the memory region R108 is incremented in a step S307. In this case, the number $Nu_2$ of HA unusual condition judgements is incremented each time the step S306 is performed in a following processing routine, and the HA unusual condition judging flag $Fu_2$ set to "1" is maintained. Thereafter, pieces of updated diagnosis data calculated in the CPU 22 in the current processing routine are stored in the memory regions R111 to R113 of the backup RAM 24 one by one. That is, the updated diagnosis data such as the rotational number NE in the engine, an amount GN of an intake air, a failure code α indicating the unusual condition detected by the throttle sensor 14 and the like are useful to analyze the unusual condition of the throttle detected by the throttle sensor 14, the rotational number NE in the engine is written to the memory region R111 in a step S308, the amount GN of an intake air is written to the memory region R112 in a step S309, and the failure code α is written to the memory region R113 in a step S310. The failure code G is expressed by a symbol "01H" for the unusual condition of the throttle.

Figure 6:
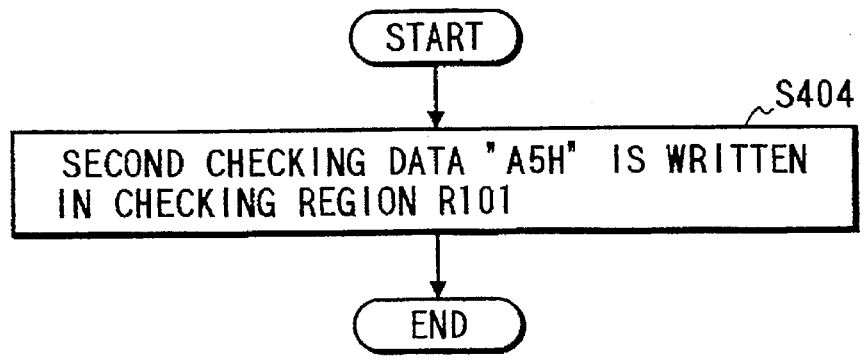
FIG. 6 shows a flow chart of a renewal finish processing sub-routine for finishing the processing routine shown in FIG. 4.

Thereafter, a renewal finish processing sub-routine for finishing the current processing routine is called in a step S311. As shown in FIG. 6, in a step S404 of the renewal finish processing sub-routine, the second checking data "A5H" indicating that the renewal of the updated diagnosis data stored in the data access region is finished is written in the checking region R101 as the backup RAM checking value under the control of the checking data setting unit 32 of the CPU 22, and the current processing routine is finished.

Accordingly, the refuge storage of the first HA checking data "00H" in the checking region R101 is maintained during the renewing period of the updated diagnosis data ranging from the step S403 to the step S404. Therefore, in cases where electric power supplied to the control unit 11 is cut off in the middle of the renewing period, the storage of the first HA checking data "00H" in the checking region R101 of the backup RAM 24 is maintained. In contrast, in cases where an electric power supplied to the control unit 11 is not cut off during the renewing period, the second checking data "A5H" is written in the checking region R101 of the backup RAM 24 after the renewing period.

Next, a processing routine performed in cases where an unusual condition of the water temperature is detected by the water temperature sensor 17 is described.

Figure 7:
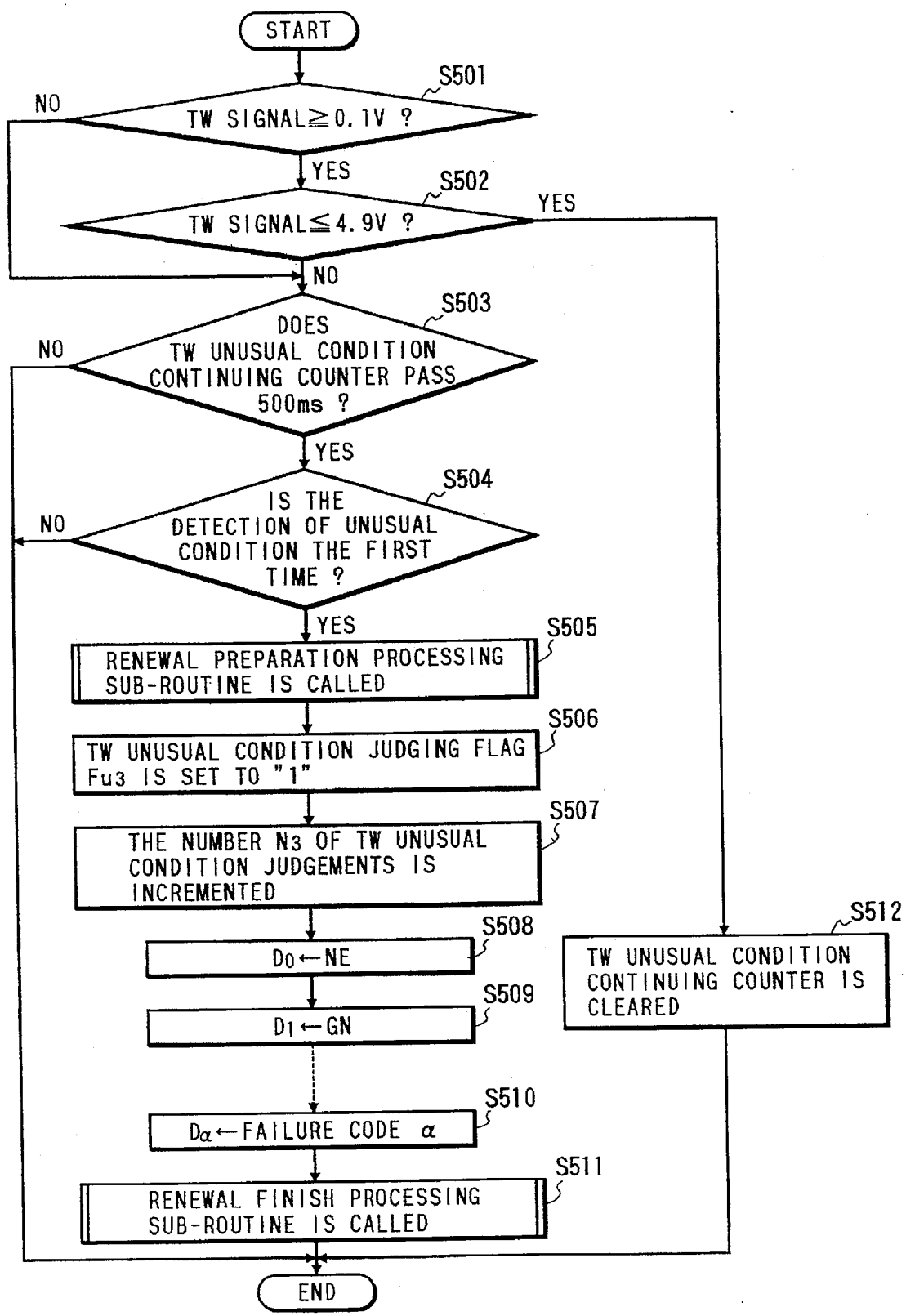
FIG. 7 shows a flow chart of a processing routine performed in the CPU and the backup RAM in cases where an unusual condition of a water temperature is detected by a water temperature sensor shown in FIG. 1.

FIG. 7 shows a flow chart of a processing routine performed in the CPU 22 and the backup RAM 24 in cases where an unusual condition of the water temperature is detected by the water temperature sensor 17.

A condition of the water temperature detected by the water temperature sensor 17 is checked by the CPU 22 at prescribed intervals of 8.2 ms, and pieces of updated diagnosis data stored in the backup RAM 24 are renewed under the control of the CPU 22 in cases where an unusual condition of the water temperature is detected by the water temperature sensor 17.

In detail, as shown in FIG. 7, a sensing signal indicating a condition of the water temperature detected by the water temperature sensor 17 is transmitted to the CPU 22 through the I/O circuit 20 at prescribed intervals of 8.2 ms. The sensing signal from the water temperature sensor 17 is called a TW signal. In the CPU 22, it is judged in steps S501 and S502 whether or not a voltage level of the TW signal ranges from 0.1 V to 4.9 V. In cases where the voltage level of the TW signal ranges from 0.1 V to 4.9 V, it is judged in the CPU 22 that the water temperature is in a normal condition, and the procedure proceeds to a step S512. In the step S512, a TW unusual condition continuing counter is cleared, and the current processing routine is finished. The TW unusual condition continuing counter is incremented for each clock signal.

In contrast, in cases where the voltage level of the TW signal is not in the range from 0.1 V to 4.9 V, it is judged in a step S503 whether or not the counted value of the TW unusual condition continuing counter is equal to or more than a prescribed value corresponding to a TW unusual condition continuing period of 500 ms. In cases where the counted value of the TW unusual condition continuing counter is less than the prescribed value, the current processing routine is finished. In contrast, in cases where the counted value of the TW unusual condition continuing counter is equal to or more than the prescribed value, because an unusual condition of the water temperature continues for the TW unusual condition continuing period of 500 ms or more, it is judged in the CPU 22 that the water temperature is in an unusual condition. Thereafter, in a step S504, it is judged in the CPU 22 whether or not the detection of the unusual condition in the water temperature by the water temperature sensor 17 is the first time. In detail, it is judged whether or not the TW unusual condition judging flag $Fu_3$ stored in the memory region R109 is set to "0". In cases where the TW unusual condition judging flag $Fu_3$ stored in the memory region R109 is set to "1", it is judged that the detection of the unusual condition in the water temperature is not the first time, so that the current processing routine is finished because pieces of updated diagnosis data relating to the unusual condition of the water temperature have been already stored in the data access region of the backup RAM 24. In contrast, in cases where the TW unusual condition judging flag $Fu_3$ stored in the memory region R109 is set to "0", it is judged that the detection of the unusual condition in the water temperature is the first time, so that the procedure proceeds to a step S505.

In the step S505, the renewal preparation processing sub-routine shown in FIG. 5 is called. As shown in FIG. 5, in the step S401 of the renewal preparation processing sub-routine, the TW unusual condition judging flag $Fu_3$ stored in the memory region R109 is copied to the memory region R102 of the temporary refuge region under the control of the CPU 22 as an unusual condition judging flag $Fu_1$, and the number $Nu_3$ of TW unusual condition judgements stored in the memory region R110 is copied to the memory region R103 of the temporary refuge region under the control of the CPU 22 as the number $Nu_1$ of unusual condition judgements. Also, pieces of updated diagnosis data $D_o, D_1, ---, D\alpha$ (the rotational number NE in the engine, an amount GN of an intake air, - - -, a failure code α) stored in the memory regions R111 to R113 when a previous processing routine prior to the current processing routine is performed are copied to the memory regions R104 to R106 as pieces of previous diagnosis data $D'_o, D'_1, ---, D'\alpha$ (the rotational number NE in the engine, an amount GN of an intake air, ---, a failure code $\alpha$) under the control of the diagnosis data copying unit 33 of the CPU 22. Therefore, pieces of control data such as the flag $Fu_3$, the number $Nu_3$ and the updated diagnosis data $D_o, D_1, ---, D\alpha$ stored in the previous processing routine are copied to the temporary refuge region in the steps S401 and S402 as an advance processing for a data renewing processing described in following steps S508 to S510. Thereafter, in the step S403, a first TW checking data "01H" indicating a renewing period of the updated diagnosis data is written in the checking region R101 under the control of the checking data setting unit 32 of the CPU 22.

Thereafter, pieces of updated diagnosis data relating to the unusual condition of the water temperature detected in the current processing routine are written in the data access region of the backup RAM 24 under the control of the diagnosis data renewing unit 31 of the CPU 22 in following steps R306 to R310. In detail, the TW unusual condition judging flag $Fu_3$ of the memory region R109 is set to "1" under the control of the CPU 22 in a step S506 to indicate that the unusual condition in the water temperature is detected in a current processing routine, and the number $Nu_3$ of TW unusual condition judgements of the memory region R110 is incremented in a step S507. In this case, the number $Nu_3$ of TW unusual condition judgements is incremented each time the step S506 is performed in a following processing routine, and the TW unusual condition judging flag $Fu_1$ set to "1" is maintained. Thereafter, pieces of updated diagnosis data calculated in the CPU 22 in the current processing routine are stored in the memory regions R111 to R113 of the backup RAM 24 one by one. That is, the updated diagnosis data such as the rotational number NE in the engine, an amount GN of an intake air, a failure code $\alpha$ indicating the unusual condition detected by the water temperature sensor 17 and the like are useful to analyze the unusual condition of the water temperature detected by the water temperature sensor 17, the rotational number NE in the engine is written to the memory region R111 in the step S508, an amount GN of an intake air is written to the memory region R112 in the step S509, and a failure code $\alpha$ is written to the memory region R113 in the step S510. The failure code $\alpha$ is expressed by a symbol "02H" for the unusual condition of the water temperature.

Thereafter, a renewal finish processing sub-routine for finishing the current processing routine is called in a step S511. As Shown in FIG. 6, in the step S404 of the renewal finish processing sub-routine, the backup RAM checking value of the memory region S201 is set to the second checking data "A5H" indicating that the renewal of the updated diagnosis data stored in the data access region is finished under the control of the checking data setting unit 32 of the CPU 22, and the current processing routine is finished.

Accordingly, the storage of the first TW checking data "01H" in the checking region R101 is maintained during the renewing period of the updated diagnosis data ranging from the step S403 to the step S404. Therefore, in cases where an electric power supplied to the control unit 11 is cut off in the middle of the renewing period, the storage of the first TW checking data "01H" in the checking region R101 of the backup RAM 24 is maintained. In contrast, in cases where an electric power supplied to the control unit 11 is not cut off during the renewing period, the second checking data "A5H" is stored in the checking region R101 of the backup RAM 24 after the renewing period.

Next, a diagnosis data renewing operation performed in the steps S505 to S511 shown in FIG. 7 (or the steps S401 to S404 shown in FIGS. 5 and 6) is described with reference to FIG. 8.

FIG. 8 shows a time chart showing a diagnosis data renewing operation in which the updated diagnosis data stored in the data access region of the backup RAM 24 are renewed.

In FIG. 8, a period from a first time t1 to a second time t2 corresponds to the renewing period of the updated diagnosis data. Also, pieces of diagnosis data $D_o, D_1, ---, D\alpha$ (NE=1000 rpm, GN=1.0 g/rev, a failure code "01H") are stored in advance in the memory regions R111 to R113 of the backup RAM 24 because an unusual condition of the throttle is detected by the throttle sensor 14 according to a previous processing routine performed prior to a current processing routine shown in FIG. 8.

As shown in FIG. 8, the TW unusual condition judging flag $Fu_3$ stored in the memory region R109 is copied to the memory region R102 of the temporary refuge region as an unusual condition judging flag $Fu_1$, and the number $Nu_3$ of TW unusual condition judgements stored in the memory region R110 is copied to the memory region R103 of the temporary refuge region as the number $Nu_1$ of unusual condition judgements in the steps S401, and the updated diagnosis data $D_o, D_1, ---, D\alpha$ stored in the previous processing routine are copied to the memory regions R104 to R106 in the step S402. Also, the first TW checking data "01H" indicating the renewing period of the updated diagnosis data is set to the checking region R101, so that pieces of control data such as the updated diagnosis data $D_o, D_1, ---, D\alpha$, the flag $Fu_3$ and the number $Nu_3$ are renewed during the renewing period in the steps S506 to S510. That is, the TW unusual condition judging flag $Fu_3$="1" is written in the memory region R109 in the step 408, the number $Nu_3$="1" of TW unusual condition judgements is written in the memory region R110 in the step 507, a piece of diagnosis data $D'_o$ (NE=2000 rpm) is written in the memory region R111 in the step 508, a piece of diagnosis data $D'_1$ (GN=1.5 g/rev) is written in the memory region R112 in the step 509, and a piece of diagnosis data $D'\alpha$ (a failure code "02H") is written in the memory region R113 in the step 810. Also, when the renewing time is finished at the second time t2, the second checking data "A5H" is written in the checking region R101 in the step S404.

Therefore, in cases where the electric power supplied to the control unit 11 is cut off in the middle of the renewing period ranging from the first time t1 to the second time t2, the backup RAM checking value of the memory region S201 remains set to the first TW checking data "01H". Accordingly, in cases where it is judged whether the backup RAM checking value is set to the first TW checking data "01H" or the second checking data "A5H", it can be detected whether or not the updated diagnosis data $D_o, D_1, ---, D\alpha$ are under renewal in the renewing period.

Next, a data return processing routine for returning the flag $Fu_1$, the number $Nu_1$ and the previous diagnosis data stored in the temporary refuge region of the backup RAM 24 to the data access region when an electric power cut off is again supplied to the control unit 11 is described with reference to FIG. 9.

Figure 9:
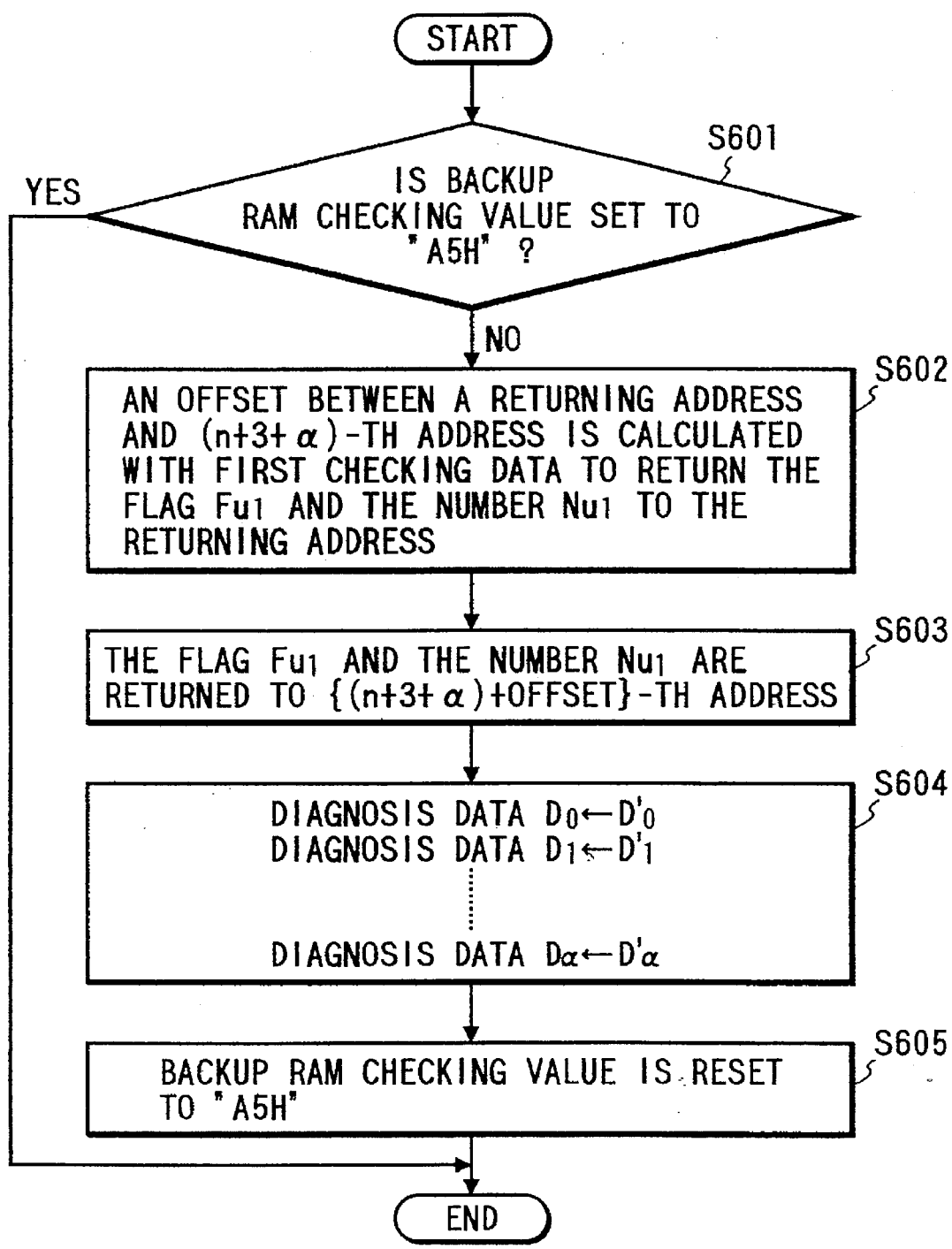
FIG. 9 is a flow chart showing a data return processing routine performed in the backup RAM under the control of a data returning unit of the CPU.

FIG. 9 is a flow chart showing a data return processing routine performed in the backup RAM 24 under the control of the data returning unit 34 of the CPU 22.

When the ignition switch is set to "on" to supply electric power to the control unit 11, a data return processing routine shown in FIG. 9 is started. In detail, in a step S601, it is judged in the CPU 22 whether or not the backup RAM checking value stored in the checking region R101 is set to the second checking data "A5H" indicating the finish of the data renewal. In cases where the backup RAM checking value is set to the second checking data "A5H", it is judged in the CPU 22 that the renewal of the updated diagnosis data stored in the data access region is successfully finished or any pieces of updated diagnosis data are not written in the data access region. Therefore, the data return processing routine is finished.

In contrast, in cases where the backup RAM checking value is not set to the second checking data "A5H" but set to the first checking data "00H","01H" or the like, it is judged in the CPU 22 that the electric power supplied to the control unit 11 is cut off in the middle of the renewal of the updated diagnosis data stored in the data access region, which is performed before the data return processing routine. Therefore, the flag $Fu_1$, the number $Nu_1$ and the previous diagnosis data stored in the temporary refuge region of the backup RAM 24 are returned to a returning address of the data access region according to the first checking data.

That is, in steps S602 and S603, the returning address to which the flag $Fu_1$ and the number $Nu_1$ temporarily stored in the memory regions R102 and R103 are to be returned is determined. In detail, an offset (or an address difference) between the returning address and the (n+3+α)-th address in which the HA unusual condition judging flag $Fu_2$ and the number $Nu_2$ of HA unusual condition judgements are stored is calculated on the basis of the (n+3+α)-th address in the step S602. The offset is equal to 0 in case of the unusual condition of the throttle because the first HA checking data "00H" is stored in the checking region R101, and the offset is equal to 1 in cases of the unusual condition of the water temperature because the first TW checking data "01H" is stored in the checking region R101.

Thereafter, in the step S603, the offset is added to the number of the (n+3+α)-th address to determine the number of the returning address, and the flag $Fu_1$ and the number $Nu_1$ stored in the memory regions R102 and R103 are written in the returning address. For example, the returning address is the (n+3+α)-th address in case of the unusual condition of the throttle, and the returning address is the (n+4+α)-th address ((n+3+α)+1=n+4+α) in case of the unusual condition of the water temperature.

Thereafter, in a step S604, the previous diagnosis data $D'_o, D'_1, ---, D'\alpha$ stored in the memory regions R104 to R106 are copied to the memory regions R111 to R113 one after another as the updated diagnosis data $D_o, D_1, ---, D\alpha$ to be read out under the control of the CPU 22.

Thereafter, in a step S605, the backup RAM checking value of the checking region R101 is reset to the second checking data "A5H", and the data return processing routine is finished.

Next, a relationship between a timing of the cut-off of the electric power and the updated diagnosis stored in the data access region is described with reference to FIG. 8.

As shown in FIG. 8, in cases where the electric power is, for example, cut off at a third time $t_a$ just after the step S508, the updated diagnosis data $D'_o$ (NE=2000 rpm) relating to the unusual condition of the water temperature obtained in the current processing routine is stored in the memory region R111. In contrast, the updated diagnosis data $D_1, D\alpha$ (GN= 1.0 g/rev, ---, and a failure code "01H") relating to the unusual condition of the throttle obtained in the previous processing routine are stored in the memory regions R112 and R113. Also, in cases where the electric power is, for example, cut off at a fourth time $t_b$ just after the step S506, the TW unusual condition judging flag $Fu_3$ is set to "1" in the memory region R109. In contrast, the number $Nu_3$ of TW unusual condition judgements remains set to "0" in the memory region R110. Therefore, a mismatch of the flag $Fu_3$="1" and the number $Nu_3$="0" is generated. In other words, in cases where the electric power is cut off in the middle of the data renewing period ranging from the first time t1 to the second time t2, pieces of mixed diagnosis data composed of the mixture of the updated diagnosis data obtained in the previous processing routine and the updated diagnosis data obtained in the current processing routine are stored in the data access region of the backup RAM 24.

However, because whether or not the electric power is cut off in the middle of the data renewing period is checked by examining the backup RAM checking value of the checking region R101, in cases where it is judged that the electric power is cut off in the middle of the data renewing period, the previous diagnosis data which are obtained in the previous processing routine and are stored in the temporary refuge region of the backup RAM 24 are returned to the data access region to replace the mixed diagnosis data with the previous diagnosis data, and the previous diagnosis data is regarded as pieces of updated diagnosis data according to the data return processing routine.

Accordingly, there is no probability that the mixed diagnosis data are read out to the diagnosis checker 19 under the control of the CPU 22. Also, because the mixed diagnosis data stored in the data access region is replaced with the previous diagnosis data, even though the processing routine shown in FIG. 4 or FIG. 7 are again performed, there is no probability that the mixed data is copied to the temporary refuge region. Therefore, any trouble resulting from the mixed diagnosis data does not occur.

Figure 10:
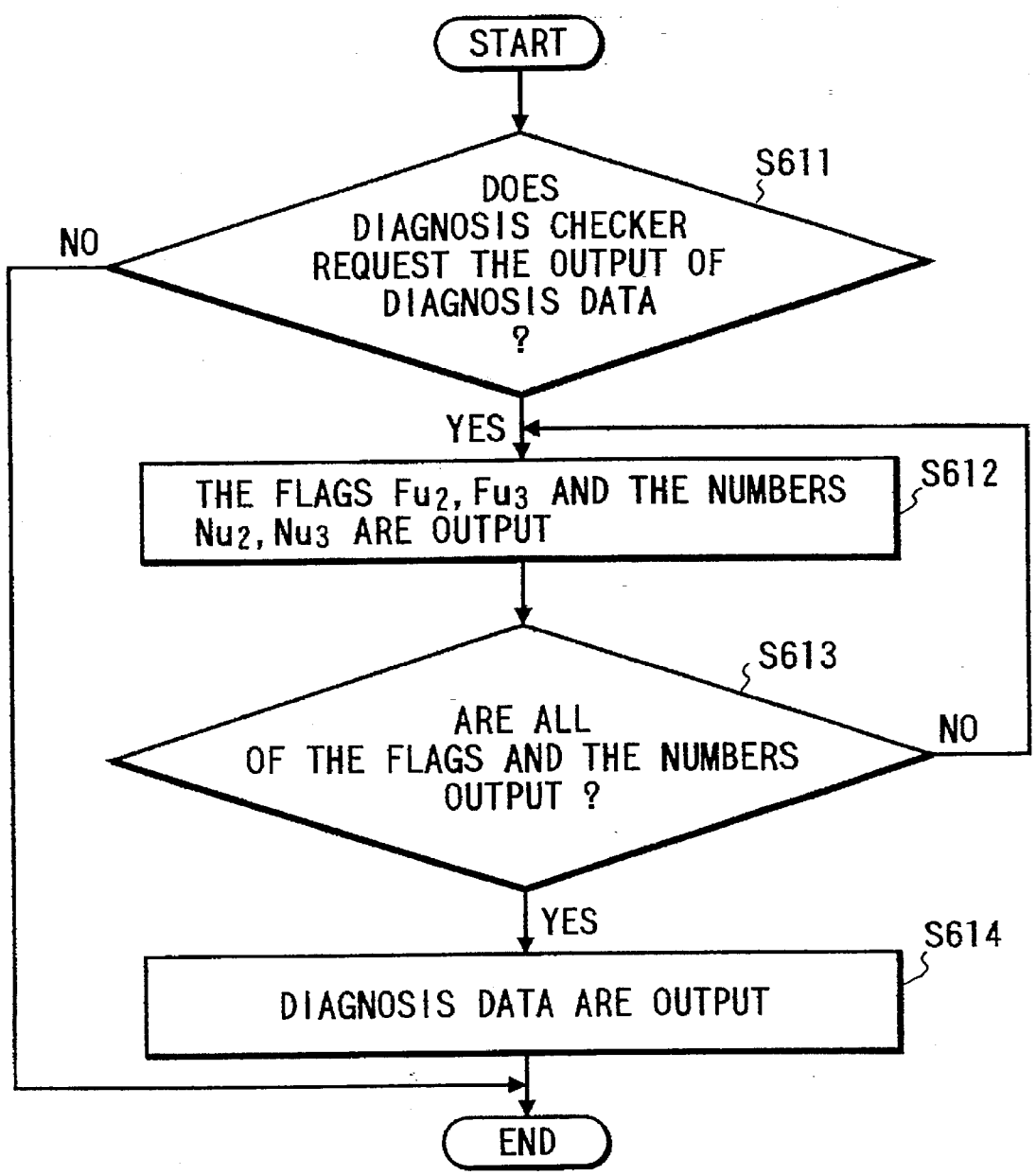
FIG. 10 is a flow chart showing a data check processing routine in which pieces of data stored in the data access region of the backup RAM are output to a diagnosis checker shown in FIG. 1.

After the data return processing routine shown in FIG. 9 is performed, a data check processing routine shown in FIG. 10 is performed to output the flags $Fu_2, Fu_3$, the numbers $Nu_2, Nu_3$ and the updated diagnosis data stored in the data access region of the backup RAM 24 to the diagnosis checker 19.

FIG. 10 is a flow chart showing a data check processing routine in which pieces of data stored in the data access region of the backup RAM 24 are output to the diagnosis checker 19.

As shown in FIG. 10, in a step S611, it is checked in the CPU 22 at regular intervals of 8.2 ms whether or not the diagnosis checker 19 requests the CPU 22 to output the flags $Fu_2, Fu_3$, the numbers $Nu_2, Nu_3$ and the updated diagnosis data stored in the data access region of the backup RAM 24 to the diagnosis checker 19. In cases where the diagnosis checker 19 requests the CPU 22, the flags $Fu_2, Fu_3$ and the numbers $Nu_2, Nu_3$ stored in the memory regions R107 to R110 are output one by one to the diagnosis checker 19 through the I/O circuit 20 in a step S612. In cases where it is judged in a step S613 that all of the flags $Fu_2, Fu_3$ and the numbers $Nu_2, Nu_3$ are output, the updated diagnosis data stored in the memory regions R111 to R113 of the backup RAM 24 are output one by one to the diagnosis checker 19 in a step S814. In the diagnosis checker 19, failure-diagnosis is performed with the flags $Fu_2, Fu_3$, the numbers $Nu_2, Nu_3$ and the updated diagnosis data to check which parts of the on-vehicle equipment are in an unusual condition.

In the first embodiment, a condition of the throttle or the water temperature is detected at prescribed intervals, and pieces of diagnosis data relating to an unusual condition of the throttle or the water temperature are stored in the backup RAM 24. However, the first embodiment is not limited to the detection of the condition of the throttle or the water temperature. For example, it is applicable that a condition of another on-vehicle equipment such as an air flow, a crank angle or the like be detected and pieces of diagnosis data relating to an unusual condition of the on-vehicle equipment be stored in the backup RAM 24.

Also, the first embodiment is applied for a data backup apparatus utilized in an electronic control system, which is composed of the CPU 22 and the backup RAM 24 concretized in the failure-diagnosis apparatus 10 for a vehicle. However, the first embodiment is not limited to the failure-diagnosis apparatus 10 for a vehicle. For example, it is applicable that a data backup apparatus utilized in an electronic control system according to the present invention be employed in a failure-diagnosis apparatus for a general apparatus.

Also, values "A5H", "00H" and "01H" expressed by the hexadecimal notation are utilized as the backup RAM checking value stored in the checking region R101. However, the first embodiment is not limited to the hexadecimal values "A5H", "00H" and "01H". For example, binary values "1" and "0" can be utilized as the backup RAM checking value.

Next, a second embodiment of a data backup apparatus utilized in an electronic control system, which is concretized in a failure-diagnosis apparatus for a vehicle, according to the present invention is described with reference to FIGS. 11 to 19.

Figure 11:
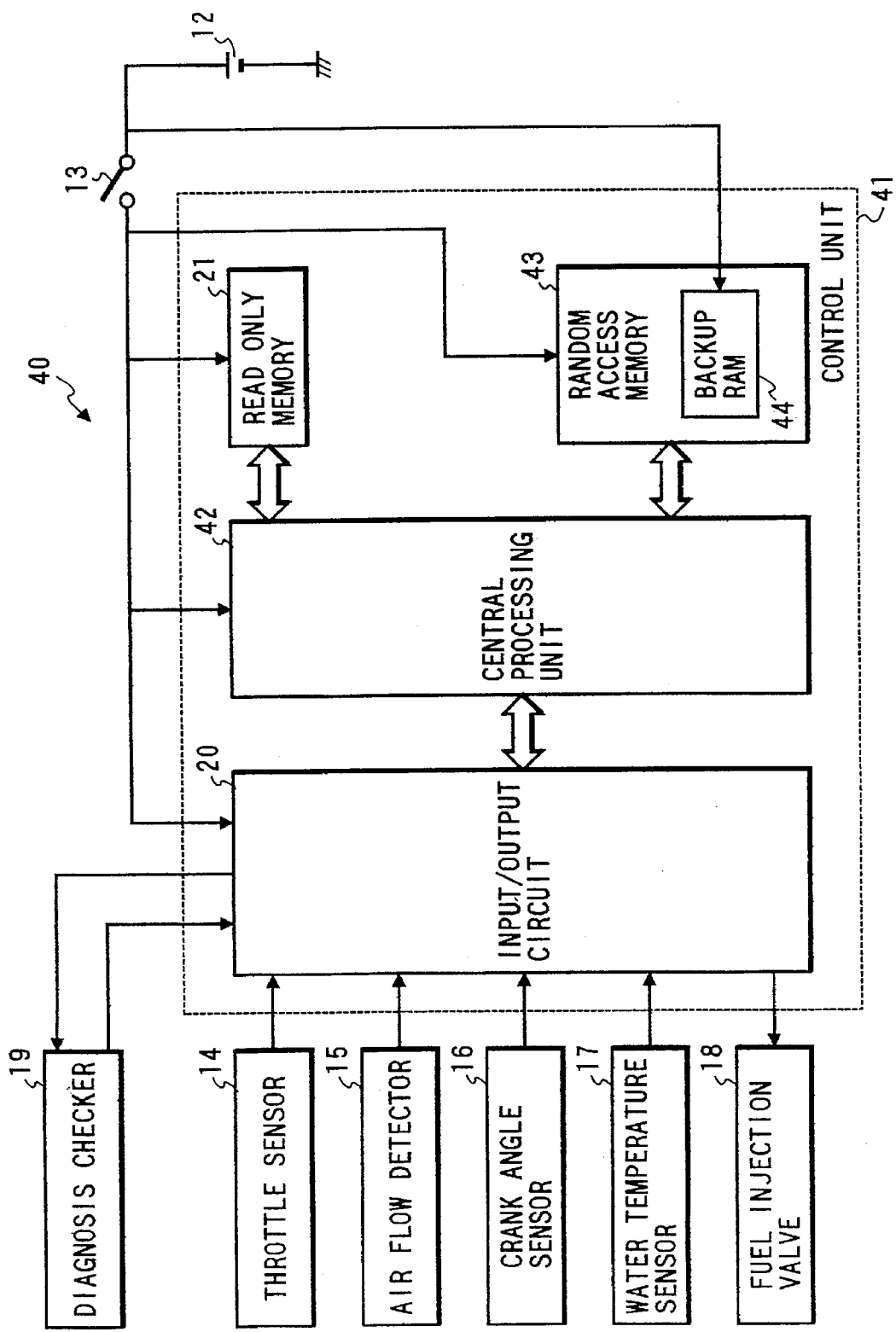
FIG. 11 is a block diagram showing an electronic configuration of a failure-diagnosis apparatus according to a second embodiment of the present invention.

FIG. 11 is a block diagram showing an electronic configuration of a failure-diagnosis apparatus according to a second embodiment of the present invention.

As shown in FIG. 11, a failure-diagnosis apparatus 40 comprises a control unit 41, the battery 12 for supplying an electric power to the control unit 41 through the ignition switch 18, the throttle sensor 14, the air flow detector 15, the crank angle sensor 16, the water temperature sensor 17, the fuel injection valve 18, and the diagnosis checker 19. The control unit 41 comprises the input/output (I/O) circuit 20, the read only memory (ROM) 21, a central processing unit (CPU) 42 for calculating an injection fuel amount by executing the control program stored in the ROM 21 with the sensing signals received in the I/O circuit 20, outputting an output signal indicating the injection fuel amount to the fuel injection valve 18 through the I/O circuit 20, calculating operational conditions of an engine such as the rotational number NE of a piston (or a rotor) in the engine, an amount GN of an intake air and the like according to the sensing signals, and determining a failure code α indicating a type of an unusual condition in the engine according to the operational conditions of the engine if necessary, and a random access memory (RAM) 43 including a backup RAM 44 for storing the operational conditions of the engine calculated in the CPU 42 as pieces of diagnosis data in the backup RAM 44 in cases where an unusual condition of on-vehicle equipment is detected by the throttle sensor 14, the air flow detector 15, the crank angle sensor 18 or the water temperature sensor 17. The electric power is directly supplied from the battery 12 to the backup RAM 44 of the RAM 43. Therefore, even though the electric power supplied to the backup RAM 44 is cut off by the ignition switch 13, pieces of diagnosis data stored in the backup RAM 44 are maintained.

In the above configuration, an output signal indicating the injection fuel amount is output to the fuel injection valve 18 through the I/O circuit 20 in the same manner as in the first embodiment. Also, pieces of operational conditions (the rotational number NE of a piston in the engine, an amount GN of an intake air and the like) of on-vehicle equipment, such as an engine, are calculated in the CPU 42 according to the sensing signals, and an unusual operational condition of the on-vehicle equipment is stored in the backup RAM 44 as pieces of diagnosis data in cases where the operational unusual condition of the on-vehicle equipment is found out in the CPU 42 according to sensing signals.

FIG. 12 shows a configuration of a storage region of the backup RAM 44.

As shown in FIG. 12, the backup RAM 44 is composed of a plurality of addresses ranging from an n-th address corresponding to a memory region R201 especially called a judging region to an (n+4+α+α)-th address corresponding to a memory region R210, and each of the addresses has 16 bits as one word length. In the n-th address of the backup RAM 44, a piece of renewal processing judgement data is stored in the judging region R201 placed at bits from an eighth bit to a fifteenth bit of the n-th address, and a piece of effective region designating data is stored in the memory region R202 placed at bits from a first bit to a fourteenth bit of the n-th address. The memory region R202 is especially called a designating region R202. Also, a first memory region A is composed of the memory regions R203 to R206 ranging from the (n+2+0)-th address to the (n+2+α)-th address, and a second memory region B is composed of the memory regions R207 to R210 ranging from the (n+3+α)-th address to the (n+4+α+α)-th address. A group of pieces of diagnosis data produced in the CPU 42 for each of processing routines is alternately stored in the first memory region A and the second memory region B.

In detail, the renewal processing judgement data is utilized to judge whether or not the diagnosis data stored in either the first memory region A or the second memory region B are under renewal. That is, in cases where the diagnosis data are under renewal in a renewing period, a piece of first judging data "5AH" indicating the renewing period is written in the judging region R201 as the renewal processing judgement data. In contrast, in cases where the backup RAM 44 is in an initial condition or the renewal of the diagnosis data stored in both the first and second memory regions A and B is finished in a renewal finishing period, a piece of second judging data "A5H" indicating the renewal finishing period is written in the Judging region R201 as the renewal processing Judgement data. The data "A5H" and "5AH" are expressed according to the hexadecimal notation.

The effective region designating data stored in the designating region R202 indicates an effective region selected from among the first and second memory regions A and B, and the diagnosis data are renewed or read out in/from the effective region. In cases where the first memory region A is selected as the effective region, a piece of first effective region designating data "A5H" is written in the designating region R202 as the effective region designating data, and a piece of second effective region designating data "5AH" is written in the designating region R202 as the effective region designating data.

In the memory region R203 of the first memory region A, a plurality of unusual judging flags $F_1$, such as an HA unusual judging flag $F_{HA1}$ indicating an unusual condition of the throttle detected by the throttle sensor 14, a TW unusual judging flag $F_{TW1}$ indicating an unusual condition of the water temperature detected by the water temperature sensor 17 and the like, are stored. For example, the HA unusual judging flag $F_{HA1}$ is stored in the fifteenth bit of the memory region R203, and the TW unusual judging flag $F_{TW1}$ is stored in the fourteenth bit of the memory region R203. Also, in the memory regions R204 to R206, pieces of diagnosis data $D_{A1}$, $D_{A2}$, - - -, $D_A\alpha$, such as the rotational number NE in the engine, an amount GN of an intake air, a failure code $\alpha$ and the like, are stored.

Also, in the memory region R207 of the second memory region B, a plurality of unusual judging flags $F_2$, such as an HA unusual judging flag $F_{HA2}$ indicating an unusual condition of the on-vehicle equipment detected by the throttle sensor 14, a TW unusual judging flag $F_{TW2}$ indicating an unusual condition of the on-vehicle equipment detected by the water temperature sensor 17 and the like, are stored. For example, the HA unusual judging flag $F_{HA2}$ is stored in the fifteenth bit of the memory region R207, and the TW unusual judging flag $F_{TW2}$ is stored in the fourteenth bit of the memory region R207. Also, in the memory regions R208 to R210, pieces of diagnosis data $D_{B1}$, $D_{B2}$, - - -, $D_B\alpha$, such as the rotational number NE in the engine, an amount GN of an intake air, a failure code $\alpha$ and the like, are stored. A group of the data stored in the memory regions R203 to R206 of the first memory region A and another group of the data stored in the memory regions R207 to R210 of the second memory region are selectively utilized according to the effective region designating data stored in the designating region R202.

Figure 13:
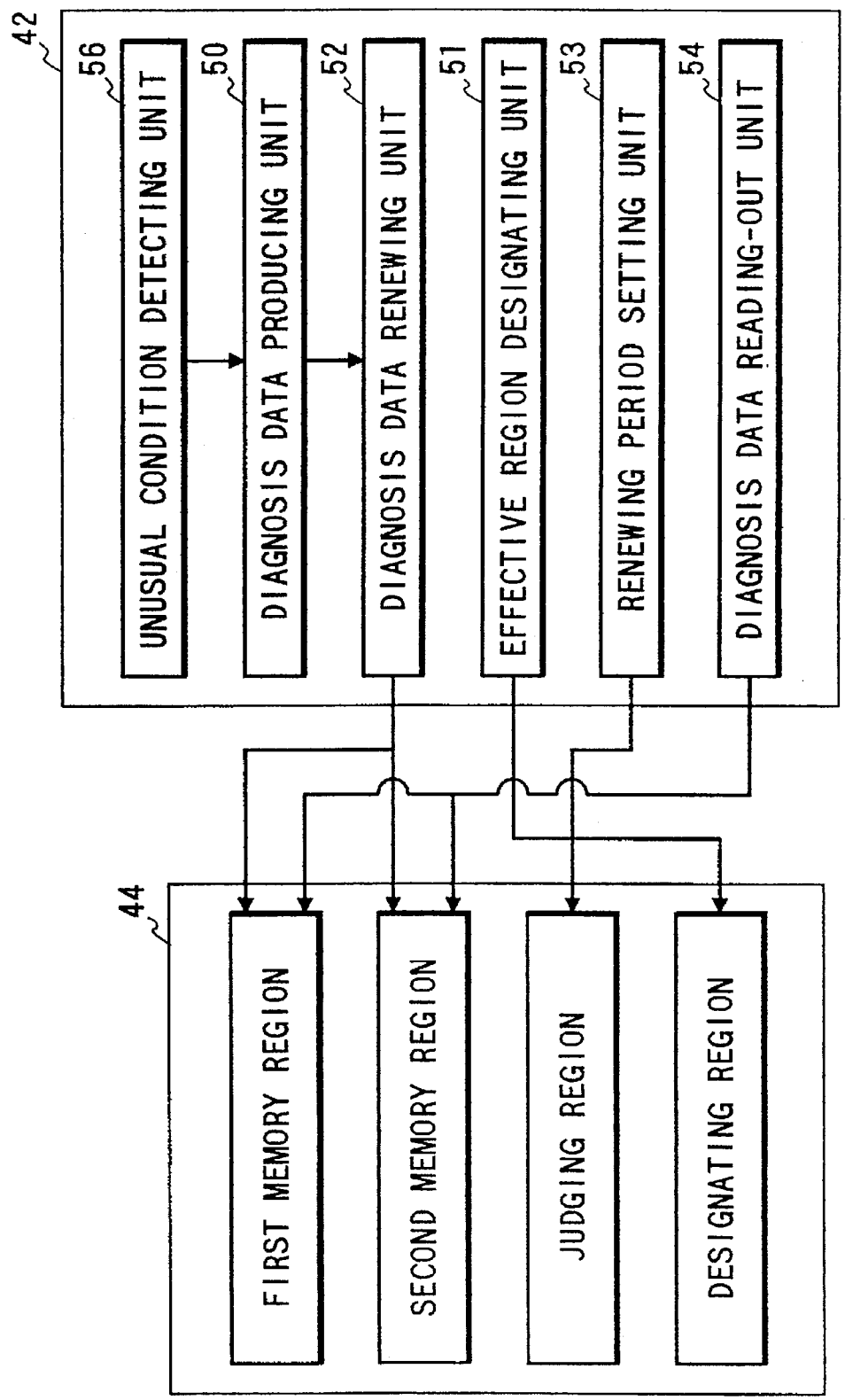
FIG. 13 shows a block diagram of a CPU and the backup RAM shown in FIG. 11.

FIG. 13 shows a block diagram of the CPU 42 and the backup RAM 44.

As shown in FIG. 13, the CPU 42 comprises an unusual condition detecting unit 56 for detecting that a sensing signal obtained by a sensor selected from the group of the throttle sensor 14, the air flow detector 15, the crank angle sensor 16 or the water temperature sensor 17 indicates an unusual condition of on-vehicle equipment, a diagnosis data producing unit 50 for producing pieces of diagnosis data expressing the unusual condition of the on-vehicle equipment detected by the unusual condition detecting unit 56 for each of processing routines, an effective region designating unit 51 for alternately designating the first and second memory regions A and B to an effective region for each of renewals of the diagnosis data by alternately writing the first and second effective region designating data "A5H" and "5AH" in the designating region R202, a diagnosis data renewing unit 52 for renewing pieces of diagnosis data which are stored in the effective region determined by the designating unit 51 in a current processing routine one by one, a renewing period setting unit 53 for setting an operational condition of the effective region determined by the designating unit 51 in the current processing routine in a diagnosis data renewing period just before the diagnosis data stored in the effective region are renewed by the diagnosis data renewing unit 52 and setting an operational condition of the effective region in a renewal finishing period just after the diagnosis data stored in the effective region are renewed by the diagnosis data renewing unit 52, and a diagnosis data reading-out unit 54 for reading out the diagnosis data stored in either the first or second memory region not designated as the effective region by the designating unit 51 in cases where the operational condition of the effect region is set in the diagnosis data renewing period by the renewing period setting unit 53 and reading out the diagnosis data stored in either the first or second memory region designated as the effective region by the designating unit 51 in cases where the operational condition of the effect region is set in the renewal finishing period by the renewing period setting unit 53.

The diagnosis data producing unit 50 functions as a driving condition detecting means for detecting a driving condition of the on-vehicle equipment in cases where an unusual condition of the on-vehicle equipment is detected by the unusual condition detecting unit 56.

In the above configuration of the CPU 42 and the backup RAM 44 utilizing the second embodiment according to the present invention, a data backup operation performed in the failure-diagnosis apparatus 40 is described.

A processing routine performed in cases where an unusual condition of the throttle is detected by the throttle sensor 14 is initially described.

Figure 14:
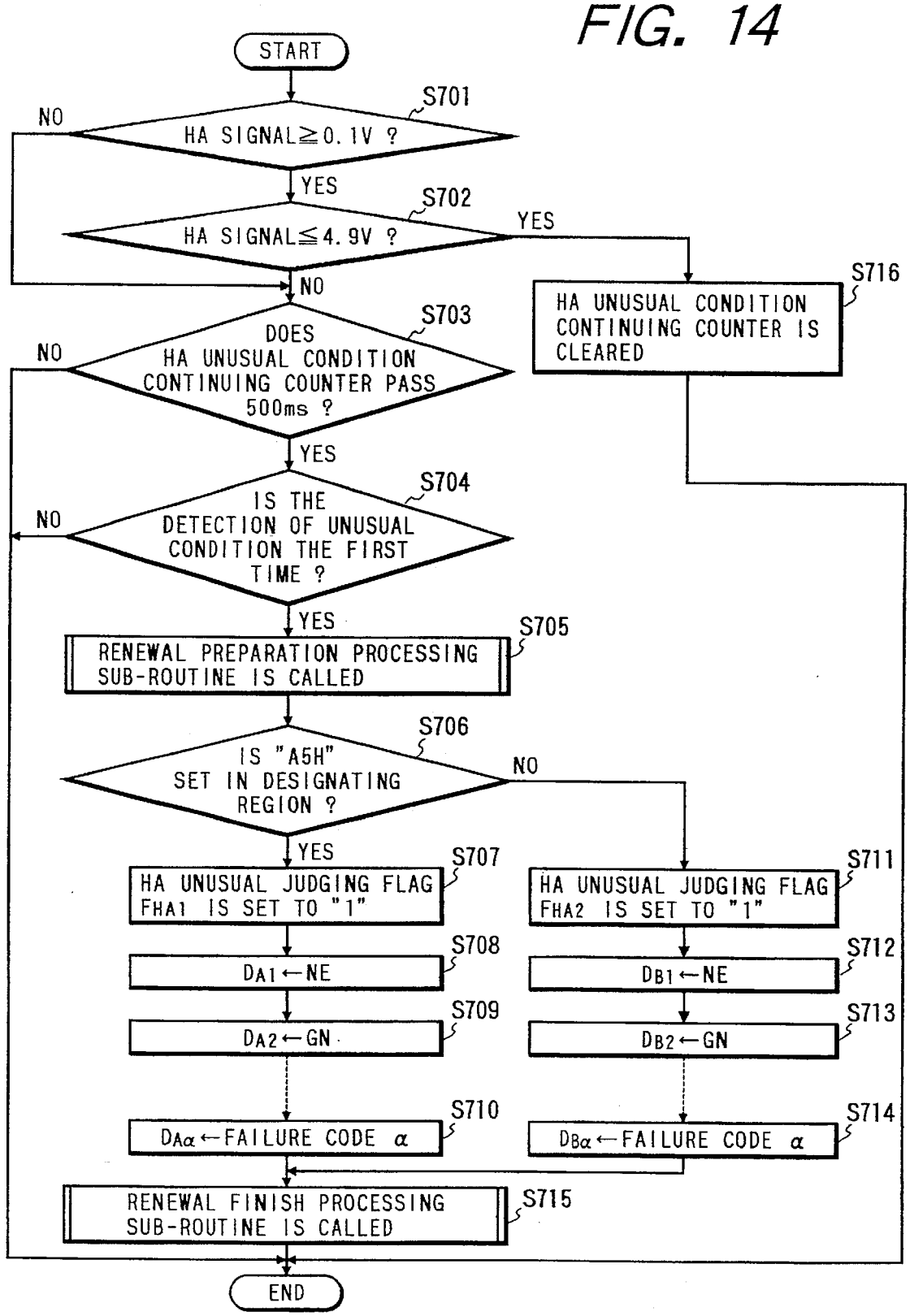
FIG. 14 shows a flow chart of a processing routine performed in the CPU and the backup RAM shown in FIG. 11 according to the second embodiment in cases where an unusual condition of a throttle is detected by a throttle sensor shown in FIG. 11.
Figure 15:
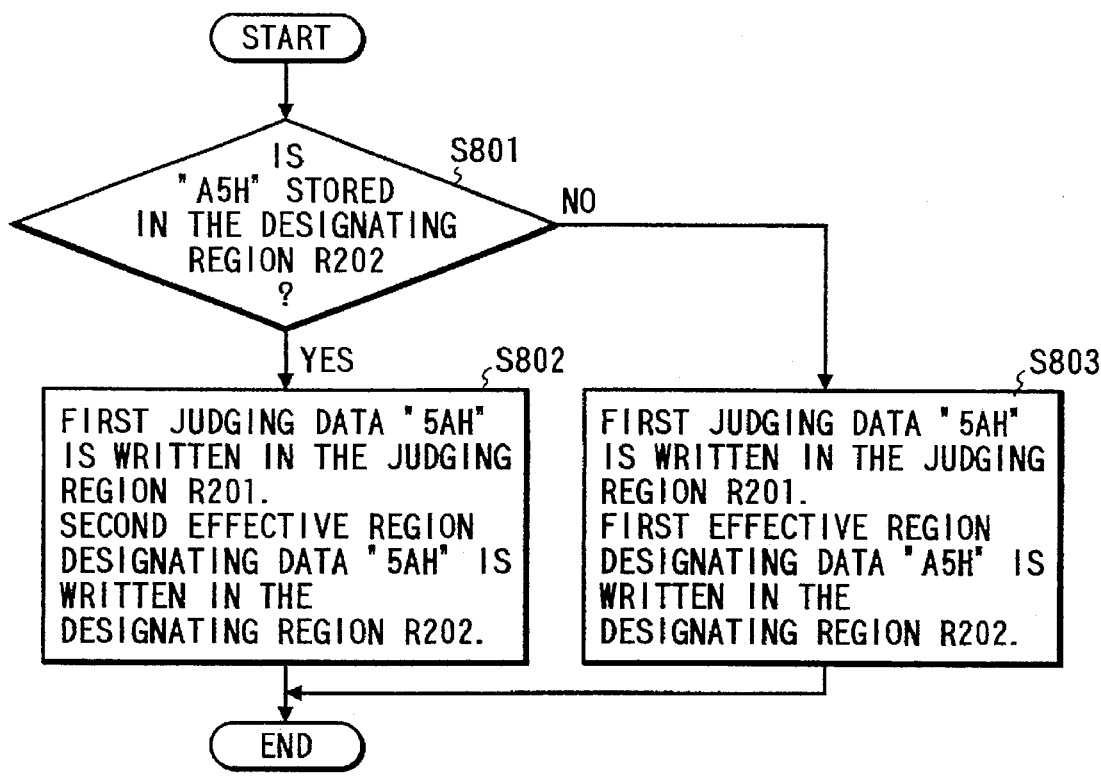
FIG. 15 shows a flow chart of a renewal preparation processing sub-routine for preparing a piece of renewal processing judgment data and a piece of effective region designating data for the renewal of pieces of diagnosis data stored in the backup RAM according to the second embodiment.
Figure 16:
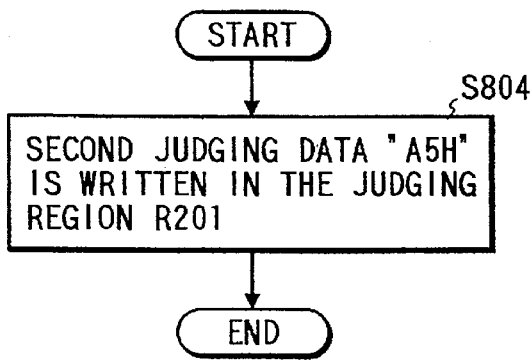
FIG. 16 shows a flow chart of a renewal finish processing sub-routine for finishing the processing routine shown in FIG. 14 according to the second embodiment.

FIG. 14 shows a flow chart of a processing routine performed in the CPU 42 and the backup RAM 44 according to the second embodiment in cases where an unusual condition of the throttle is detected by the throttle sensor. FIG. 15 shows a flow chart of a renewal preparation processing sub-routine for preparing the renewal processing judgment data and the effective region designating data for the renewal of pieces of diagnosis data stored in the backup RAM 44 according to the second embodiment. FIG. 16 shows a flow chart of a renewal finish processing sub-routine for finishing the processing routine shown in FIG. 14 according to the second embodiment.

A condition of the throttle detected by the throttle sensor 14 is checked by the CPU 42 at prescribed intervals of 8.2 ms, and pieces of diagnosis data stored in the backup RAM 44 are renewed under the control of the CPU 42 in cases where an unusual condition of the throttle is detected by the throttle sensor 14.

In detail, as shown in FIG. 14, a sensing signal indicating a condition of the throttle detected by the throttle sensor 14 is transmitted to the CPU 42 through the I/O circuit 20 at prescribed intervals of 8.2 ms. The sensing signal from the throttle sensor 14 is called an HA signal. In the CPU 42, it is judged in steps S701 and S702 whether or not a voltage level of the HA signal ranges from 0.1 V to 4.9 V. In cases where the voltage level of the HA signal ranges from 0.1 V to 4.9 V, it is judged in the unusual condition detecting unit 56 of the CPU 42 that the throttle is in a normal condition, and the procedure proceeds to a step S716. In the step S716, an HA unusual condition continuing counter is cleared, and the current processing routine is finished. The HA unusual condition continuing counter is incremented for each clock signal.

In contrast, in cases where the voltage level of the HA signal is not in the range from 0.1 V to 4.9 V, it is judged in a step S703 whether or not the count value of the HA unusual condition continuing counter is equal to or more than a prescribed value corresponding to an HA unusual condition continuing period of 500 ms. In cases where the count value of the HA unusual condition continuing counter is less than the prescribed value, the current processing routine is finished. In contrast, in cases where the count value of the HA unusual condition continuing counter is equal to or more than the prescribed value, because an unusual condition of the throttle continues for the HA unusual condition continuing period of 500 ms or more, it is judged in the unusual condition detecting unit 56 of the CPU 42 that the throttle is in an unusual condition. Thereafter, in a step S704, it is judged in the CPU 42 whether or not the detection of the unusual condition in the throttle by the throttle sensor 14 is the first time. In detail, it is judged whether or not the HA unusual condition judging flag $F_{HA1}$ stored in the memory region R203 or the HA unusual condition judging flag $F_{HA2}$ stored in the memory region R207 is set to "0". In cases where either the HA unusual condition judging flag $F_{HA1}$ or the HA unusual condition judging flag $F_{HA2}$ is set to "1", it is judged that the detection of the unusual condition in the throttle is not the first time, and the current processing routine is finished because pieces of diagnosis data indicating the unusual condition of the throttle have been already produced in the diagnosis data producing means 50 of the CPU 42 and stored in the backup RAM 44. In contrast, in cases where the HA unusual condition judging flags $F_{HA1}$ and $F_{HA2}$ are set to "0" together, it is judged that the detection of the unusual condition in the throttle is the first time, and the procedure proceeds to a step S705.

In the step S705, a renewal preparation processing sub-routine shown in FIG. 15 is called to prepare the renewal processing judgment data and the effective region designating data for the renewal of pieces of diagnosis data which are produced in the diagnosis data producing means 50 of the CPU 42 and are stored in the backup RAM 44. In this case, an initial value or the second judging data "A5H" is initially stored in the judging region R201. As shown in FIG. 15, in a step S801 of the renewal processing sub-routine, it is judged by the CPU 42 whether or not a piece of first effective region designating data "A5H" indicating the selection of the first memory region A as an effective region is stored in the designating region R202 in a previous processing routine performed just before the current processing routine. In cases where the first effective region designating data "A5H" is stored in the designating region R202, it is judged in the CPU 42 that pieces of updated diagnosis data produced in the previous processing routine are stored in the first memory region A. Therefore, a piece of first judging data "5AH" indicating a renewing period is written in the judging region R201 by the renewing period setting unit 53 of the CPU 42 in a step S802, and a piece of second effective region designating data "5AH" indicating the selection of the second memory region B as an effective region is written in the designating region R202 by the effective region designating unit 51 of the CPU 42 in the step S802 to renew pieces of previous diagnosis data stored in the second memory region B in following steps. Thereafter, the renewal processing sub-routine is finished.

In contrast, in cases where the first effective region designating data "A5H" is not stored in the designating region R202, it is judged in the CPU 42 that pieces of updated diagnosis data produced in the previous processing routine are stored in the second memory region B. Therefore, the first judging data "5AH" is written in the judging region R201 by the renewing period setting unit 53 of the CPU 42 in a step S803, and the first effective region designating data "A5H" indicating the selection of the first memory region A as an effective region is written in the designating region R202 by the effective region designating unit 51 of the CPU 42 in the step S803 to renew pieces of previous diagnosis data stored in the first memory region A in following steps. Thereafter, the renewal processing sub-routine is finished.

Thereafter, it is judged by the CPU 42 in a step S706 whether or not the first effective region designating data "A5H" indicating the selection of the first memory region A as the effective region is stored in the designating region R202. In cases where the first effective region designating data "A5H" is stored in the designating region R202 because the updated diagnosis data produced in the previous processing routine are stored in the second memory region B, the previous diagnosis data stored in the first memory region A are renewed in steps S707 to S710 by the diagnosis data renewing unit of the CPU 42 in detail, an HA unusual judging flag stored in the memory region R203 is set to "1" in the step S707. The setting of the HA unusual judging flag $F_{HA1}$ is maintained. Also, according to an operational condition of an engine in a current processing routine, the rotational number NE of a piston (or a rotor) in the engine is calculated by the diagnosis data producing unit 50 of the CPU 42 and is written in the memory region R204 as a piece of diagnosis data $D_{A1}$ in the step S708, an amount GN of an intake air is calculated by the diagnosis data producing unit 50 of the CPU 42 and is written in the memory region R205 as a piece of diagnosis data $D_{A2}$ in the step S709, and a failure code $\alpha$="01H" indicating an unusual condition of the throttle is determined by the CPU 42 and is written in the memory region R206 as a piece of diagnosis data $D_A\alpha$ in the step S710. The diagnosis data $D_{A1}, D_{A2}, ---, D_A\alpha$ are useful to analyze the unusual condition of the throttle.

In contrast, in cases where the first effective region designating data "A5H" is not stored in the designating region R202 because the updated diagnosis data produced in the previous processing routine are stored in the first memory region A, the previous diagnosis data stored in the second memory region B are renewed in steps S711 to S714 by the diagnosis data renewing unit 52 of the CPU 42. In detail, an HA unusual judging flag $F_{HA2}$ stored in the memory region R207 is set to "1" in the step S711. The setting of the HA unusual judging flag $F_{HA2}$ is maintained. Also, according to the operational condition of the engine in the current processing routine, the rotational number NE of a piston (or a rotor) in the engine is calculated by the diagnosis data producing unit 50 of the CPU 42 and is written in the memory region R208 as a piece of diagnosis data $D_{B1}$ in the step S712, an amount GN of an intake air is calculated by the diagnosis data producing unit 50 of the CPU 42 and is written in the memory region R209 as a piece of diagnosis data $D_{B2}$ in the step S713, and the failure code $\alpha$="01H" is determined by the CPU 42 and is written in the memory region R210 as a piece of diagnosis data $D_B\alpha$ in the step S714.

Thereafter, a renewal finish processing sub-routine for finishing the current processing routine is called in a step S715. As shown in FIG. 16, in a step S804 of the renewal finish processing sub-routine, the second judging data "A5H" indicating the renewal finishing period is written in the judging region R201 as the renewal processing judgement data by the renewing period setting unit 53 of the CPU 42, and the current processing routine is finished.

Next, a processing routine performed in cases where an unusual condition of the water temperature is detected by the water temperature sensor 17 is described according to the second embodiment.

Figure 17:
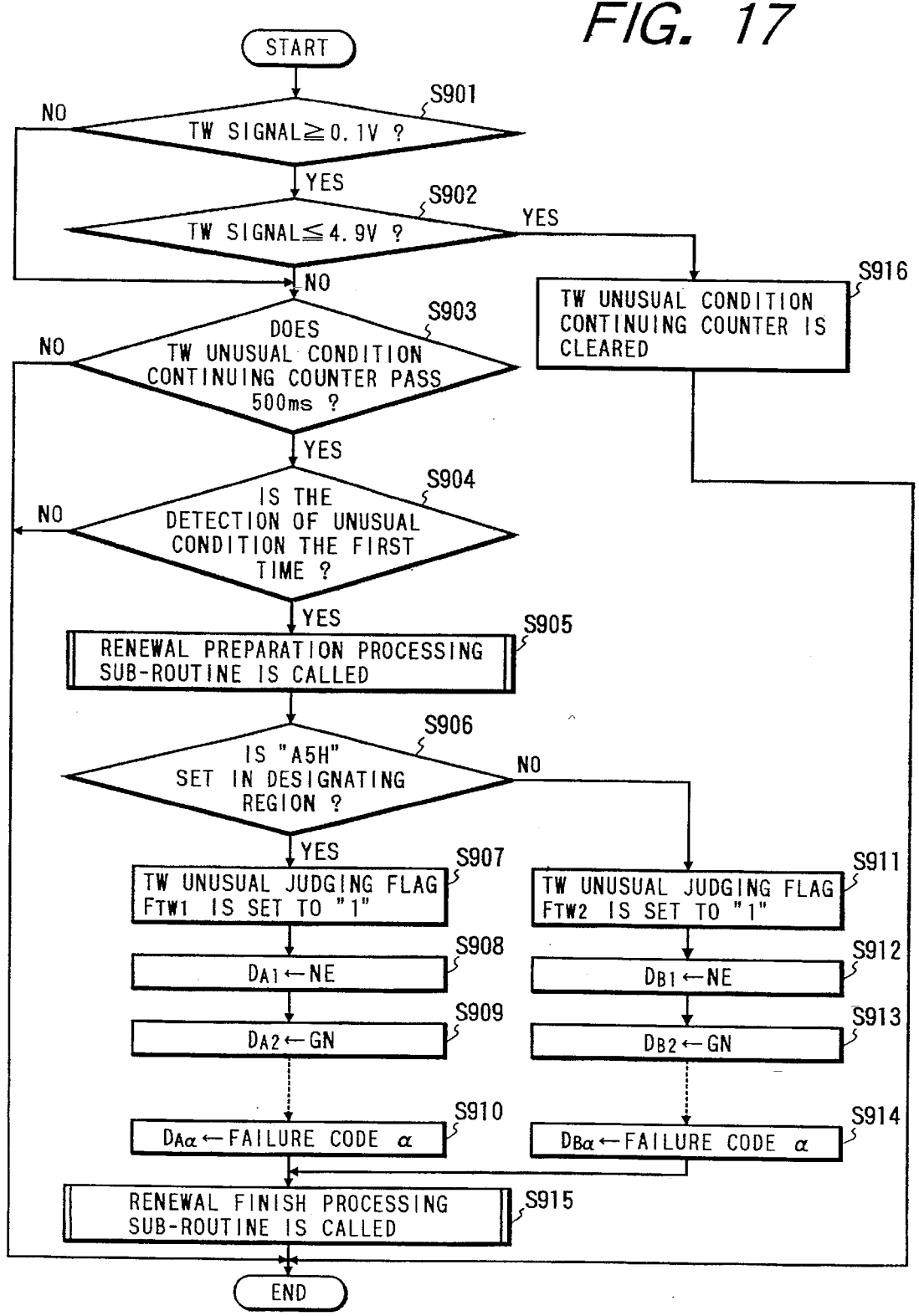
FIG. 17 shows a flow chart of a processing routine performed in the CPU and the backup RAM shown in FIG. 11 in cases where an unusual condition of a water temperature is detected by a water temperature sensor shown in FIG. 11.

FIG. 17 shows a flow chart of a processing routine performed in the CPU 42 and the backup RAM 44 in cases where an unusual condition of the water temperature is detected by the water temperature sensor 17.

A condition of the water temperature detected by the water temperature sensor 17 is checked by the CPU 42 at prescribed intervals of 8.2 ms, and pieces of updated diagnosis data stored in the backup RAM 44 are renewed under the control of the CPU 42 in cases where an unusual condition of the water temperature is detected by the water temperature sensor 17.

In detail, as shown in FIG. 17, a sensing signal indicating a condition of the water temperature detected by the water temperature sensor 17 is transmitted to the CPU 42 through the I/O circuit 20 at prescribed intervals of 8.2 ms. The sensing signal from the water temperature sensor 17 is called a TW signal. In the CPU 42, it is judged in steps S901 and S902 whether or not a voltage level of the TW signal ranges from 0.1 V to 4.9 V. In cases where the voltage level of the TW signal ranges from 0.1 V to 4.9 V, it is judged in the unusual condition detecting unit 56 of the CPU 42 that the water temperature is in a normal condition, and the procedure proceeds to a step S918. In the step S916, a TW unusual condition continuing counter is cleared, and the current processing routine is finished. The TW unusual condition continuing counter is incremented for each clock signal.

In contrast, in cases where the voltage level of the TW signal is not in the range from 0.1 V to 4.9 V, it is judged in a step S903 whether or not the count value of the TW unusual condition continuing counter is equal to or more than a prescribed value corresponding to a TW unusual condition continuing period of 500 ms. In cases where the count value of the TW unusual condition continuing counter is less than the prescribed value, the current processing routine is finished. In contrast, in cases where the count value of the TW unusual condition continuing counter is equal to or more than the prescribed value, because an unusual condition of the water temperature continues for the TW unusual condition continuing period of 500 ms or more, it is judged in the unusual condition detecting unit 58 of the CPU 42 that the water temperature is in an unusual condition. Thereafter, in a step S904, it is judged in the CPU 42 whether or not the detection of the unusual condition in the water temperature by the throttle sensor 17 is the first time. In detail, it is judged whether or not the TW unusual condition judging flag $F_{TW1}$ stored in the memory region R203 or the TW unusual condition judging flag $F_{TW2}$ stored in the memory region R207 is set to "0". In cases where either the HA unusual condition judging flag $F_{HA1}$ or the HA unusual condition judging flag $F_{HA2}$ is set to "1", it is judged that the detection of the unusual condition in the water temperature is not the first time, the current processing routine is finished because pieces of updated diagnosis data relating to the unusual condition of the water temperature have been already stored in the backup RAM 44. In contrast, in cases where the TW unusual condition judging flags $F_{TW1}$ and $F_{TW2}$ are set to "0" together, it is judged that the detection of the unusual condition in the water temperature is the first time, and the procedure proceeds to a step S905.

In the step S905, the renewal preparation processing sub-routine shown in FIG. 15 is performed in the same manner. That is, in cases where the first effective region designating data "A5H" is stored in the designating region R202, the first judging data "5AH" is written in the Judging region R201 by the renewing period setting unit 53 of the CPU 42, and the second effective region designating data "5AH" is written in the designating region R202 by the effective region designating unit 51 of the CPU 42. Also, in cases where the first effective region designating data "A5H" is not stored in the designating region R202, the first judging data "5AH" is written in the judging region R201 by the renewing period setting unit 53 of the CPU 42, and the first effective region designating data "A5H" is written in the designating region R202 by the effective region designating unit 51 of the CPU 42.

Thereafter, it is judged by the CPU 42 in a step S906 whether or not the first effective region designating data "A5H" is stored in the designating region R202. In cases where the first effective region designating data "A5H" is stored in the designating region R202, pieces of previous diagnosis data which are produced in a previous processing routine prior to a current processing routine and are stored in the first memory region A are renewed in steps S907 to S910 by the diagnosis data renewing unit 52 of the CPU 42. In detail, a TW unusual judging flag $F_{TW1}$ stored in the memory region R203 is set to "1" in the step S907. The setting of the TW unusual judging flag $F_{TW1}$ is maintained. Also, according to an operational condition of an engine in the current processing routine, the rotational number NE of a piston (or a rotor) in the engine is calculated by the diagnosis data producing unit 50 of the CPU 42 and is written in the memory region R204 as a piece of diagnosis data $D_{A1}$ in the step S908, an amount GN of an intake air is calculated by the diagnosis data producing unit 50 of the CPU 42 and is written in the memory region R205 as a piece of diagnosis data $D_{A2}$ in the step S909, and a failure code $\alpha$="02H" indicating an unusual condition of the water temperature is determined by the CPU 42 and is written in the memory region R206 as a piece of diagnosis data $D_A\alpha$ in the step S910. The diagnosis data $D_{A1}$, $D_{A2}$, - - -, $D_A\alpha$ are useful to analyze the unusual condition of the water temperature.

In contrast, in cases where the first effective region designating data "A5H" is not stored in the designating region R202, the previous diagnosis data stored in the second memory region B are renewed in steps S911 to S914 by the diagnosis data renewing unit 52 of the CPU 42. In detail, a TW unusual judging flag $F_{TW2}$ stored in the memory region R207 is set to "1" in the step S911. The setting of the TW unusual judging flag $F_{TW2}$ is maintained. Also, according to the operational condition of the engine in the current processing routine, the rotational number NE of a piston (or a rotor) in the engine is calculated by the diagnosis data producing unit 50 of the CPU 42 and is written in the memory region R208 as a piece of diagnosis data $D_{B1}$ in the step S912, an amount GN of an intake air is calculated by the diagnosis data producing unit 50 of the CPU 42 and is written in the memory region R209 as a piece of diagnosis data $D_{B2}$ in the step S913, and the failure code $\alpha$="02H" is determined by the CPU 42 and is written in the memory region R210 as a piece of diagnosis data $D_B\alpha$ in the step S914.

Thereafter, a renewal finish processing sub-routine for finishing the current processing routine is called in a step S915, and the second judging data "A5H" indicating the renewal finishing period is stored in the judging region R201 as the renewal processing Judgement data by the renewing period setting unit 53 of the CPU 42.

Accordingly, in cases where the first memory region A is selected as the effective region in the previous processing routine before the current processing routine, the second memory region B is selected as the effective region in the current processing routine, and the previous diagnosis data stored in the second memory region B can be replaced with pieces of newly defined updated diagnosis data produced in the CPU 42 in the current processing routine. In contrast, in cases where the second memory region B is selected as the effective region in the previous processing routine, the first memory region A is selected as the effective region in the current processing routine, and the previous diagnosis data stored in the first memory region A can be replaced with pieces of newly defined updated diagnosis data produced in the CPU 42 in the current processing routine.

Also, in cases where an unusual condition of the throttle (or the water temperature) is detected by the throttle sensor 14 (or the water temperature sensor 17), the first Judging data "5AH" indicating the renewing period is stored in the judging region R201 as the renewal processing judgement data during the renewing period ranging from the step S705 (or S905) to the step S715 (or S915). Therefore, in cases where an electric power supplied to the control unit 41 is cut off in the middle of the renewing period, the storage of the first judging data "5AH" is maintained in the judging region R201 of the backup RAM 44, and pieces of mixed data composed of the previous diagnosis data and the newly defined updated diagnosis data are stored in the first or second memory region A or B selected as the effective region in the current processing routine. Accordingly, in cases where the updated diagnosis data stored in the first or second memory region A or B which is not designated as the effective region in the current processing routine are read out to the diagnosis checker 19 on condition that the first judging data "5AH" is stored in the judging region R201 of the backup RAM 44, the judgment which portion of the on-vehicle equipment is in a failure condition can be correctly performed.

In contrast, in cases where an electric power supplied to the control unit 41 is not cut off during the renewing period, the second judging data "A5H" can be written in the judging region R201 of the backup RAM 44 after the renewing period. Accordingly, in cases where the newly defined updated diagnosis data stored in the first or second memory region A or B which is designated as the effective region in the current processing routine are read out to the diagnosis checker 19 on condition that the second judging data "A5H" is stored in the judging region R201 of the backup RAM 44, the judgment which portion of the on-vehicle equipment is in a failure condition can be correctly performed.

Next, a switching operation of the effective region performed in the steps S801 to S803 and a diagnosis data renewing operation performed in the steps S905 to S914 shown in FIG. 17 are described in detail with reference to FIG. 18.

Figure 18:
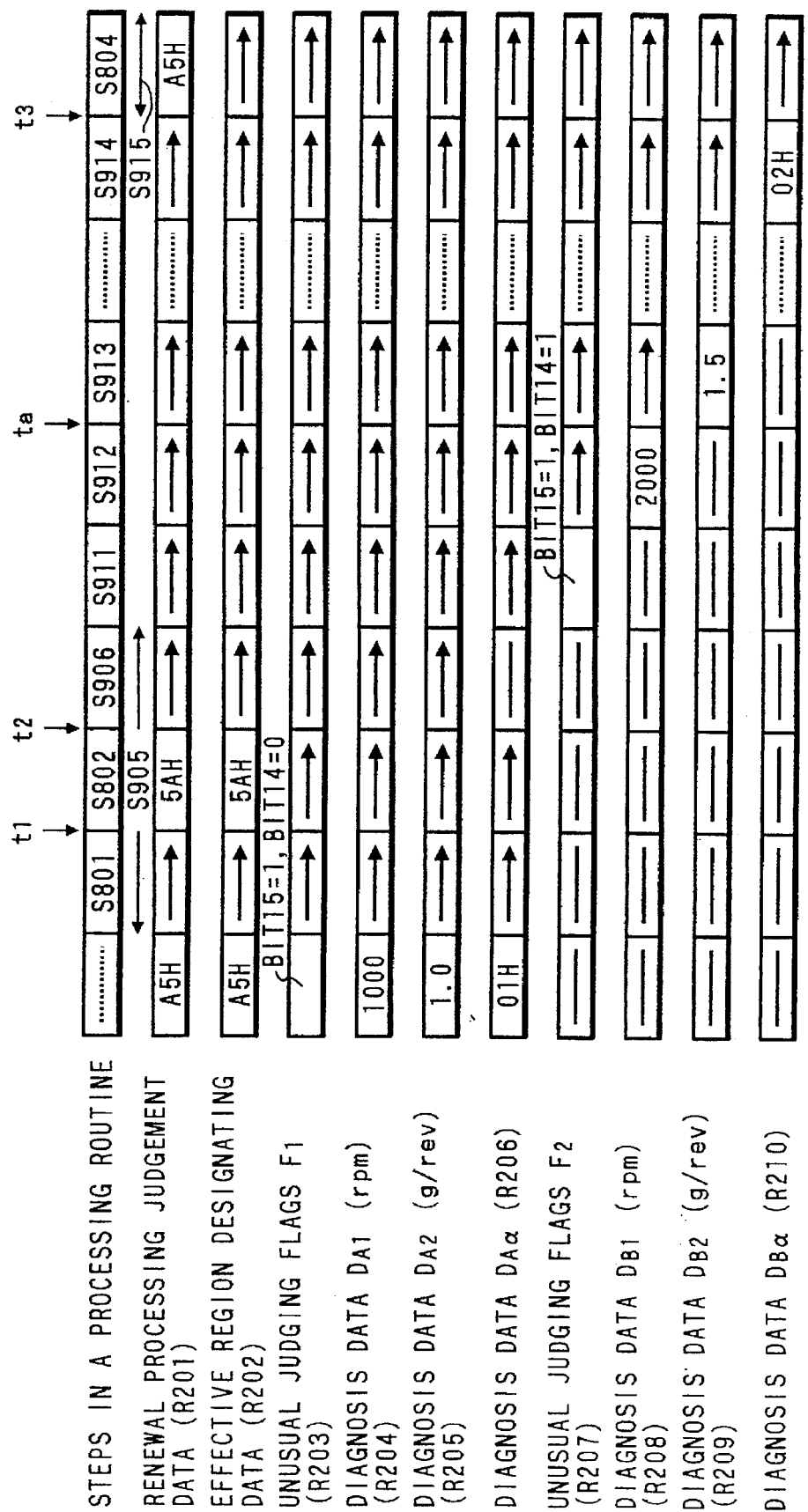
FIG. 18 shows a time chart showing a switching operation of an effective region and a diagnosis data renewing operation in which pieces of updated diagnosis data stored in the backup are renewed.

FIG. 18 shows a time chart showing a switching operation of the effective region and a diagnosis data renewing operation in which the updated diagnosis data stored in the backup RAM 44 are renewed.

In FIG. 18, the first memory region A is designated as the effective region in a previous processing routine, and the HA unusual judging flag $F_{HA1}$ and pieces of diagnosis data $D_{A1}$, $D_{A2}$, - - -, $D_A\alpha$ ($F_{HA1}$="1", NE=1000 rpm, GN=1.0 g/rev, a failure code "01H") are stored in advance in the memory regions R203 to R206 of the backup RAM 44 because an unusual condition of the throttle is detected by the throttle sensor 14 according to the previous processing routine. A period from a first time t1 to a second time t2 corresponds to the renewing period set as the operational condition of the effective region.

As shown in FIG. 18, the first judging data "5AH" indicating the renewing period is written in the judging region R201 at a first time t1 as the renewal processing judgement data, and the second effective region designating data "5AH" is written in the designating region R202 at the first time t1 as the effective region designating data (S802). Thereafter, the renewal of various pieces of data relating to the unusual condition of the water temperature is performed in the second memory region B selected as the effective region in the current processing routine during the renewing period ranging from a second time t2 to a third time t3. In detail, the TW unusual judging flag $F_{TW2}$ stored in the memory region R207 is set to "1" in the step S911, the rotational number NE=2000 rpm is written to the memory region R208 as a piece of diagnosis data $D_{B1}$ in the step S912, an amount GN=1.5 g/rev of an intake air is written to the memory region R209 as a piece of diagnosis data $D_{B2}$ in the step S913, and the failure code $\alpha$="02H" is written to the memory region R210 as a piece of diagnosis data $D_B\alpha$ in the step S914. Thereafter, the second judging data "A5H" indicating the renewal finishing period is written in the judging region R201 at the third time t3 as the renewal processing judgement data. Therefore, the first Judging data "5AH" indicating the renewing period is stored in the judging region R201 during the renewing period ranging from the first time t1 to the third time t3, and the second effective region designating data "5AH" indicating the selection of the second memory region B as the effective region is stored in the designating region R202 during the renewing period.

Accordingly, the operational condition of the first memory region A in which the HA unusual judging flag $F_{HA1}$ and the diagnosis data $D_{A1}$, $D_{A2}$, - - -, $D_A\alpha$ are stored is set in a renewal finishing condition, so that the HA unusual judging flag $F_{HA1}$ and the diagnosis data $D_{A1}$, $D_{A2}$, - - -, $D_A\alpha$ can be read out to the diagnosis checker 19 even though the diagnosis data $D_{B1}$, $D_{B2}$, - - -, $D_B\alpha$ stored in the second memory region B are under renewal. In contrast, pieces of mix data produced in the previous and current processing routines are transitionally stored during the renewing period.

Figure 19:
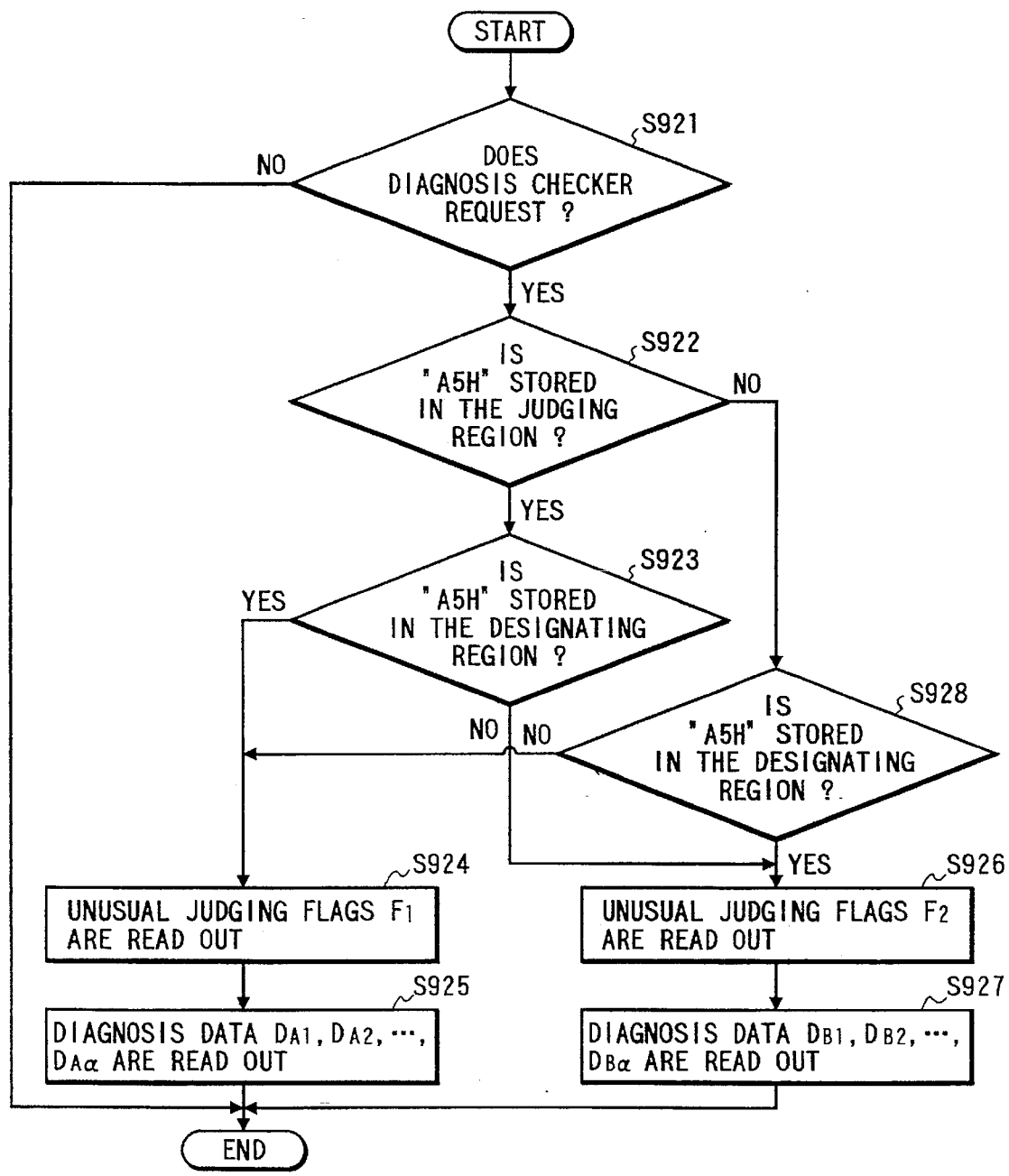
FIG. 19 is a flow chart showing a data check processing routine in which pieces of data stored in first or second memory region A or B of the backup RAM are output to a diagnosis checker shown in FIG. 11 according to the second embodiment.

After the processing routine shown in FIG. 14 or FIG. 17 is finished, a data check processing routine shown in FIG. 19 is performed to output the unusual judging flags and the diagnosis data stored in the first or second memory region A or B of the backup RAM 44 to the diagnosis checker 19.

FIG. 19 is a flow chart showing a data check processing routine in which pieces of data stored in the first or second memory region A or B of the backup RAM 24 are output to the diagnosis checker 19 according to the second embodiment.

As shown in FIG. 19, in a step S921, it is checked in the CPU 42 at regular intervals of 8.2 ms whether or not the diagnosis checker 19 requests the CPU 42 to output the unusual judging flags and the diagnosis data stored in the backup RAM 44 to the diagnosis checker 19. In cases where the diagnosis checker 19 requests the CPU 42, pieces of data stored in the first or second memory region A or B of the backup RAM 24 are output to the diagnosis checker 19 according to the renewal processing judgement data stored in the judging region R201 and the effective region designating data stored in the designating region R202. In detail, it is judged by the CPU 42 in a step S922 whether or not the second judging data "A5H" indicating the renewal finishing period is stored in the judging region R201.

In cases where the second judging data "A5H" is stored, it is judged by the CPU 42 in a step S923 whether or not the first effective region designating data "A5H" indicating the designation of the first memory region A as the effective region is stored in the designating region R202. In cases where the first effective region designating data "A5H" is stored, the unusual judging flags $F_1$ and the diagnosis data $D_{A0}$, $D_{A1}$, - - -, $D_A\alpha$ stored in the first memory region A are read out by the diagnosis data reading-out unit 54 of the CPU 42 and are output to the diagnosis checker 19 under the control of the CPU 42 through the I/O circuit 20 in steps S924 and S925. In contrast, in cases where the first effective region designating data "A5H" is not stored, it is regarded that the second memory region B is designated as the effective region, so that the unusual judging flags F2 and the diagnosis data $D_{B0}$, $D_{B1}$, - - -, $D_B\alpha$ stored in the second memory region B are read out by the diagnosis data reading-out unit 54 of the CPU 42 and are output to the diagnosis checker 19 under the control of the CPU 42 through the I/O circuit 20 in steps S926 and S927.

Also, in cases where the second judging data "A5H" is not stored, it is regarded that pieces of diagnosis data stored in the effective region are under renewal or the electric power is cut off in the middle of the renewal of the diagnosis data. Therefore, it is judged by the CPU 42 in a step S928 whether or not the first effective region designating data "A5H" is stored in the designating region R202. In cases where the first effective region designating data "A5H" is stored, the unusual judging flags $F_2$ and the diagnosis data $D_{B0}, D_{B1}, ---, D_B\alpha$ stored in the second memory region B are read out by the diagnosis data reading-out unit 54 of the CPU 42 and are output to the diagnosis checker 19 in the steps S926 and S927. In contrast, in cases where the first effective region designating data "A5H" is not stored, the unusual judging flags $F_1$ and the diagnosis data $D_{A0}, D_{A1}, ---, D_A\alpha$ stored in the first memory region A are read out by the diagnosis data reading-out unit 54 of the CPU 42 and are output to the diagnosis checker 19 in the steps S924 and S925.

Accordingly, because pieces of diagnosis data stored in the effective region are read out in cases where the renewal of the diagnosis data is finished or is not performed, there is no probability that pieces of mix data produced in the previous and current processing routines are output to the diagnosis checker 19. Also, because pieces of diagnosis data stored in either the first or second memory region A or B not designated as the effective region are read out in cases where the diagnosis data is under renewal or the electric power is cut off in the middle of the renewal of the diagnosis data, there is no probability that pieces of mix data produced in the previous and current processing routines are output to the diagnosis checker 19.

Next, a modification of the second embodiment is described.

Figure 20:
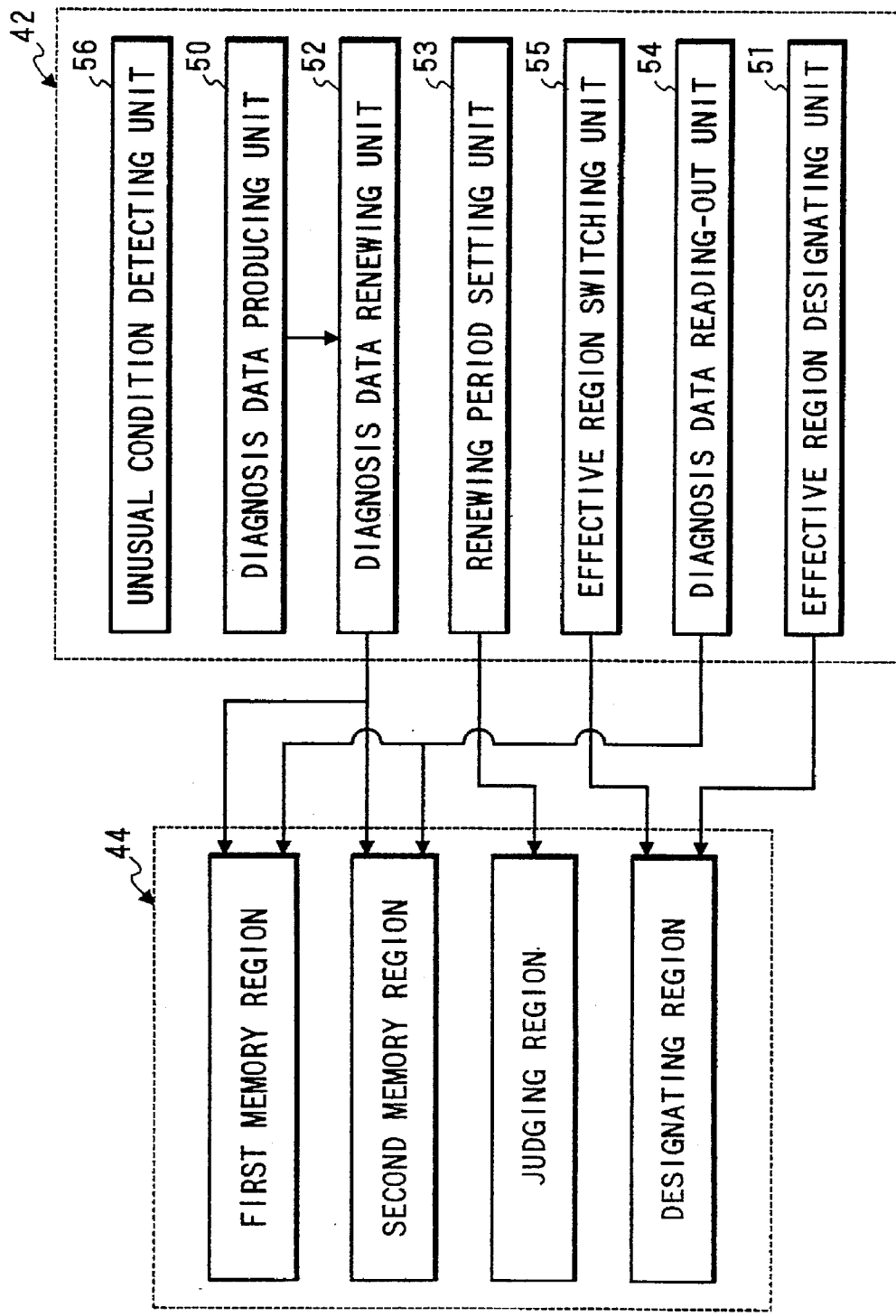
FIG. 20 shows a block diagram of the CPU and the backup RAM according to a modification of the second embodiment.

FIG. 20 shows a block diagram of the CPU 42 and the backup RAM 44 according to a modification of the second embodiment.

As shown in FIG. 20, the CPU 42 comprises the unusual condition detecting unit 56, the diagnosis data producing unit 50, the effective region designating unit 51, the diagnosis data renewing unit 52, the renewal processing judging unit 53, an effective region switching unit 55 for switching the effective region determined by the designating unit S1 in cases where the second judging data "A5H" indicating the renewing period is stored in the judging region R201, and the diagnosis data reading-out unit 54.

In the above configuration of the CPU 42 and the backup RAM 44 concretizing a modification of the second embodiment according to the present invention, a switching processing routine performed after the processing routine shown in FIG. 14 or FIG. 17 is described with reference to FIG. 21 according to a modification of the second embodiment. In the switching processing routine, the effective region is switched when an electric power cut off is again supplied to the control unit 41.

Figure 21:
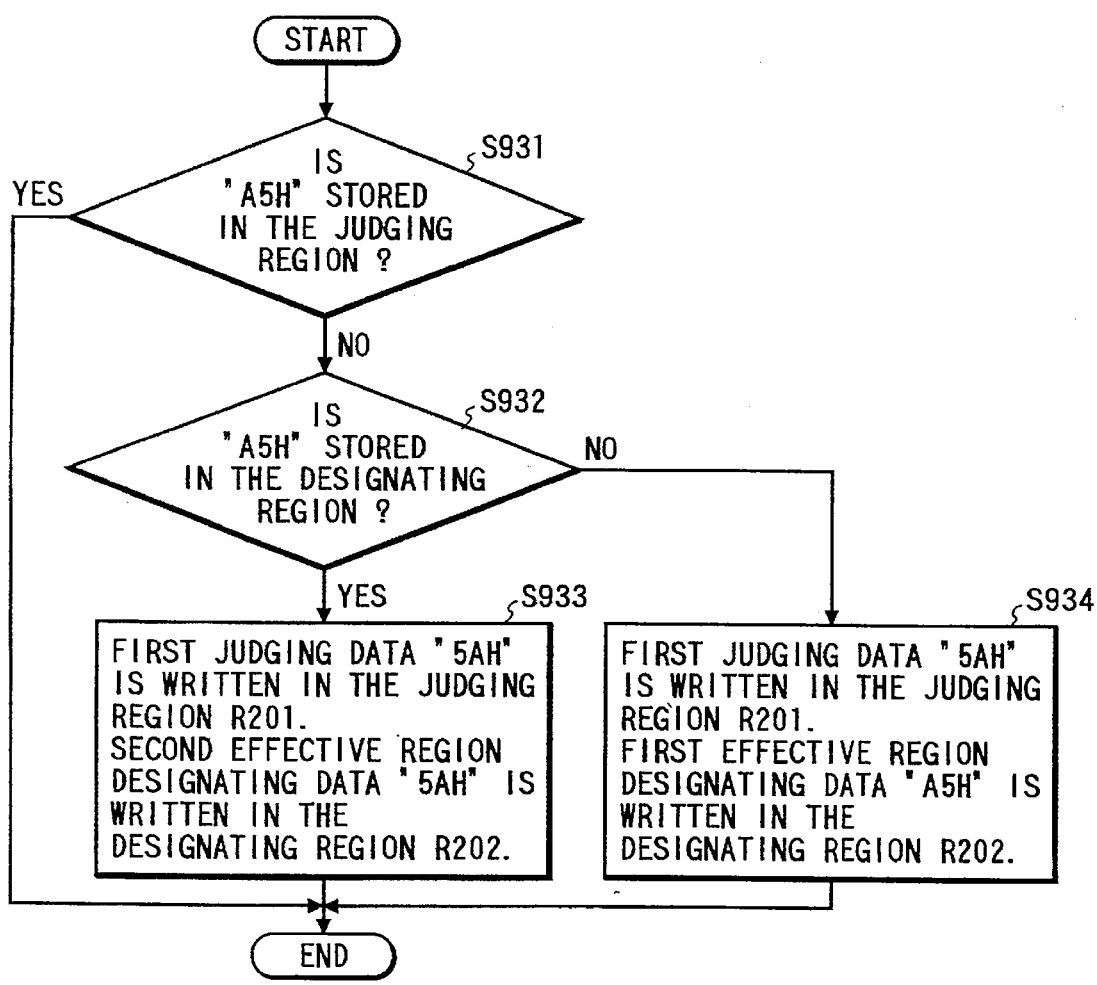
FIG. 21 is a flow chart showing a switching processing routine performed in the backup RAM under the control of the CPU according to a modification of the second embodiment.

FIG. 21 is a flow chart showing a switching processing routine performed in the backup RAM 44 under the control of the CPU 42 according to a modification of the second embodiment.

When the ignition switch 13 is set to "on" to supply the electric power to the control unit 41, a switching processing routine shown in FIG. 21 is started. In detail, in a step S931, it is judged in the CPU 42 whether or not the second judging data "A5H" indicating the renewal finishing period is stored in the judging region R201 as the renewal processing judgement data. In cases where the second judging data "A5H" indicating the renewal finishing period is stored, it is judged in the CPU 42 that the renewal of the diagnosis data which are stored in the effective region determined in the current processing routine is successfully finished or any renewal of the diagnosis data is not performed, and the switching processing routine is finished.

In contrast, in cases where the second judging data "A5H" indicating the renewal finishing period is not stored in the judging region R201, it is judged in the CPU 42 that the electric power supplied to the control unit 41 is cut off in the middle of the renewal of the diagnosis data performed according to the processing routine shown in FIG. 14 or 17. Therefore, a switching processing routine is performed. In detail, in a step S932, it is judged by the CPU 42 whether or not the first effective region designating data "A5H" indicating the designation of the first memory region A as the effective region is stored in the designating region R202 as the effective region designating data.

In cases where the first effective region designating data "A5H" is stored, the second judging data "A5H" indicating the renewal finishing period is written in the judging region R201 by the renewing period setting unit 53 of the CPU 42 in a step S933, and the second effective region designating data "5AH" indicating the designation of the second memory region B as the effective region is written in the designating region R202 by the effective region switching unit 55 of the CPU 42 in the step S933. In contrast, in cases where the first effective region designating data "A5H" is not stored in the region R202, the second judging data "A5H" is written in the judging region R201 by the renewing period setting unit 53 of the CPU 42 in a step S934, and the first effective region designating data "A5H" is written in the designating region R202 by the effective region switching unit 55 of the CPU 42 in the step S934.

Next, the switching processing routine is described with reference to FIG. 18 on condition that the electric power is cut off at a cut-off time ta just after the step S912.

As shown in FIG. 18, when the electric power is cut off at a cut-off time ta, the electric power supplied to the control unit 41 is cut off in the middle of the renewing period. Therefore, the diagnosis data $D_{B1}$ relating to the unusual condition of the water temperature in the current processing routine is stored in the memory region R208, and the diagnosis data $D_{B2}, D_B\alpha$ relating to the unusual condition of the throttle in the previous processing routine is stored in the memory regions R209, R210. Therefore, pieces of mixed data produced in the previous and current processing routines are stored in the second memory region B. However, because the effective region is switched to the first memory region A in the step S934, the mixed data stored in the second memory region B is not read out, but the diagnosis data stored in the first memory region A is read out to the diagnosis checker 19.

Figure 22:
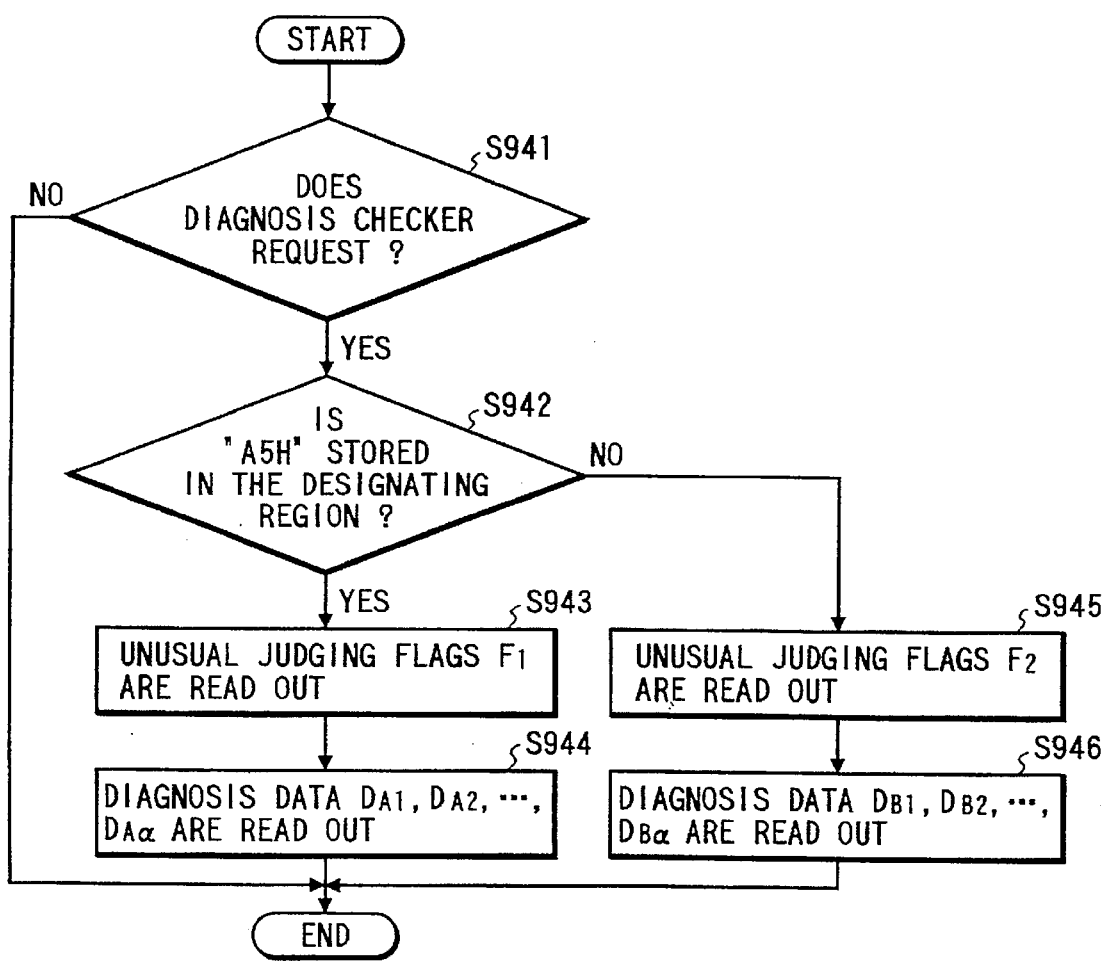
FIG. 22 is a flow chart showing a data check processing routine in which pieces of data stored in the first or second memory region A or B of the backup RAM are output to the diagnosis checker according to a modification of the second embodiment.

After the switching processing routine shown in FIG. 21 is performed, a data check processing routine shown in FIG. 22 is performed to output the unusual judging flags and the diagnosis data stored in the first or second memory region A or B of the backup RAM 44 to the diagnosis checker 19.

FIG. 22 is a flow chart showing a data check processing routine in which pieces of data stored in the first or second memory region A or B of the backup RAM 44 are output to the diagnosis checker 19 according to a modification of the second embodiment.

As shown in FIG. 22, in a step S941, it is checked in the CPU 42 at regular intervals of 8.2 ms whether or not the diagnosis checker 19 requests the CPU 42 to output the unusual judging flags and the diagnosis data stored in the backup RAM 44 to the diagnosis checker 19. In cases where the diagnosis checker 19 requests the CPU 42, it is judged by the CPU 42 in a step S942 whether or not the first effective region designating data "A5H" indicating the indication of the first memory region A as the effective region is stored in the designating region R202 as the effective region designating data. In cases where the first effective region designating data "A5H" is stored, the unusual judging flags $F_1$ and the diagnosis data $D_{A0}, D_{A1}, ---, D_A\alpha$ stored in the first memory region A are read out by the diagnosis data reading-out unit 54 of the CPU 42 and are output to the diagnosis checker 19 under the control of the CPU 42 through the I/O circuit 20 in steps S943 and S944. In contrast, in cases where the first effective region designating data "A5H" is not stored, it is regarded that the second memory region B is designated as the effective region, so that the unusual judging flags F2 and the diagnosis data $D_{B0}, D_{B1}, ---, D_B\alpha$ stored in the second memory region B are read out by the diagnosis data reading-out unit 54 of the CPU 42 and are output to the diagnosis checker 19 under the control of the CPU 42 through the I/O circuit 20 in steps S945 and S946.

Accordingly, even though the electric power is cut off in the middle of the renewal of the diagnosis data stored in the effective region to store pieces of mix data produced in previous and current processing routines, because the effective region is switched in cases where the first judging data "A5H" indicating the renewing period is stored in the judging region R201 when an electric power cut off is again supplied to the control unit 41, there is no probability that the mix data are output to the diagnosis checker 19. That is, there is no probability that the accuracy of the failure analysis of the on-vehicle equipment deteriorates, and the failure analysis of the on-vehicle equipment can be performed with a high accuracy.

Also, because pieces of diagnosis data are directly read out from the first or second memory region A or B in which the renewal of the diagnosis data is finished, an operating time required to read out the diagnosis data can be shortened, and the failure analysis of the on-vehicle equipment can be performed at a high speed.

In the second embodiment including its modification, a condition of the throttle or the water temperature is detected at prescribed intervals, and pieces of diagnosis data relating to an unusual condition of the throttle or the water temperature are stored in the backup RAM 44. However, the second embodiment is not limited to the detection of the condition of the throttle or the water temperature. For example, it is applicable that a condition of another on-vehicle equipment such as an air flow, a crank angle or the like be detected and pieces of diagnosis data relating to an unusual condition of the on-vehicle equipment be stored in the backup RAM 44.

Also, the second embodiment is applied for a data backup apparatus utilized in an electronic control system, which is composed of the CPU 42 and the backup RAM 44 concretized in the failure-diagnosis apparatus 40 for a vehicle. However, the second embodiment is not limited to the failure-diagnosis apparatus 40 for a vehicle. For example, it is applicable that a data backup apparatus utilized in an electronic control system according to the present invention be concretized in a failure-diagnosis apparatus for a general apparatus.

Also, values "A5H" and "5AH" expressed by the hexadecimal notation are utilized as the renewal processing judging data stored in the judging region R201 or the effective region designating data stored in the designating region R202. However, the second embodiment is not limited to the hexadecimal values "A5H" and "5AH". For example, binary values "1" and "0" can be utilized as the renewal processing judging data or the effective region designating data.

Next, a third embodiment of a data backup apparatus utilized in an electronic control system, which is concretized in a failure-diagnosis apparatus for a vehicle, according to the present invention is described with reference to FIGS. 23 to 29.

Figure 23:
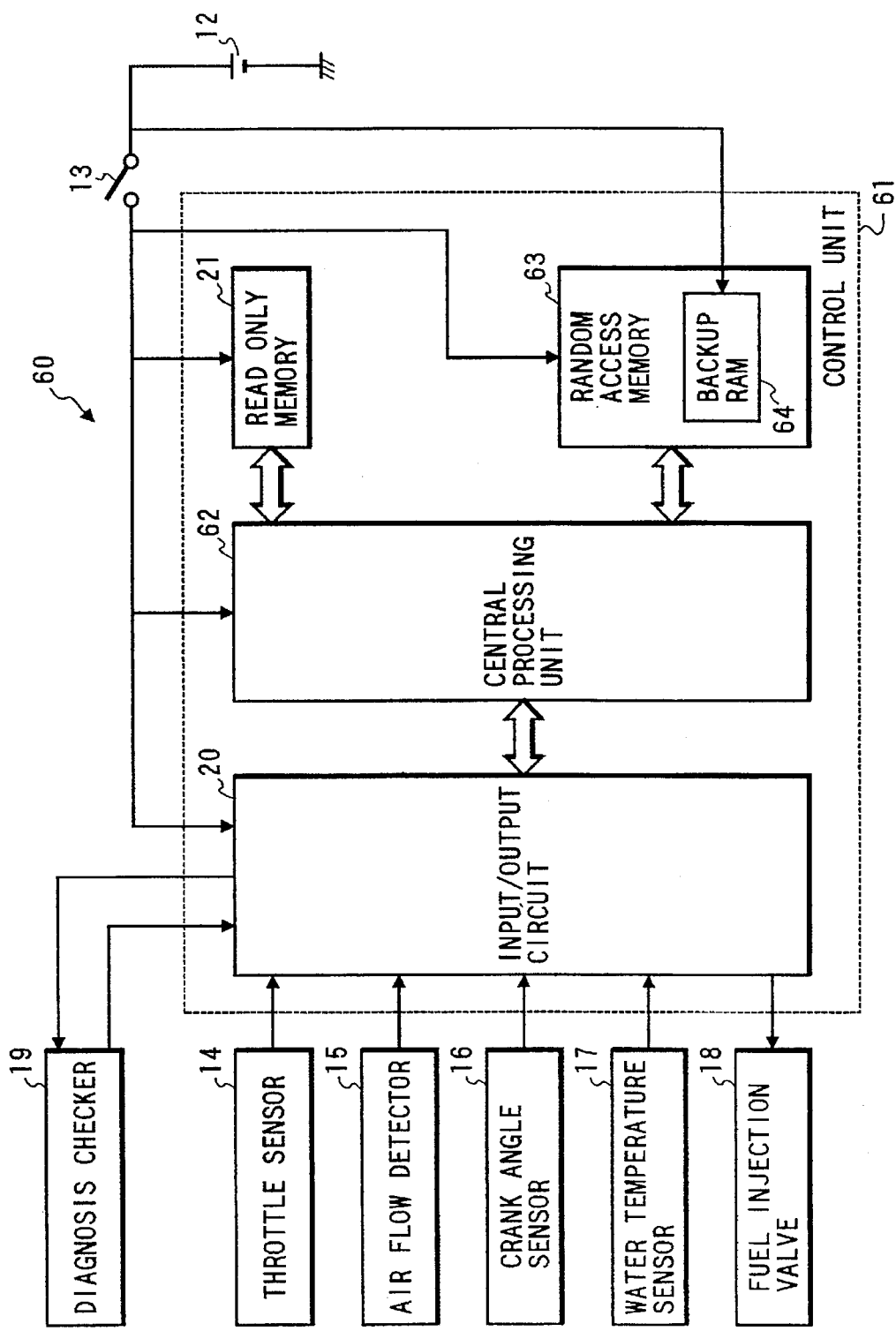
FIG. 23 is a block diagram showing an electronic configuration of a failure-diagnosis apparatus according to a third embodiment of the present invention.

FIG. 23 is a block diagram showing an electronic configuration of a failure-diagnosis apparatus according to a third embodiment of the present invention.

As shown in FIG. 23, a failure-diagnosis apparatus 60 comprises a control unit 61, the battery 12 for supplying an electric power to the control unit 61 through the ignition switch 13, the throttle sensor 14, the air flow detector 15, the crank angle sensor 16, the water temperature sensor 17, the fuel injection valve 18, and the diagnosis checker 19. The control unit 61 comprises the input/output (I/O) circuit 20, the read only memory (ROM) 21, a central processing unit (CPU) 62 for calculating an injection fuel amount by executing the control program stored in the ROM 21 with the sensing signals received in the I/O circuit 20, outputting an output signal indicating the injection fuel amount to the fuel injection valve 18 through the I/O circuit 20, calculating operational conditions of an engine such as the rotational number NE of a piston (or a rotor) in the engine, an amount GN of an intake air and the like according to the sensing signals, and determining a failure code G indicating a type of an unusual condition in the engine according to the operational conditions of the engine if necessary, and a random access memory (RAM) 63 including a backup RAM 64 for storing the operational conditions of the engine calculated in the CPU 62 as pieces of diagnosis data in the backup RAM 64 in cases where an unusual condition of on-vehicle equipment is detected by the throttle sensor 14, the air flow detector 15, the crank angle sensor 16 or the water temperature sensor 17. The electric power is directly supplied from the battery 12 to the backup RAM 64 of the RAM 63. Therefore, even though the electric power supplied to the backup RAM 64 is cut off by the ignition switch 13, pieces of diagnosis data stored in the backup RAM 64 are maintained.

In the above configuration, an output signal indicating the injection fuel amount is output to the fuel injection valve 18 through the I/O circuit 20 in the same manner as in the first embodiment. Also, pieces of operational conditions (the rotational number NE of a piston in the engine, an amount GN of an intake air and the like) of on-vehicle equipment such as an engine are calculated in the CPU 82 according to the sensing signals, and an unusual operational condition of the on-vehicle equipment is stored in the backup RAM 84 as pieces of diagnosis data in cases where the operational unusual condition of the on-vehicle equipment is found out in the CPU 82 according to sensing signals.

FIG. 24 shows a configuration of a storage region of the backup RAM 64.

As shown in FIG. 24, the backup RAM 64 is composed of an n-th address corresponding to a memory region R301 especially called a designating region and a plurality of addresses ranging from an (n+1)-th address corresponding to the memory region R203 to an (n+4+$\alpha$+$\alpha$)-th address corresponding to the memory region R210. The memory regions R203 to R210 are the same as those in the second embodiment, and the judging region R301 is placed at bits from an eighth bit to a fifteenth bit of the n-th address. Also, the first memory region A composed of the memory regions R203 to R206 and the second memory region B composed of the memory regions R207 to R210 are defined in the same manner as in the second embodiment, so that a group of pieces of diagnosis data produced in the CPU 62 for each of processing routines is alternately stored in the first memory region A and the second memory region B.

In the designating region R301, a piece of reading-out region designating data is written. In detail, in cases where the first memory region A is designated as a reading-out effective region from which pieces of diagnosis data are to be read out, a piece of first designating data "A5H" indicating that the first memory region A is designated as the reading-out effective region is stored as the reading-out region designating data. Also, in cases where the second memory region B is designated as the reading-out effective region, a piece of second designating data "5AH" indicating that the second memory region B is designated as the reading-out effective region is stored as the reading-out region designating data. The data "A5H" and "5AH" are expressed according to the hexadecimal notation.

Figure 25:
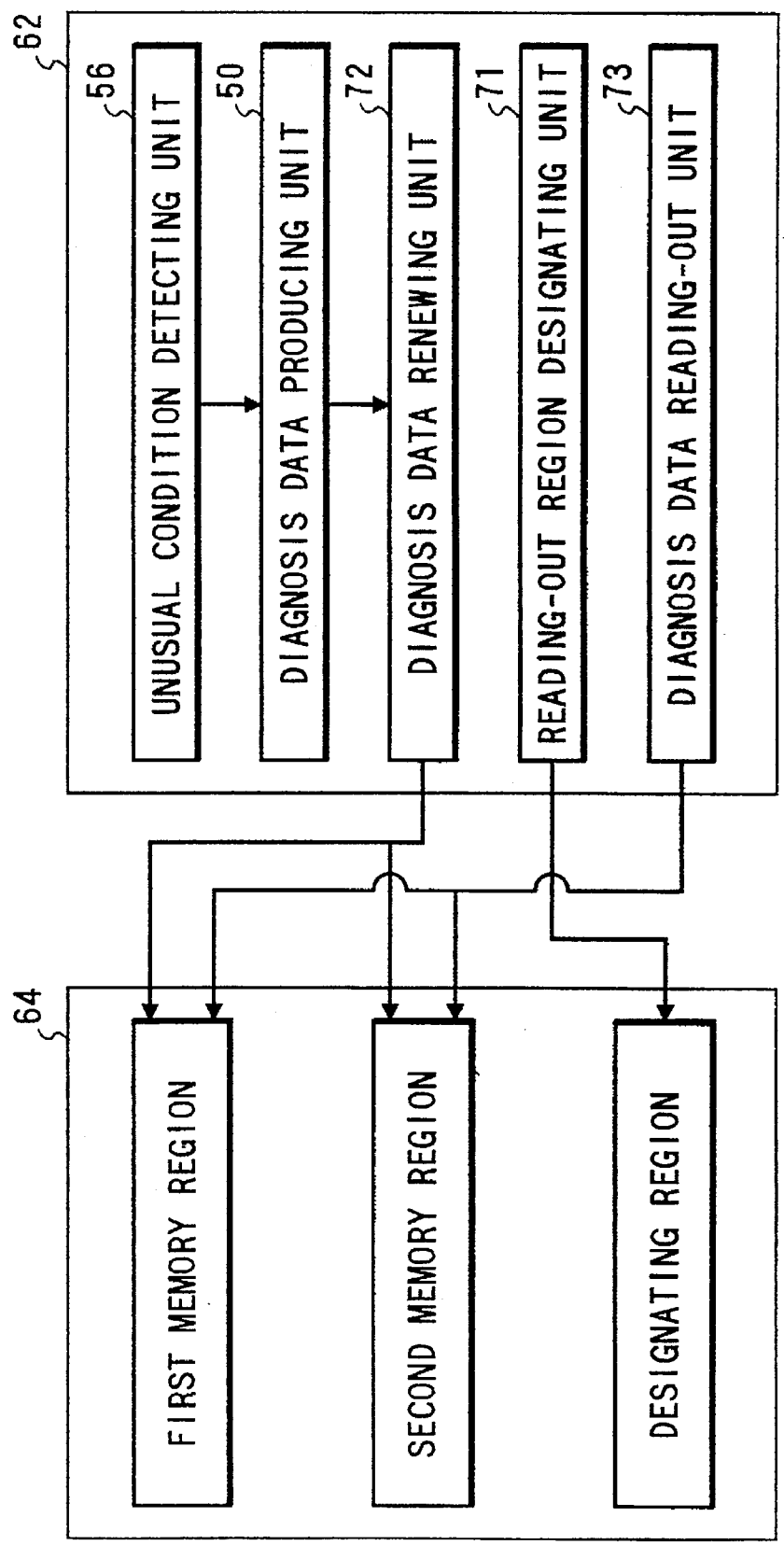
FIG. 25 shows a block diagram of a CPU and the backup RAM shown in FIG. 23.

FIG. 25 shows a block diagram of the CPU 62 and the backup RAM 64.

As shown in FIG. 25, the CPU 62 comprises the diagnosis data producing unit 50, a reading-out region designating unit 71 for alternately designating the first and second memory regions A and B as a reading-out effective region, from which pieces of diagnosis data are read out, for each of renewals of the diagnosis data by alternately writing the first and second designating data "A5H" and "5AH" in the designating region R301, a diagnosis data renewing unit 72 for renewing pieces of diagnosis data which are stored in the reading-out effective region determined by the designating unit 71 in a current processing routine one by one, and a diagnosis data reading-out unit 73 for reading out the diagnosis data stored in either the first or second memory region not designated as the reading-out effective region by the designating unit 71.

In the above configuration of the CPU 62 and the backup RAM 64 concretizing the third embodiment according to the present invention, a data backup operation performed in the failure-diagnosis apparatus 60 is described.

A processing routine performed in cases where an unusual condition of the throttle is detected by the throttle sensor 14 is initially described.

Figure 26:
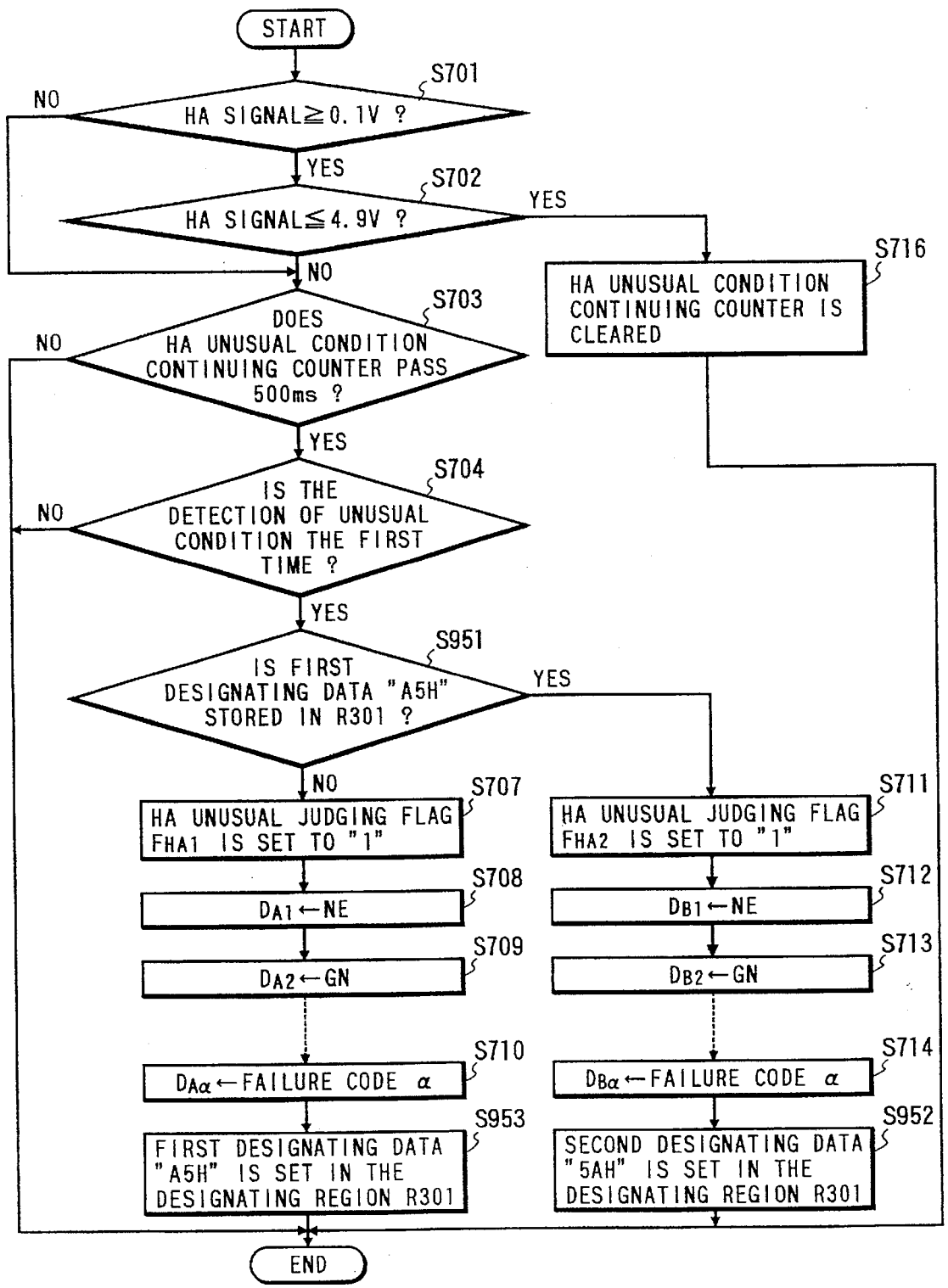
FIG. 26 shows a flow chart of a processing routine performed in the CPU and the backup RAM according to the third embodiment in cases where an unusual condition of a throttle is detected by a throttle sensor shown in FIG. 23.

FIG. 26 shows a flow chart of a processing routine performed in the CPU 62 and the backup RAM 64 according to the third embodiment in cases where an unusual condition of the throttle is detected by the throttle sensor 14.

A condition of the throttle detected by the throttle sensor 14 is checked by the CPU 62 at prescribed intervals of 8.2 ms, and pieces of diagnosis data stored in the backup RAM 64 are renewed by the diagnosis data renewing unit 72 of the CPU 62 in cases where an unusual condition of the throttle is detected by the throttle sensor 14.

In detail, as shown in FIG. 26, when a sensing signal indicating a condition of the throttle detected by the throttle sensor 14 is transmitted to the CPU 62 through the I/O circuit 20 at prescribed intervals of 8.2 ms, the steps S701 to S704 and the step S716 are performed in the CPU 62 in the same manner as in the second embodiment. Thereafter, in cases where it is judged in the step S704 that the detection of the unusual condition in the throttle is the first time, the procedure proceeds to a step S951.

In the step S951, it is judged in the CPU 62 whether or not a piece of first designating data "A5H" indicating the designation of the first memory region A as a reading-out effective region is stored in the designating region R301. In cases where the first designating data "A5H" is stored in the designating region R301, pieces of diagnosis data $D_{B1}, D_{B2}, --- D_B\alpha$ including a failure code $\alpha$="01H" calculated in the diagnosis data producing unit 50 of the CPU 62 in a current processing routine are stored in the second memory region B not designated as the reading-out effective region by the diagnosis data renewing unit 72 in the steps S711 to S714 in the same manner as in the second embodiment. Thereafter, in a step S952, the first designating data "A5H" stored in the designating region R301 is switched to a piece of second designating data "5AH" indicating the designation of the second memory region B as the reading-out effective region by the reading-out region designating unit 71 of the CPU 62.

In contrast, in cases where a piece of second designating data "5AH" is stored in the designating region R301, pieces of diagnosis data $D_{A1}, D_{A2}, --- D_A\alpha$ including a failure code $\alpha$="01H" calculated in the diagnosis data producing unit 50 of the CPU 62 in a current processing routine are stored in the first memory region A not designated as the reading-out effective region by the diagnosis data renewing unit 72 in the steps S707 to S710 in the same manner as in the second embodiment. Thereafter, in a step S953, the second designating data "5AH" stored in the designating region R301 is changed to a piece of first designating data "A5H" indicating the designation of the first memory region A as the reading-out effective region by the reading-out region designating unit 71 of the CPU 62.

Therefore, in cases where an unusual condition of the throttle is detected, pieces of control data composed of the diagnosis data $D_{A1}, D_{A2}, --- D_A\alpha$ (or $D_{B1}, D_{B2}, --D_B\alpha$) including the failure code $\alpha$ stored in either the first or second memory region A or B not designated as the reading-out effective region are renewed one by one, and the designation as the reading-out effective region is switched from one of the first and second memory regions A and B to another memory region in which pieces of updated diagnosis data produced in the current processing routine are stored.

Next, a processing routine performed in cases where an unusual condition of the water temperature is detected by the water temperature sensor 17 is described.

Figure 27:
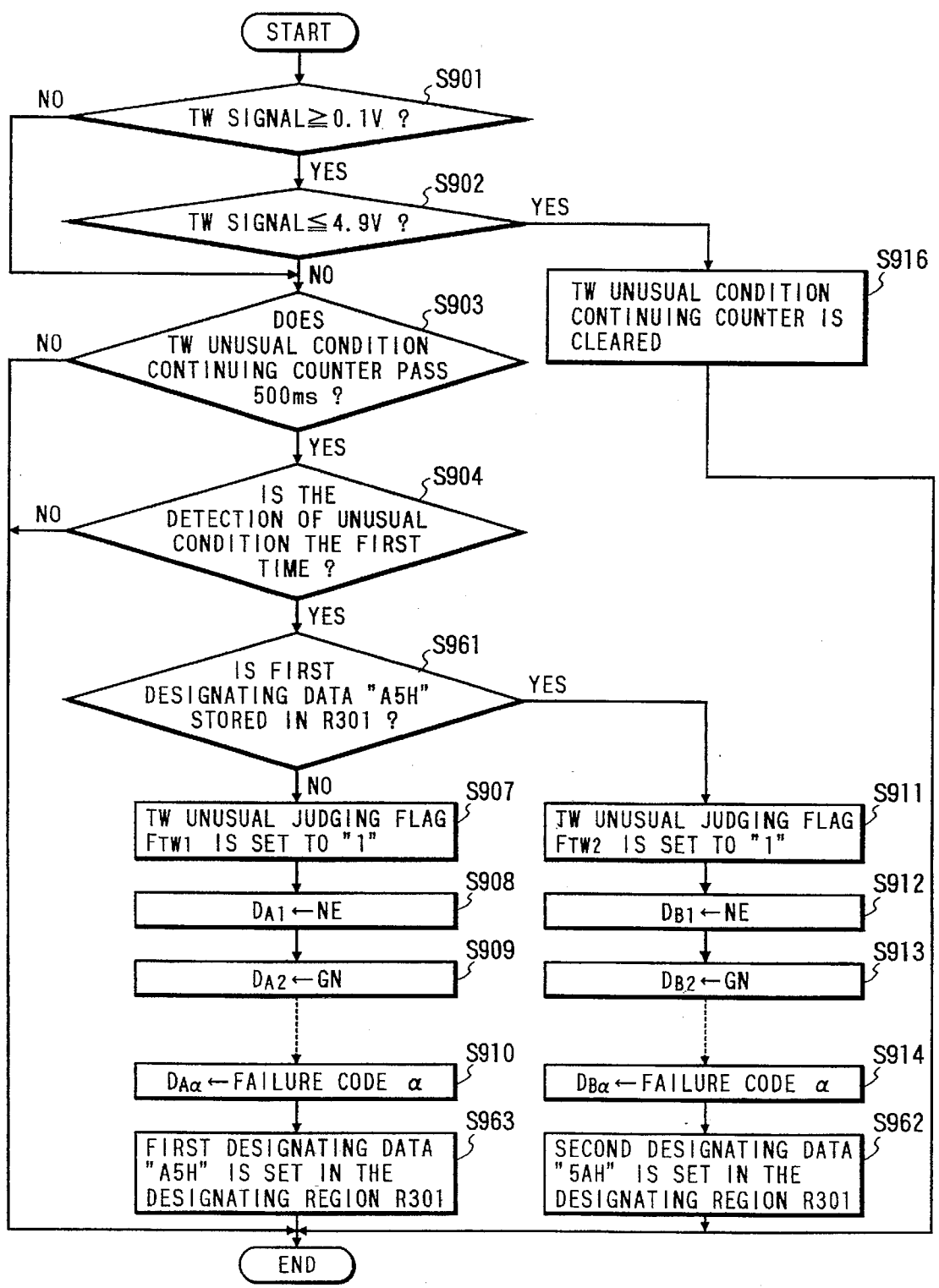
FIG. 27 shows a flow chart of a processing routine performed in the CPU and the backup RAM according to the third embodiment in cases where an unusual condition of a water temperature is detected by a water temperature sensor shown in FIG. 23.

FIG. 27 shows a flow chart of a processing routine performed in the CPU 62 and the backup RAM 84 according to the third embodiment in cases where an unusual condition of the water temperature is detected by the water temperature sensor 17.

A condition of the water temperature detected by the water temperature sensor 17 is checked by the CPU 82 at prescribed intervals of 8.2 ms, and pieces of diagnosis data stored in the backup RAM 64 are renewed by the diagnosis data renewing unit 72 of the CPU 62 in cases where an unusual condition of the water temperature is detected by the water temperature sensor 17.

In detail, as shown in FIG. 27, when a sensing signal indicating a condition of the water temperature detected by the water temperature sensor 17 is transmitted to the CPU 62 through the I/O circuit 20 at prescribed intervals of 8.2 ms, the steps S901 to S904 and the step S916 are performed in the CPU 62 in the same manner as in the second embodiment. Thereafter, in cases where it is judged in the step S904 that the detection of the unusual condition in the water temperature is the first time, the procedure proceeds to a step S961.

In the step S961, it is judged in the CPU 62 whether or not a piece of first designating data "A5H" indicating the designation of the first memory region A as a reading-out effective region is stored in the designating region R301. In cases where the first designating data "A5H" is stored in the designating region R301, pieces of diagnosis data $D_{B1}, D_{B2}$, - - - , $D_B\alpha$ including a failure code $\alpha$="02H" calculated in the diagnosis data producing unit 50 of the CPU 62 in a current processing routine are stored in the second memory region B not designated as the reading-out effective region by the diagnosis data renewing unit 72 in the steps S911 to S914 in the same manner as in the second embodiment. Thereafter, in a step S962, the first designating data "A5H" stored in the designating region R301 is switched to a piece of second designating data "5AH" indicating the designation of the second memory region B as the reading-out effective region by the reading-out region designating unit 71 of the CPU 62.

In contrast, in cases where a piece of second designating data "5AH" is stored in the designating region R301, pieces of diagnosis data $D_{A1}, D_{A2}$, - - - $D_A\alpha$ including a failure code $\alpha$="02H" calculated in the diagnosis data producing unit 50 of the CPU 62 in a current processing routine are stored in the first memory region A not designated as the reading-out effective region by the diagnosis data renewing unit 72 in the steps S907 to S910 in the same manner as in the second embodiment. Thereafter, in a step S963, the second designating data "5AH" stored in the designating region R301 is switched to a piece of first designating data "A5H" indicating the designation of the first memory region A as the reading-out effective region by the reading-out region designating unit 71 of the CPU 62.

Therefore, in cases where an unusual condition of the water temperature is detected, pieces of control data composed of the diagnosis data $D_{A1}, D_{A2}$, - - - $D_A\alpha$ (or $D_{B1}, D_{B2}$, - - - $D_B\alpha$) including the failure code stored in either the first or second memory region A or B not designated as the reading-out effective region are renewed one by one, and the designation as the reading-out effective region is switched from one of the first and second memory regions A and B to another memory region in which pieces of updated diagnosis data produced in the current processing routine are stored.

Accordingly, in cases where the electric power supplied to the control unit 61 is not cut off during the renewal of the diagnosis data in the current processing routine, the updated diagnosis data are stored in the reading-out effective region.

Also, in cases where the electric power supplied to the control unit 61 is cut off in the middle of the renewal of the diagnosis data in the current processing routine, pieces of mixed data composed of a part of the updated diagnosis data and a part of pieces of first previous diagnosis data produced in a first previous processing routine performed prior to the current processing routine are produced. However, because the step S962 or the step S963 is not performed, the mixed data is not stored in the reading-out effective region, but pieces of second previous diagnosis data produced in a second previous processing routine performed just before the current processing routine is stored in the reading-out effective region.

Figure 28:
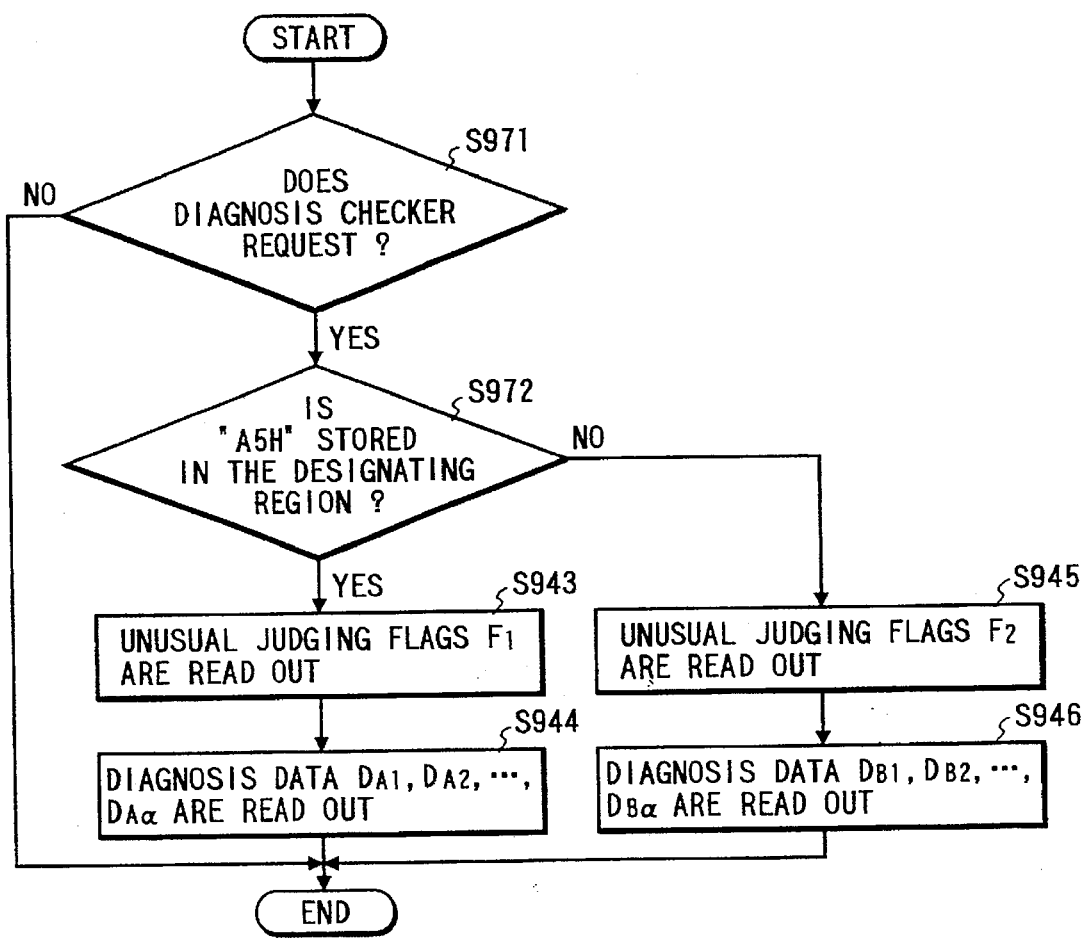
FIG. 28 is a flow chart showing a data check processing routine in which pieces of data stored in first or second memory region of the backup RAM are output to a diagnosis checker shown in FIG. 23 according to the third embodiment.

Thereafter, a data check processing routine shown in FIG. 28 is performed to output the unusual judging flags and the diagnosis data stored in the first or second memory region A or B of the backup RAM 64 to the diagnosis checker 19.

FIG. 28 is a flow chart showing a data check processing routine in which pieces of data stored in the first or second memory region A or B of the backup RAM 64 are output to the diagnosis checker 19 according to the third embodiment.

As shown in FIG. 28, in a step S971, it is checked in the CPU 62 at regular intervals of 8.2 ms whether or not the diagnosis checker 19 requests the CPU 62 to output the unusual judging flags and the diagnosis data stored in the backup RAM 64 to the diagnosis checker 19. In cases where the diagnosis checker 19 requests the CPU 62, it is judged by the CPU 62 in a step S972 whether or not a piece of first designating data "A5H" indicating the designation of the first memory region A as a reading-out effective region is stored in the designating region R301. In cases where the first designating data "A5H" is stored, the unusual judging flags $F_1$ and the diagnosis data $D_{A1}, D_{A2}$, - - - $D_A\alpha$ stored in the first memory region A which is designated as the reading-out effective region are read out by the diagnosis data reading-out unit 73 in the steps S943 and S944 in the same manner as in the second embodiment. In contrast, in cases where the first designating data "A5H" is not stored, the unusual judging flags $F_2$ and the diagnosis data $D_{B1}, D_{B2}$, - - - $D_B\alpha$ stored in the second memory region B which is designated as the reading-out effective region are read out by the diagnosis data reading-out unit 73 in the steps S945 and S946 in the same manner as in the second embodiment.

Accordingly, in cases where the electric power supplied to the control unit 61 is not cut off during the renewal of the diagnosis data in the current processing routine, because the updated diagnosis data produced in the current processing routine are stored in the reading-out effective region, the updated diagnosis data can be reliably read out to the diagnosis checker 19. Also, in cases where the electric power supplied to the control unit 61 is cut off during the renewal of the diagnosis data in the current processing routine, because the second previous diagnosis data produced in the second previous processing routine performed just before the current processing routine is stored in the reading-out effective region, the second previous diagnosis data can be reliably read out to the diagnosis checker 19. Therefore, the judgment which portion of the on-vehicle equipment is in a failure condition can be correctly performed in the diagnosis checker 19.

Next, a diagnosis data renewing operation performed in the steps S961 to S962 shown in FIG. 27 are described in detail with reference to FIG. 29.

Figure 29:
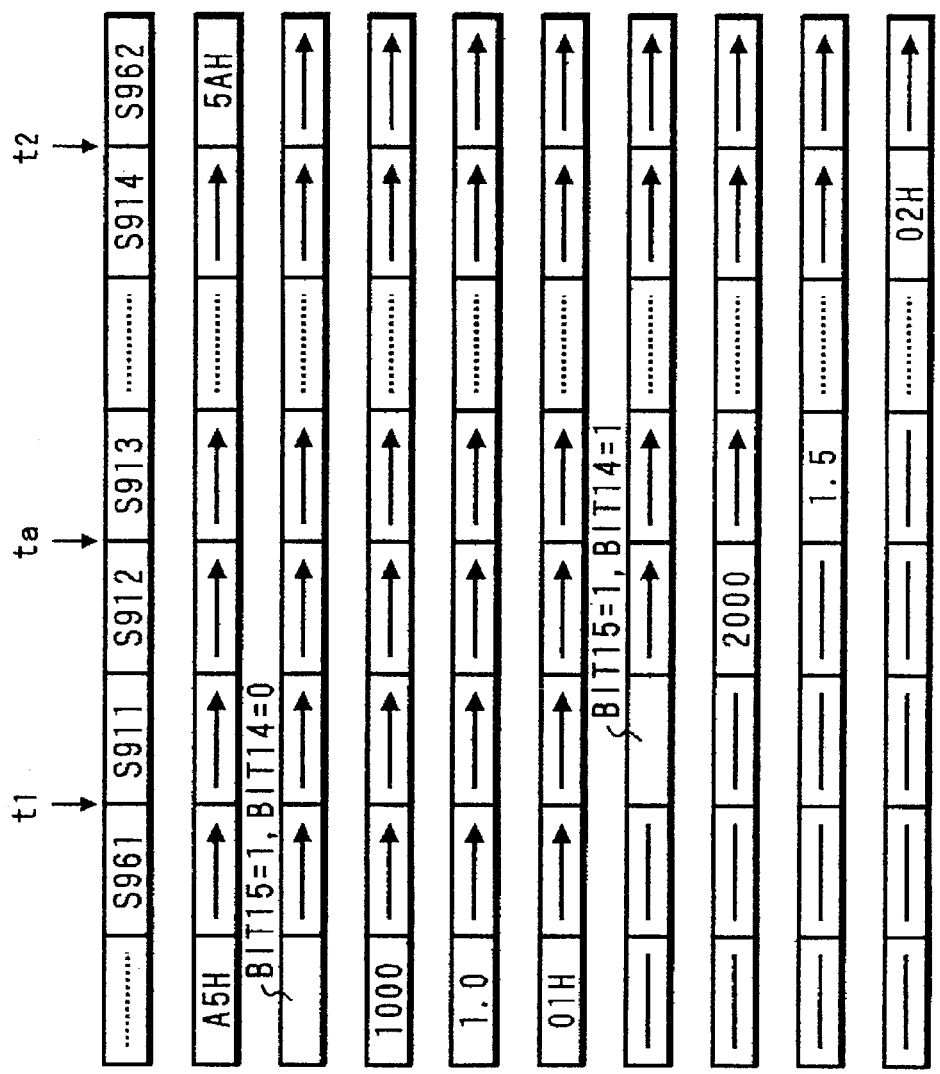
FIG. 29 shows a time chart showing a diagnosis data renewing operation in which pieces of diagnosis data stored in the backup RAM are renewed.

FIG. 29 shows a time chart showing a diagnosis data renewing operation in which the diagnosis data stored in the backup RAM 64 are renewed.

In FIG. 29, the first memory region A is designated as the reading-out effective region in a previous processing routine by the first designating data "A5H" stored in the designating region R301, and the HA unusual judging flag $F_{HA1}$ and pieces of diagnosis data $D_{A1}, D_{A2}$, - - - , $D_A\alpha$ ($F_{HA1}$="1", NE=1000 rpm, GN=1.0 g/rev, a failure code "01H") are stored in advance in the memory regions R203 to R206 of the backup RAM 64 because an unusual condition of the throttle is detected by the throttle sensor 14 according to the previous processing routine. A period from a first time t1 to a second time t2 corresponds to a renewing period of the first or second memory region A or B not designated as the reading-out effective region.

As shown in FIG. 29, the renewal of various pieces of data relating to an unusual condition of the water temperature is performed in the second memory region B not designated as the reading-out effective region during the renewing period. In detail, the TW unusual judging flag $F_{TW2}$ stored in the memory region R207 is set to "1" in the step S911, the rotational number NE=2000 rpm is written to the memory region R208 as a piece of diagnosis data $D_{B1}$ in the step S912, an amount GN=1.5 g/rev of an intake air is written to the memory region R209 as a piece of diagnosis data $D_{B2}$ in the step S913, and the failure code α="02H" is written to the memory region R210 as a piece of diagnosis data $D_B\alpha$ in the step S914. Thereafter, the first designating data "A5H" stored in the designating region RS01 is replaced with the second designating data "5AH" at the second time t2.

Therefore, the operational condition of the first memory region A in which the HA unusual judging flag $F_{HA1}$ and the diagnosis data $D_{A1}, D_{A2}, ---, D_A\alpha$ are stored is set in a renewal finishing condition, so that the HA unusual judging flag $F_{HA1}$ and the diagnosis data $D_{A1}, D_{A2}, ---, D_A\alpha$ can be read out to the diagnosis checker 19 even though the diagnosis data $D_{B1}, D_{B2}, ---, D_B\alpha$ stored in the second memory region B are under renewal.

In contrast, pieces of mix data produced in the previous and current processing routines are transitionally stored during the renewing period. In this case, assuming that the electric power supplied to the control unit 81 is cut off in the middle of the renewing period or an electric voltage of the electric power is lowered in the middle of the renewing period, pieces of mixed data composed of a part of the diagnosis data relating to the unusual condition of the water temperature detected in a current processing routine and a part of the diagnosis data produced in a previous processing routine are produced. However, because the storage of the first designating data "A5H" in the designating region R301 is maintained without being changed to the second designating data "5AH" in the step S962 or S963, it is recognized that the first memory region A is designated as the reading-out effective region by the first designating data "A5H" stored in the designating region R301 when the electric power cut off is again supplied to the control unit 61. Therefore, there is no probability that the mixed data stored in the second memory region B are read out, and the diagnosis data $D_{A1}, D_{A2}, ---, D_A\alpha$ stored in the first memory region A can be reliably read out to the diagnosis checker 19. Accordingly, the failure analysis of on-vehicle equipment can be reliably performed.

Also, because pieces of diagnosis data are directly read out from the first or second memory region A or B in which the renewal of the diagnosis data is finished, an operating time required to read out the diagnosis data can be shortened, and the failure analysis of the on-vehicle equipment can be performed at a high speed.

In the third embodiment, a condition of the throttle or the water temperature is detected at prescribed intervals, and pieces of diagnosis data relating to an unusual condition of the throttle or the water temperature are stored in the backup RAM 64. However, the third embodiment is not limited to the detection of the condition of the throttle or the water temperature. For example, it is applicable that a condition of another on-vehicle equipment such as an air flow, a crank angle or the like be detected and pieces of diagnosis data relating to an unusual condition of the on-vehicle equipment be stored in the backup RAM 64.

Also, the third embodiment is applied for a data backup apparatus utilized in an electronic control system, which is composed of the CPU 62 and the backup RAM 64 concretized in the failure-diagnosis apparatus 60 for a vehicle. However, the third embodiment is not limited to the failure-diagnosis apparatus 60 for a vehicle. For example, it is applicable that a data backup apparatus utilized in an electronic control system according to the present invention be concretized in a failure-diagnosis apparatus for a general apparatus.

Also, values "A5H" and "5AH" expressed by the hexadecimal notation are utilized as the reading-out region designating data stored in the designating region R301. However, the third embodiment is not limited to the hexadecimal values "A5H" and "5AH". For example, binary values "1" and "0" can be utilized as the reading-out region designating data.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

What is claimed is:

1. A data backup apparatus utilized in an electronic control system, comprising:

control data storing means having a first memory region, a second memory region and a third memory region for storing pieces of updated control data in the first memory region, storing pieces of previous control data in the second memory region and storing a checking value in the third memory region regardless of whether an electric power is cut off;

control data copying means for copying the updated control data stored in the first memory region of the control data storing means to the second memory region of the control data storing means as the previous control data;

control data, renewing means for renewing one after another the updated control data which are stored in the first memory region of the control data storing means and are copied to the second memory region of the control data storing means, by the control data copying means on condition that the electric power is supplied to the control data renewing means, the renewal of the updated control data being stopped during the renewal by cutting off the electric power supplied to the control data renewing means in the middle of the renewal;

checking data setting means for setting a piece of first checking data indicating a start of the renewal of the updated control data performed by the control data renewing means to the third memory region of the control data storing means in cases where the updated control data stored in the first memory region of the control data storing means is renewed by the control data renewing means, and setting a piece of second checking data indicating a finish of the renewal of the updated control data performed by the control data renewing means to the third memory region of the control data storing means in cases where the renewal of the updated control data performed by the control data renewing means is finished, the storage of the first checking data is maintained in the third memory region of the control data storing means in cases where the electric power supplied to the control data renewing means is cut off in the middle of the renewal performed by the control data renewing means; and control data returning means for returning the previous data copied to the second memory region of the control data storing means by the control data copying means to the first memory region of the control data storing means as the updated control data in cases where the electric power cut off is again supplied to the control data renewing means on condition that the storage of the first checking data is maintained in the third memory region of the control data storing means.

2. An apparatus according to claim 1, wherein the updated control data stored in the first memory region of the control data storing means are composed of pieces of diagnosis data indicating an unusual condition of on-vehicle equipment, an unusual condition judging flag indicating that the diagnosis data are stored in the first memory region, and a piece of judging number data indicating the number of unusual condition judgements, the number of unusual condition judgements denoting the number of renewals performed by the control data renewing means for a particular part of the on-vehicle equipment.

3. An apparatus according to claim 1, wherein the updated control data stored in the first memory region of the control data storing means includes pieces of diagnosis data indicating an unusual condition of on-vehicle equipment selected from the group consisting of a throttle, an air flow, a crank angle and a water temperature, and the diagnosis data indicates the rotational number of a piston, an amount of an intake air and a failure code designating a type of the on-vehicle equipment.

4. An apparatus according to claim 1 wherein the updated control data stored in the first memory region of the control data storing means are composed of pieces of diagnosis data indicating an unusual condition of on-vehicle equipment detected by a sensor selected from the group consisting of a throttle sensor and a water temperature sensor, an HA unusual condition judging flag of which a setting value "1" indicates that the diagnosis data indicating the unusual condition of the on-vehicle equipment detected by the throttle sensor are stored in the first memory region, a piece of HA judging number data indicating the number of HA unusual condition judgements, which denotes the number of renewals of the diagnosis data indicating the unusual condition of the on-vehicle equipment detected by the throttle sensor, an TW unusual condition judging flag of which a setting value "1" indicates that the diagnosis data indicating the unusual condition of the on-vehicle equipment detected by the water temperature sensor are stored in the first memory region, a piece of TW judging number data indicating the number of TW unusual condition judgements which denotes the number of renewals of the diagnosis data indicating the unusual condition of the on-vehicle equipment detected by the water temperature sensor, wherein the diagnosis data, the HA unusual condition judging flag and the HA judging number data are copied to the second memory region of the control data storing means by the control data copying means and are returned to the first memory region of the control data storing means by the control data returning means in cases where the HA unusual condition judging flag is set to "1", and wherein the diagnosis data, the TW unusual condition judging flag and the TW judging number data are copied to the second memory region of the control data storing means by the control data copying means and are returned to the first memory region of the control data storing means by the control data returning means in cases where the TW unusual condition judging flag is set to "1".

5. An apparatus according to claim 1, further including:

a sensor selected from a group comprising a throttle sensor, an air flow detector, a crank angle sensor and a water temperature sensor for detecting an unusual condition of on-vehicle equipment; and diagnosis data producing means for producing the diagnosis data indicating the unusual condition of the on-vehicle equipment detected by the sensor, the diagnosis data being stored in the first memory region by the control data renewing means.

6. An apparatus according to claim 1, further including:

a diagnosis checker for checking which part of on-vehicle equipment is in a failure condition according to the updated control data returned by the control data returning means to the first memory region.

7. A data backup apparatus utilized in an electronic control system, comprising:

control data storing means having a first memory region and a second memory region for storing pieces of control data in the first memory region and the second memory region;

effective region designating means for alternatively designating the first memory region and the second memory region of the control data storing means as an effective region on condition that an electric power is supplied to the effective region designating means;

control data renewing means for renewing pieces of control data, which are stored in the effective region determined by the effective region designating means one by one, on condition that the electric power is supplied to the control data renewing means, the first memory region and the second memory region of the control data storing means being alternately designated as the effective region each time the control data are renewed by the control data renewing means, and the renewal of the control data being stopped during the renewal by cutting off the electric power supplied to the control data renewing means;

renewing period setting means for setting an operational condition of the effective region determined by the effective region designating means in a control data renewing period in cases where the control data stored in the effective region are under renewal, and setting an operational condition of the effective region determined by the effective region designating means in a control data renewal finishing period in cases where the control data stored in the effective region are not under renewal, the operational condition of the effective regions being maintained to control data renewing period in cases where the electric power is cut off during the renewal of the control data performed by the control data renewing means; and control data reading-out means for reading out pieces of control data stored in one of the first memory region and the second memory region which is not designated as the effective region by the effective region designating means in cases where the operational condition of the effective region is set in the control data renewing period by the renewing period setting means, and reading out pieces of control data stored in the effective region in cases where the operational condition of the effective region is set in the control data renewal finishing period by the renewing period setting means.

8. An apparatus according to claim 7, wherein the control data stored in the first memory region or the second memory region of the control data storing means are composed of pieces of diagnosis data indicating an unusual condition of on-vehicle equipment.

9. An apparatus according to claim 7, wherein a piece of effective region designating data indicating the designation of one of the first memory region and the second memory region as the effective region is stored in a third memory region of the control data storing means by the effective region designating means, the effective region being identified by the control data renewing means, the renewing period setting means and the control data reading-out means according to the effective region designating data.

10. An apparatus according to claim 7, wherein a piece of renewal processing judgement data indicating that the effective region is in one of the control data renewing period and the control data renewal finishing period is stored in a fourth memory region of the control data storing means by the renewing period setting means, whether the effective region is in one of the control data renewing period and the control data renewal finishing period being identified by the control data reading-out means according to the renewal processing judgement data.

11. An apparatus according to claim 7, wherein the control data stored in one of the first memory region and the second memory region of the control data storing means includes pieces of diagnosis data indicating an unusual condition of on-vehicle equipment selected from the group comprising a throttle, an air flow, a crank angle and a water temperature, and the diagnosis data indicating the rotational number of a piston, an amount of an intake air and a failure code designating a type of on-vehicle equipment.

12. An apparatus according to claim 7, wherein
the control data stored in one of the first memory region and the second memory region of the control data storing means are composed of pieces of diagnosis data indicating an unusual condition of on-vehicle equipment detected by a sensor selected from the group comprising a throttle sensor and a water temperature sensor, an HA unusual condition judging flag of which a set value "1" indicates that the diagnosis data indicating the unusual condition of the on-vehicle equipment detected by the throttle sensor are stored in the effective region, and an TW unusual condition judging flag of which a set value "1" indicates that the diagnosis data indicating the unusual condition of the on-vehicle equipment detected by the water temperature sensor are stored in the effective region being stored in the effective region.

13. An apparatus according to claim 7, further including:
a sensor selected from the group comprising a throttle sensor, an air flow detector, a crank angle sensor and a water temperature sensor for detecting an unusual condition of on-vehicle equipment; and
diagnosis data producing means for producing the diagnosis data indicating the unusual condition of the on-vehicle equipment detected by the sensor, the diagnosis data being stored in the effective region determined by the effective region designating means.

14. An apparatus according to claim 7, further including:
a diagnosis checker for checking which portion of on-vehicle equipment is in a failure condition according to the updated control data read out by the control data reading-out means.

15. A data backup apparatus utilized in an electronic control system, comprising:
control data storing means having a first memory region and a second memory region for storing pieces of control data in the first memory region and the second memory region;
effective region designating means for alternately designating the first memory region and the second memory region of the control data storing means as an effective region on condition that an electric power is supplied to the effective region designating means;

control data renewing means for renewing pieces of control data, which are stored in the effective region determined by the effective region designating means one, by one on condition that the electric power is supplied to the control data renewing means, the first memory region and the second memory region of the control data storing means being alternately designated as the effective region each time the control data are renewed by the control data renewing means, and the renewal of the control data being stopped during renewal by cutting off the electric power supplied to the control data renewing means;

renewing period setting means for setting an operational condition of the effective region determined by the effective region designating means in a control data renewing period in cases where the control data stored in the effective region are under renewal and setting an operational condition of the effective region determined by the effective region designating means in a control data renewal finishing period in cases where the control data stored in the effective region are not under renewal, the operational condition of the effective region being maintained to the control data renewing period in cases where the electric power is cut off during renewal of the control data performed by the control data renewing means;

effective region switching means for switching a memory region designated as the effective region by the effective region designating means from one of the first and second memory regions to another memory region in cases where the operational condition of the effective region is set in the control data renewing period by the renewing period setting means, on condition that the electric power cut off is again supplied to the effective region designating means, the control data renewing means and the renewing period setting means, and maintaining the designation of the effective region performed by the effective region designating means in cases where the operational condition of the effective region is set in the control data renewal finishing period by the renewing period setting means; and control data reading-out means for reading out pieces of control data stored in the effective region which is determined by the effective region switching means.

16. An apparatus according to claim 15, wherein the control data stored in one of the first memory region and the second memory region of the control data storing means are composed of pieces of diagnosis data indicating an unusual condition of on-vehicle equipment.

17. An apparatus according to claim 15, wherein a piece of effective region designating data indicating the designation of one of the first memory region and the second memory region as the effective region is stored in a third memory region of the control data storing means by the effective region designating means, the effective region being identified by the control data renewing means, the renewing period setting means and the control data reading-out means according to the effective region designating data.

18. An apparatus according to claim 15, wherein a piece of renewal processing judgement data, indicating that the effective region is in one of the control data renewing period and the control data renewal finishing period, is stored in a fourth memory region of the control data storing means by the renewing period setting means, whether the effective region is in one of the control data renewing period and the control data renewal finishing period being identified by the control data reading-out means according to the renewal processing judgement data.

19. An apparatus according to claim 15, wherein the control data stored in one of the first memory region and the second memory region of the control data storing means includes pieces of diagnosis data indicating an unusual condition of on-vehicle equipment selected from the group comprising of a throttle, an air flow, a crank angle and a water temperature, and the diagnosis data indicating the rotational number of a piston, an amount of an intake air and a failure code designating a type of the on-vehicle equipment.

20. An apparatus according to claim 15, wherein
the control data stored in one of the first memory region and the second memory region of the control data storing means are composed of pieces of diagnosis data indicating an unusual condition of on-vehicle equipment detected by a sensor selected from the group comprising a throttle sensor and a water temperature sensor, an HA unusual condition judging flag of which a set value "1" indicates that the diagnosis data indicating the unusual condition of the on-vehicle equipment detected by the throttle sensor are stored in the effective region, and an TW unusual condition judging flag of which a set value "1" indicates that the diagnosis data indicating the unusual condition of the on-vehicle equipment detected by the water temperature sensor are stored in the effective region being stored in the effective region.

21. An apparatus according to claim 15, further including:
a sensor selected from the group comprising a throttle sensor, an air flow detector, a crank angle sensor and a water temperature sensor for detecting an unusual condition of on-vehicle equipment; and
diagnosis data producing means for producing the diagnosis data indicating the unusual condition of the on-vehicle equipment detected by the sensor, the diagnosis data being stored in the effective region determined by the effective region designating means.

22. An apparatus according to claim 15, further including:
a diagnosis checker for checking which portion of on-vehicle equipment is in a failure condition according to the updated control data read out by the control data reading-out means.

23. A data backup apparatus utilized in an electronic control system, comprising:
control data storing means having a first memory region and a second memory region for storing pieces of control data in the first memory region and the second memory region;
effective region designating means for alternately designating the first memory region and the second memory region of the control data storing means as a reading-out effective region on condition that an electric power is supplied to the effective region designating means;
control data renewing means for renewing pieces of control, which are stored in one of the first and second memory region not designated as the reading-out effective region by the effective region designating means one by one, one condition that the electric power is supplied to the control data renewing means, the first memory region and the second memory region of the control data storing means being alternately designated as the reading-out effective region each time the control data are renewed by the control data renewing means, and the renewal of the control data being incompletely finished to store pieces of incomplete control data in one of the first and the second memory region not designated as the reading-out effective region in cases where the electric power supplied to the control data renewing means is cut off in the middle of the renewal performed by the control data renewing means; and
control data reading-out means for reading out pieces of control data stored in the reading-out effective region which is determined by the effective region which is determined by the effective region designating means.

24. An apparatus according to claim 23, wherein the control data stored in one of the first memory region and the second memory region of the control data storing means are composed of pieces of diagnosis data indicating an unusual condition of on-vehicle equipment.

25. An apparatus according to claim 23, wherein a piece of reading-out region designating data indicating the designation of one of the first memory region and the second memory region as the reading-out effective region is stored in a third memory region of the control data storing means by the effective region designating means, the reading-out effective region being identified by the control data renewing means, and the control data reading-out means according to the reading-out region designating data.

26. An apparatus according to claim 23, wherein the control data stored in one of the first memory region and the second memory region of the control data storing means includes pieces of diagnosis data indicating an unusual condition of on-vehicle equipment selected from the group comprising a throttle, an air flow, a crank angle and a water temperature, and the diagnosis data indicating the rotational number of a piston, an amount of an intake air and a failure code designating a type of the on-vehicle equipment.

27. An apparatus according to claim 23, wherein
control data stored in one of the first memory region and the second memory region of the control data storing means are composed of pieces of diagnosis data indicating an unusual condition of on-vehicle equipment detected by a sensor selected from the group comprising a throttle sensor and a water temperature sensor, an HA unusual condition judging flag of which a set value "1" indicates that the diagnosis data indicating the unusual condition of on-vehicle equipment detected by the throttle sensor are stored in the reading-out effective region, and an TW unusual condition judging flag of which a set value "1" indicates that the diagnosis data indicating the unusual condition of the on-vehicle equipment detected by the water temperature sensor are stored in the reading-out effective region being stored in the reading-out effective region.

28. An apparatus according to claim 23, further including:
a sensor selected from the group comprising a throttle sensor, an air flow detector, a crank angle sensor and a water temperature sensor for detecting an unusual condition of on-vehicle equipment; and
diagnosis data producing means for producing the diagnosis data indicating the unusual condition of the on-vehicle equipment detected by the sensor, the diagnosis data being stored in the reading-out effective region determined by the effective region designating means.

29. An apparatus according to claim 23, further including:
a diagnosis checker for checking which portion of on-vehicle equipment is in a failure condition according to the updated control data read out by the control data reading-out means.

30. A data backup apparatus utilized in an electronic control system for storing pieces of diagnosis data utilized for the diagnosis of a driving condition in a vehicle, comprising:

sensing means having at least a first sensor and a second sensor for detecting conditions of a vehicle;

unusual condition detecting means for detecting that a sensing signal obtained by one of the first and second sensor of the sensing means indicates an unusual condition of the vehicle;

driving condition detecting means for detecting a driving condition of the vehicle in cases where an unusual condition of the vehicle is detected by the unusual condition detecting means;

a first memory region for storing pieces of first updated unusual information relating to the driving condition of the vehicle detected by the driving condition detecting means to replace pieces of first previous unusual information already stored in the first memory region with the first updated unusual information one by one, on condition that an electric power is supplied, and maintaining the storage of the first updated unusual information in cases where the electric power supplied is cut off;

a first unusual condition judging region placed in the first memory region for storing a first detecting result of the driving condition detected by the driving condition detecting means, which indicates whether the condition of the vehicle detected by one of the first sensor and the second sensor of the sensing means is unusual;

a first vehicle diagnosis data region placed in the first memory region for storing at least two pieces of first vehicle diagnosis data relating to the driving condition detecting means and a failure code indicating a type of sensor which relates to the driving condition of the vehicle, the first updated unusual information stored in the first memory region including the first detecting result stored in the first unusual condition judging region and the first vehicle diagnosis data stored in the first vehicle diagnosis data region;

a second memory region for storing pieces of second updated unusual information relating to the driving condition of the vehicle detected by the driving condition detecting means to replace pieces of second previous unusual information already stored in the second memory region with the second updated unusual information one by one, on condition that an electric power is supplied, and maintaining the storage of the second updated unusual information in cases where the electric power supplied is cut off, the replacements in the first and second memory regions being alternately performed;

a second unusual condition judging region placed in the second memory region for storing a second detecting result of the driving condition detected by the driving condition detecting means which indicates whether the condition of the vehicle detected by one of the first sensor and the second sensor of the sensing means is unusual;

a second vehicle diagnosis data region placed in the second memory region for storing at least two pieces of second vehicle diagnosis data relating to the driving condition of the vehicle detected by the driving condition detecting means and a failure code indicating a type of sensor which relates to the driving condition of the vehicle, the second updated unusual information stored in the second memory region including the second detecting result stored in the second unusual condition judging region and the second vehicle diagnosis data stored in the second vehicle diagnosis data region;

a third memory region for storing a piece of electric power cut-off information indicating that an electric power is cut off during one of the replacement of the first previous unusual information stored in the first memory region with the first updated unusual information and the replacement of the second previous unusual information stored in the second memory region with the second updated unusual information, and maintaining the storage of the electric power cut-off information in cases where the electric power is cut off, the electric power cut-off information being expressed by one of a first hexadecimal numeral indicating the first memory region in which the replacement of the first previous unusual information is finished and a second hexadecimal numeral indicating the second memory region in which the replacement of the second previous unusual information is finished, the first hexadecimal numeral being stored after the replacement of the first previous unusual information, the second hexadecimal numeral being stored after the replacement of the second previous unusual information, and the storage of one of the first and second hexadecimal numeral, which indicates one of the first and second memory regions being maintained until the replacement in another memory region is finished; and effective region selecting means for selecting one of first and second memory regions in which the first previous unusual information and the second previous unusual information are not under replacement just before the electric power is cut off as an effective region, in cases where the electric power cut off is again supplied on condition that the electric power cut-off information indicating that the electric power is cut off during one of the replacement of the first previous unusual information and replacement of the second previous unusual information are stored in the third memory region, and wherein one of the first and the second vehicle diagnosis data stored in one of the first and the second vehicle diagnosis data region of the effective region and one of the first and the second detecting result stored in the first unusual condition judging region of the effective region being read out by the effective region selecting means.

31. A data backup method, comprising the steps of:

preparing a first memory region and a second memory region of a backup memory to alternately store pieces of control data utilized for an electric control system in the first memory region and the second memory region;

alternately storing a piece of first designating data, indicating that the first memory region of the backup memory is designated as a reading-out effective region, and a piece of second designating data, indicating that the second memory region of the backup memory is designated as the reading-out effective region, in a third memory region of the backup memory for each of processing routines on condition that an electric power is supplied;

renewing the control data stored in one of the first memory region and the second memory region, which is not designated as the reading-out effective region by one of the first designating data and the second designating data stored in the third memory region, one by one for each of the processing routines on condition that the electric power is supplied: and reading out the control data stored in the reading-out effective region.

* * * * *